United States Patent [19]
Baxter et al.

[11] Patent Number: 5,623,878
[45] Date of Patent: *Apr. 29, 1997

[54] DYNAMIC RIDE VEHICLE

[75] Inventors: Anthony W. Baxter, Anaheim Hills; David G. Fink, Glendale; William G. Redmann, Moorpark; Jon H. Snoddy, Pasadena; David W. Spencer, II, Saugus; Scott F. Watson, Glendale, all of Calif.

[73] Assignee: The Walt Disney Company, Burbank, Calif.

[*] Notice: The term of this patent shall not extend beyond the expiration date of Pat. No. 5,403,238.

[21] Appl. No.: 559,569

[22] Filed: Nov. 16, 1995

Related U.S. Application Data

[63] Continuation of Ser. No. 109,175, Aug. 19, 1993, abandoned.

[51] Int. Cl.$^6$ ........................................... A63G 25/00
[52] U.S. Cl. .................. 104/85; 104/53; 104/154; 472/43; 472/59; 472/64; 180/165
[58] Field of Search ................... 104/53, 83, 85, 104/154, 289, 296; 434/37, 55, 58; 472/43, 57, 59, 64, 135; 180/165

[56] References Cited

U.S. PATENT DOCUMENTS

| | | |
|---|---|---|
| Re. 15,244 | 12/1921 | Maynes . |
| D. 254,622 | 4/1980 | Trussler ................ D19/63 |
| 373,439 | 11/1887 | Campbell . |
| 491,572 | 2/1893 | Libbey . |
| 717,457 | 12/1902 | Schofield . |
| 773,613 | 11/1904 | Walsh . |
| 784,345 | 3/1905 | Pepper . |
| 788,886 | 5/1905 | Citron . |
| 794,511 | 7/1905 | Knapp . |
| 858,624 | 7/1907 | Reckweg . |
| 859,604 | 7/1907 | Jossenberger . |
| 871,643 | 11/1907 | Shaw . |
| 879,615 | 2/1908 | Enochs . |
| 887,505 | 5/1908 | Nelson et al. . |
| 909,500 | 1/1909 | Woerth . |
| 1,238,151 | 8/1917 | Keefe . |
| 1,311,703 | 7/1919 | Meyer . |
| 1,352,969 | 9/1920 | Kalix . |

(List continued on next page.)

FOREIGN PATENT DOCUMENTS

| | | |
|---|---|---|
| 445464 | 3/1949 | Canada . |
| 1343788 | 10/1963 | France . |
| 8800544 | 1/1988 | France . |
| 759062 | 9/1980 | U.S.S.R. . |
| 180079 | 6/1922 | United Kingdom . |
| 1331678 | 9/1973 | United Kingdom . |

OTHER PUBLICATIONS

Doron Precision Systems, Inc., (1) "From Rollercoasters To Road Races . . . With SR2, You'd Swear You're Really There?," [1 page] (2) SR2 Specifications, [1 page] (3) Doron Simulator Hydraulic Motion Sysem Operational Specifications, [6 pages] (4) Photos of Motion Base and SR2 [2 pages].

*Primary Examiner*—S. Joseph Morano
*Attorney, Agent, or Firm*—Pretty, Schroeder, Brueggemann & Clark

[57] ABSTRACT

A dynamic ride vehicle for executing a sequence of distinct motion patterns and for providing unique ride experiences in an amusement park attraction or other environment includes a movable chassis and a body having a passenger seating area. A motion apparatus, including computer controlled actuators, imparts motion to the body along a plurality of axes independent of any motion of the chassis as it moves along a path. As the vehicle travels along the path, articulation of the body and appropriate steering of the vehicle enables the vehicle to execute, in cooperation with the motion apparatus, a sequence of distinct motion patterns. Execution of the motion patterns enhances the passengers' sensation of vehicle movement that is actually taking place, as well as the sensation of a realistic moving ride vehicle experience that is actually not happening.

78 Claims, 32 Drawing Sheets

U.S. PATENT DOCUMENTS

| | | | |
|---|---|---|---|
| 1,571,434 | 2/1926 | Ray . | |
| 1,590,934 | 6/1926 | Feltner . | |
| 1,712,353 | 5/1929 | Meling . | |
| 1,840,988 | 1/1932 | Traver . | |
| 1,890,137 | 12/1932 | Traver . | |
| 2,010,269 | 8/1935 | Kutsukian | 298/180 |
| 2,058,279 | 10/1936 | Watkins | 104/53 |
| 2,135,230 | 11/1938 | Courtney | 104/76 |
| 2,137,839 | 11/1938 | Hanna | 104/75 |
| 2,196,093 | 4/1940 | Bartlett | 104/53 |
| 2,461,780 | 2/1949 | Smith et al. | 119/15.5 |
| 2,620,225 | 12/1952 | Hutchinson | 298/22 |
| 2,685,003 | 7/1954 | Barnes et al. | 191/48 |
| 2,718,194 | 9/1955 | Ruhlmann | 104/247 |
| 2,719,715 | 10/1955 | Leahan . | |
| 2,861,806 | 11/1958 | Disney . | |
| 3,006,286 | 10/1961 | Bacon et al. | 104/63 |
| 3,067,697 | 12/1962 | Doolittle | 104/246 |
| 3,095,827 | 7/1963 | Chadenson | 104/130 |
| 3,113,528 | 12/1963 | Morgan et al. | 104/73 |
| 3,283,418 | 11/1966 | Brewer et al. . | |
| 3,345,916 | 10/1967 | Tobias . | |
| 3,410,223 | 11/1968 | Miller | 104/60 |
| 3,554,130 | 1/1971 | Broggie | 104/75 |
| 3,590,743 | 7/1971 | Larson | 104/130 |
| 3,672,308 | 6/1972 | Segar | 104/246 |
| 3,700,060 | 10/1972 | Keene et al. . | |
| 3,704,027 | 11/1972 | Laudadio . | |
| 3,709,104 | 1/1973 | Culberson | 91/495 |
| 3,734,222 | 5/1973 | Bardwick, III . | |
| 3,747,418 | 7/1973 | Hoffman et al. | 74/504 |
| 3,782,008 | 1/1974 | Lloyd . | |
| 3,803,466 | 4/1974 | Starkey | 318/135 |
| 3,805,414 | 4/1974 | Marsh . | |
| 3,849,910 | 11/1974 | Greenly . | |
| 3,886,334 | 5/1975 | Cummings et al. | 235/184 |
| 3,898,746 | 8/1975 | Seidle . | |
| 3,900,843 | 8/1975 | Ferriss . | |
| 3,903,696 | 9/1975 | Carman | 60/414 |
| 3,916,798 | 11/1975 | Ishii et al. | 104/247 |
| 3,942,270 | 3/1976 | Hoyt et al. . | |
| 3,983,640 | 10/1976 | Cardullo et al. . | |
| 3,984,924 | 10/1976 | Myles et al. . | |
| 3,991,485 | 11/1976 | Golenski . | |
| 4,019,261 | 4/1977 | Pancoe | 248/373 |
| 4,030,207 | 6/1977 | Kron . | |
| 4,030,208 | 6/1977 | Carver et al. . | |
| 4,034,484 | 7/1977 | Radice . | |
| 4,057,913 | 11/1977 | Eisenberg . | |
| 4,059,909 | 11/1977 | Kron . | |
| 4,064,640 | 12/1977 | Cummings et al. . | |
| 4,066,256 | 1/1978 | Trumbull . | |
| 4,070,705 | 1/1978 | Lockwood et al. . | |
| 4,108,077 | 8/1978 | Laing | 104/156 |
| 4,134,217 | 1/1979 | Neilson . | |
| 4,164,080 | 8/1979 | Kosydar et al. . | |
| 4,213,343 | 7/1980 | Hoffman | 73/505 |
| 4,216,473 | 8/1980 | Goldfischer et al. | 343/8 |
| 4,236,325 | 12/1980 | Hall et al. | 434/35 |
| 4,246,848 | 1/1981 | Schneider . | |
| 4,246,978 | 1/1981 | Schulz et al. | 180/165 |
| 4,251,140 | 2/1981 | Fogerty, Jr. | 352/132 |
| 4,262,861 | 4/1981 | Goldstein | 244/52 |
| 4,276,028 | 6/1981 | Gwynn | 434/20 |
| 4,276,030 | 6/1981 | Radice | 434/62 |
| 4,299,576 | 11/1981 | Kron | 434/59 |
| 4,321,044 | 3/1982 | Kron . | |
| 4,347,055 | 8/1982 | Geiger | 434/30 |
| 4,348,241 | 9/1982 | Baker et al. | 364/167 |
| 4,349,196 | 9/1982 | Smith, III et al. . | |
| 4,423,365 | 12/1983 | Turner | 318/561 |
| 4,451,769 | 5/1984 | Minnich et al. | 318/689 |
| 4,457,716 | 7/1984 | Eserhaut et al. | 434/43 |
| 4,473,876 | 9/1984 | Minnich | 364/184 |
| 4,491,073 | 1/1985 | Dozer | 104/95 |
| 4,504,233 | 3/1985 | Galus et al. | 434/45 |
| 4,693,186 | 9/1987 | Lisa | 105/329.1 |
| 4,752,065 | 6/1988 | Trumbull et al. . | |
| 4,753,596 | 6/1988 | Hart et al. | 434/29 |
| 4,760,697 | 8/1988 | Heggie et al. | 60/408 |
| 4,798,376 | 1/1989 | Trumbull et al. . | |
| 4,865,550 | 9/1989 | Chu | 43/267 |
| 4,920,890 | 5/1990 | Barber | 104/53 |
| 5,015,933 | 5/1991 | Watkins et al. . | |
| 5,016,540 | 5/1991 | Barber | 104/53 |
| 5,021,054 | 6/1991 | Fox et al. | 364/410 |
| 5,028,073 | 7/1991 | Harms et al. | 280/840 |
| 5,127,657 | 7/1992 | Ikezawa et al. | 273/310 |
| 5,134,940 | 8/1992 | Fujita et al. | 104/139 |
| 5,199,875 | 4/1993 | Trumball | 434/62 |
| 5,403,238 | 4/1995 | Baxter et al. | 104/78 |
| 5,456,184 | 10/1995 | Fritz | 104/139 |

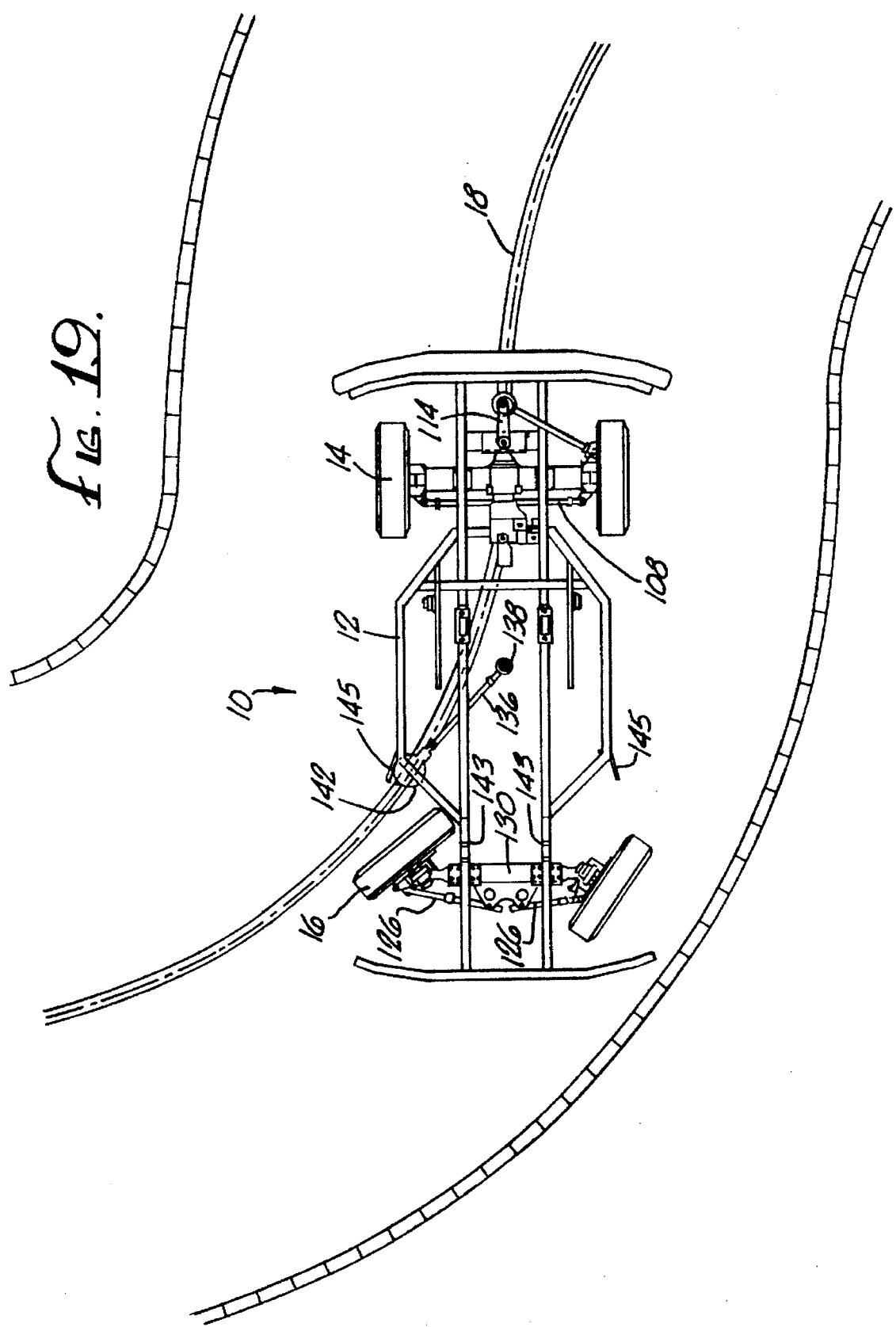

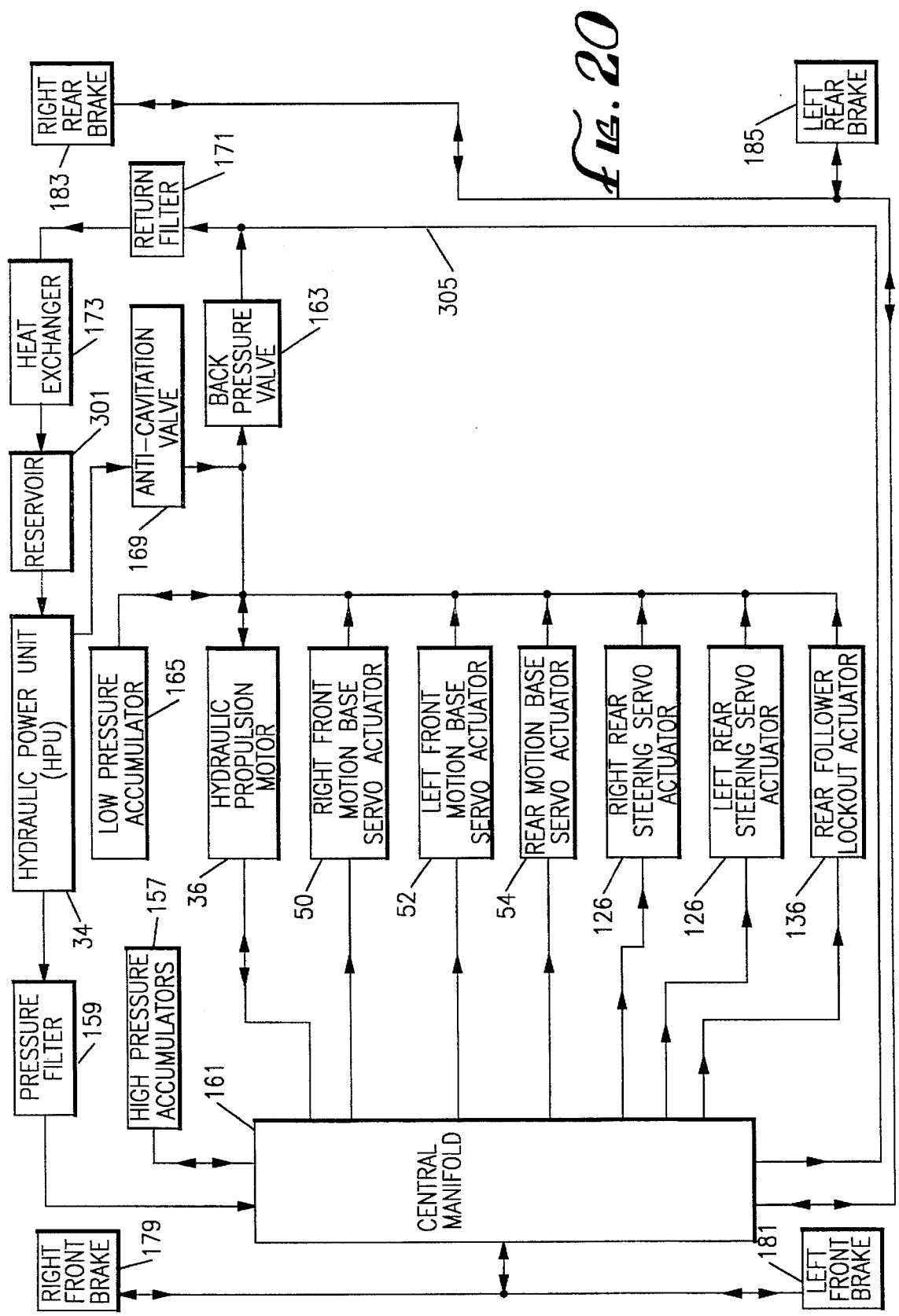

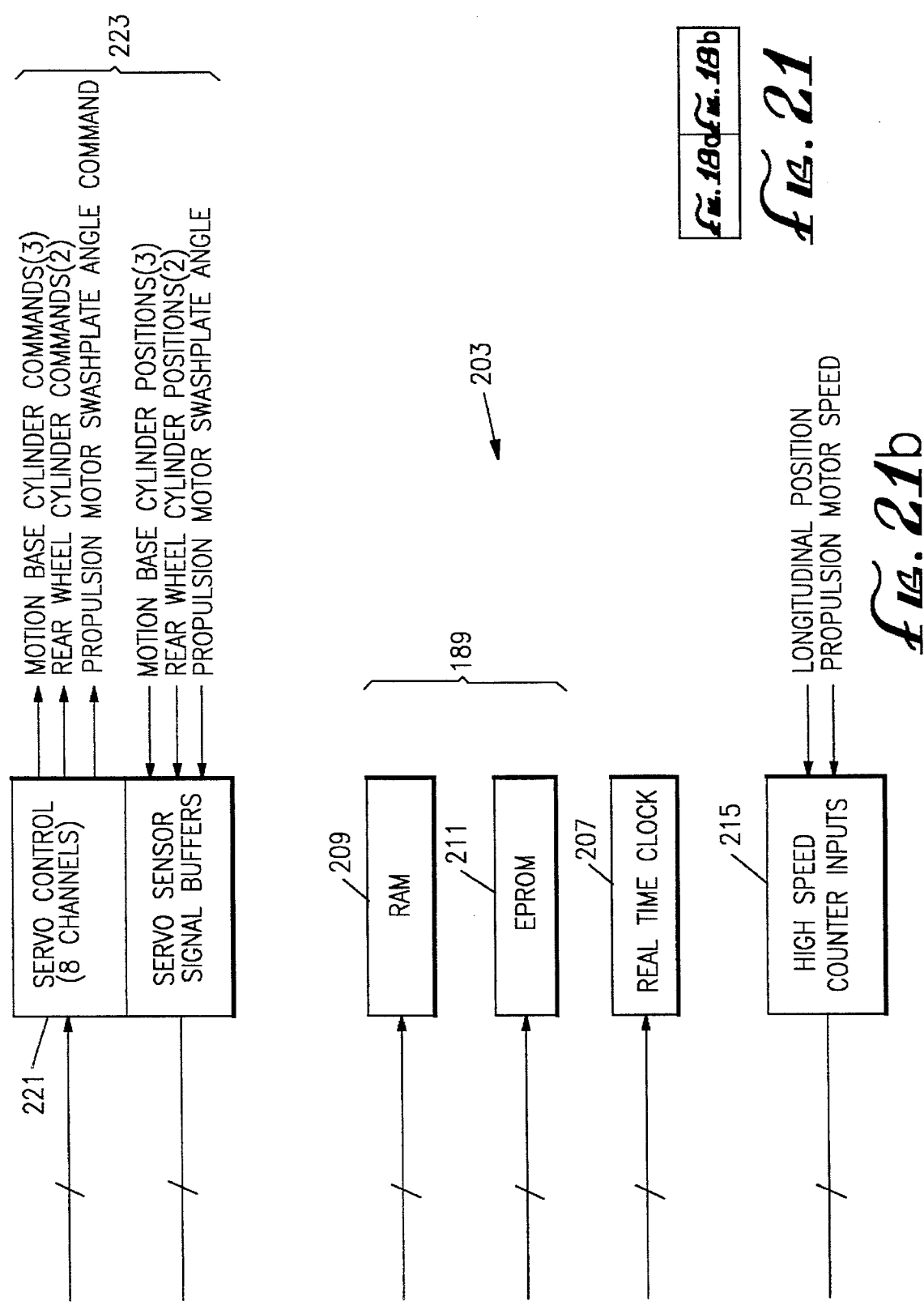

DYNAMIC RIDE VEHICLE

This application is a continuation of application Ser. No. 08/109,175, filed Aug. 19, 1993 which application is now abandoned.

BACKGROUND OF THE INVENTION.

The present invention relates to a dynamic ride vehicle for enhancing the sensation of vehicle motion and travel experienced by passengers in the vehicle. More particularly, the present invention relates to a dynamic ride vehicle which may be used in an amusement park environment.

Amusement park mania is a well known phenomenon of the twentieth century. Since the evolution of the amusement park ride, patrons have demanded, and gotten, greater and greater thrills—provided by bigger and better roller coasters and amusement park rides. The classic roller coaster—a man-made mechanical caterpillar which provided unmatched drama—ran furiously, climbing, dropping and turning tortuously at break neck speeds. Other types of rides, such as the Ferris wheel introduced a century ago, provided the guest with new and different experiences. To survive, though, amusement parks needed to intensify their ride experiences to compete with new inventions such as the automobile, which were becoming increasingly available to the public.

In the past, a typical ride experience was provided by a ride vehicle configured with a seating area for one or more passengers, attached to a wheeled-chassis that followed a predetermined path such as a track or rail system. This ride vehicle, although quite successful, was not without certain recognized limitations and drawbacks. For example, the passenger's sensation of vehicle motion was generally dictated by the velocity of the vehicle and the shape or contour of the path followed. To give the passenger the sensation of accelerating rapidly or turning a sharp corner very fast, the vehicle must actually accelerate rapidly or turn a sharp corner very fast. The ability to provide rapid accelerations and sharp turns at fast speeds, however, is limited by engineering design and the desire to prevent passenger exposure to unacceptable safety risks.

Since it was impossible for guests to actually fly at amusement parks without danger, every trick of the trade was used to duplicate flight, aerial aces, bicycle jumps, and other stunts. Rides began to rely on illusion; illusion, or deception, made the impossible possible at amusement parks. One ride, a large swing, was hung from a bar extending across a room near the ceiling. Guests perceived the swing gently rocking back and forth, increasing in fury until the ride completely somersaulted. Actually the swing barely moved. It was the room with furniture glued to the floor that was being rocked and turned upside-down. It worked. Passengers grabbed anything and everyone in sight to keep from falling. Thus, illusion combined with new technology opened a showcase of unbelievable ideas.

As amusement parks developed, guests wanted not only bigger thrills, guests wanted the rides to be a totally integrated experience. When it was technically impossible to increase the ride experience with clever vehicle or track use, themeing of rides was used. Themed rides from the turn of the century included elaborate dioramas and environments which adorned early roller coasters. Ride vehicles were often paraded through dark enclosures. As the ride vehicle traveled along its fixed path, it passed scenery and props designed to amuse and entertain. These scenic railways astounded passengers by giving them a simulated taste of locales most had only read about in books.

Although technological advances eventually rendered early roller coasters quaint and—eventually—obsolete, the desire for enhanced rides made possible by technology advances did not wane. At theme parks such as Disneyland® Park in Anaheim, Calif., guests thrilled to themed rides that took them on undersea voyages, soared them on trips to outer space and whisked them on adventures to the Swiss Alps.

A limitation of the themed ride vehicle was that it followed a singular, predetermined path through the attraction. As a result, there was little or no versatility in the ride experience. The guest was exposed to the same ride experience each time, giving little incentive to re-ride the attraction. Some themed ride vehicles were further enhanced by providing minor interactively by permitting the guest to direct the lateral travel of the ride vehicle by steering it within a defined range along a fixed path, and by controlling the rate of speed. However, the themed ride experience could not be substantially changed. The time and expense associated with changing the ride experience, either by altering the vehicle path or replacing the ride scenery, usually are prohibitive.

The ability to safely combine the perception of speed, boldness and recklessness with the theme, and unite them throughout the ride by a continuity of mood is paramount to the guest. To achieve this goal, ride designers experimented by departing from conventional roller coaster technology in favor of simulated thrills and the wide-screen cinema. Through sound and wide-screen image, it was possible to create point of view roller coaster footage which embraced the spectator—the simulated roller coaster. Heads tilted, eyes dilated, and brows dripped as guests felt the deep hills, abrupt turns, and even the velocity without ever leaving their theater seats. These experiences were further enhanced by the advent of motion simulators and their addition of actual audience motion to the spectacle of wide-screen movies.

Motion simulator ride vehicles simulate vehicle motion, and are typically operated entirely in an enclosed area such as a room. The simulator vehicles generally have a body with a passenger seating area which is movably supported by a motion apparatus having multiple actuators mounted above a platform. The platform is fixed and does not move; motion is imparted to the passenger seating area by multiple actuators. In use, guests seated in the passenger seating area view a wide-screen movie which corresponds to a predetermined pattern of vehicle travel. During the film, the passenger seating area is moved in various directions for the purpose of simulating the motion of a ride vehicle as it follows the predetermined path of travel depicted on the wide-screen movie. For example, when the sensation of acceleration is desired, the passenger seating area is pitched backward slowly and practically undetectably, and then pitched forward rapidly (through rotational acceleration) to a level position as the vehicle speed seems to increase—corresponding to a visual impression created by the film. When the sensation of turning a corner is required, the passenger seating area is rolled to one side and then back to a level position, in cooperation with the film's depiction of an actual "turn." Other vehicle motion sensations can be simulated using appropriate visual imagery and articulated motion of the passenger seating area. One well-known simulator of this type that has been used for years is the "Star Tours" attraction at Disneyland® Park in Anaheim, Calif.

While ride vehicle motion simulators of this type have come a long way towards providing more dynamic and enhanced sensations, such simulators still fall short of providing an experience that truly emulates a ride through an attraction. Instead, because the simulator remains in a fixed position while the passenger seating area tilts in various directions corresponding to its simulated path, the guest does not receive the experience of actually traveling through live scenery and props which might otherwise pass by if the vehicle were to physically travel through a live attraction.

Ride vehicle motion simulators also are limited because the guest must usually look forward toward the movie screen in order to obtain and maximize the ride experience. Unless the film viewed by the guest is changed and the motion pattern of the simulator reprogrammed to produce movement corresponding to the new film, which is an expensive undertaking, the guest will be exposed to the same ride experience each time the guest visits the attraction. Therefore, there is generally less incentive by the guest to repeatedly ride the vehicle simulator, as the ride experience will be the same each time.

Today, more than ever, theme park guests want to experience vicariously the same thrills they see on television and film. Ride designers strive to create attractions which both thrill and realistically immerse the guest in the themed fantasy. The limitation on the guest's experience, was, and is, the technology of the ride vehicle.

Accordingly, there has existed a definite need for an amusement ride vehicle that enhances the sensation of the vehicle's motion and travel experienced by a guest in the vehicle as the vehicle itself physically moves through an actual attraction. There also has existed a definite need for an amusement ride vehicle that is capable of differing sequences of movement each time the ride is experienced and thus which facilitates and enhances each repeated ride experience. There also has existed a definite need for an amusement ride vehicle that is capable of use in different attraction environments, to provide a greater versatility in the types of attractions in which the ride vehicle can be employed. The present invention satisfies these and other needs and provides further related advantages.

SUMMARY OF THE INVENTION

The present invention is embodied in a dynamic ride vehicle. The dynamic ride vehicle may be used to amuse and entertain passengers in an amusement park attraction or similar environment. The dynamic ride vehicle comprises a movable chassis and a body adapted, as in a passenger seating area, to carry at least one passenger. A motion apparatus connected between the chassis and the body permits at least one axis of controlled motion between the chassis and the body. In one aspect, the motion apparatus selectively imparts motion to the body in one or more degrees of freedom, relative to the chassis. This relative motion of the body is independent from the chassis motion, i.e. whether the chassis is in motion or not. This arrangement provides significantly enhanced sensation of vehicle movement. Furthermore, the dynamic ride vehicle is intended to be reliable and safe while providing the highest possible degree and variety of motion sensation and amusement.

The motion apparatus comprises at least one actuator connected between the chassis and the body. The actuator is operated by a controller which selectively imparts a motion or a sequence of motions to the body. This provides a particular motion sensation or a particular sequence of motion sensations.

The motion apparatus may include multiple actuators for imparting movement to the body along multiple axes. Multiple actuators are capable of causing body motion in multiple degrees of freedom. For example, with three actuators, body motion is capable of up three degrees of freedom—e.g. pitch, roll, and heave—which may be provided alone or in combination.

Alternative embodiments of the motion apparatus may have additional actuators to increase the available varieties of motion. For example, the complete set of physical motions—i.e. roll, pitch, yaw, heave, surge, and slip—can be achieved with as few as six actuators.

In one embodiment, the actuators of the motion apparatus are hydraulic actuators. One or more high pressure accumulators store energy in the form of pressurized hydraulic fluid to supply power for the hydraulic actuators. Fluid spent by the actuators is returned to a reservoir. An electrically driven hydraulic power unit continuously recharges the accumulators from the reservoir.

Referring back to the controller, the controller may also perform functions, such as communication with off board systems, internal status monitoring, exception handling, show control, show selection, and other functions described later. The controller may include a computer which communicates with a wayside interface, or a central control which in turn monitors one or more dynamic ride vehicles during operation. The computer may also monitor all of its sensors, inform the wayside interface of its status, and shut down the dynamic ride vehicle operation if a serious or unexpected condition develops. In addition, the computer is responsible for providing the ride experience, and stores in electronic memory a number of ride programs from which a particular sequence of dynamic ride vehicle movements may be directed.

With the use of hydraulic actuators, control of the hydraulic actuators is accomplished by the controller selectively operating hydraulic servo valves. Position sensors on each hydraulic actuator generate feedback signals for the controller, to enable precise control of the hydraulic actuators and the corresponding movement of the body. The controller may monitor the motion apparatus response for added safety.

The body of the dynamic ride vehicle itself may take on any desired appearance, and may be themed to a selected environment. For example, the body can be configured to resemble a transportation vehicle, such as an all-terrain vehicle, a jeep, a car, or a truck, or it may be configured to resemble the shape of an animal or other object. It will be appreciated that the body may comprise any structure adapted to carry at least one passenger.

The dynamic ride vehicle is moved along a path by a driver. In one embodiment the driver is a motor which is adapted to drive wheels on the dynamic ride vehicle. Other means of dynamic ride vehicle propulsion may be employed. For example, the driver may comprise an externally driven towing mechanism, gravity, linear induction motors, or other suitable propelling devices. The driver may be controlled by the controller. A brake may be further for fail-safe conditions.

In one embodiment, a hydraulic propulsion motor may be employed as the motor to drive the wheels on the dynamic ride vehicle. Further, the hydraulic propulsion motor may operate as a pump to recharge the accumulators during deceleration of the chassis. The hydraulic propulsion motor can also be used to provide dynamic ride vehicle deceleration.

The motion of the chassis is determined by the path. The path may be predetermined or arbitrary. A predetermined path may comprise a track, such as a rail, or a channel, such as a roadway. Alternatively, the path may comprise a set of navigation instructions. Such a path may be predetermined, or arbitrary, or a combination thereof.

When the path is not a track, the dynamic ride vehicle is further provided with a steering mechanism. For example, a wheeled dynamic ride vehicle may include two front wheels and two rear wheels, which may be steered together or independently of each other. The steering may be effected by separate steering mechanisms to provide a variety of dynamic ride vehicle movements.

In one embodiment, the front wheels are steered by a mechanical system that steers the front wheels in response to the curvature of a channel followed by the dynamic ride vehicle. The rear wheels are steered by a hydraulic actuator. This hydraulic actuator is operated by a hydraulic servo valve which is controlled by the controller. Of course, the front wheels also may be sneered in the same manner as the rear wheels, using a separate actuator. Alternatively, each wheel may have a separate steering actuator and may be independently controlled.

In one embodiment of the invention, the dynamic ride vehicle is guided along a channel by front and rear followers. These followers are respectively connected to front and rear bogies that roll along underground rails. The front follower links the front bogie to a front steering mechanism which causes a pair of front wheels to follow the channel. The rear follower is adapted to allow the dynamic ride vehicle to move laterally with respect to the bogies, within a predetermined envelope along the path. In the event that the dynamic ride vehicle transgresses the envelope, a lateral energy absorbing system limits lateral movement, absorbs lateral loads and, under certain conditions, completely disables operation of the dynamic ride vehicle. As a result, the passengers in the dynamic ride vehicle will not be subjected to unsafe accelerations, jerks or other violent movements of the dynamic ride vehicle. This helps to ensure the passengers' safety.

The dynamic ride vehicle may be guided along the path in numerous other ways. For example, the dynamic ride vehicle can be wire-guided or completely autonomous. It also is possible to guide the dynamic ride vehicle without regard to a predetermined envelope along the path. For example, the dynamic ride vehicle can be guided using radar, sonar and infrared guidance mechanisms.

In another aspect of the invention, onboard audio provides sounds such as sound effects, narration and music. These sounds may be coordinated to enhance the ride experience of the passenger. Typical sound effects generated by the onboard audio include the sounds of the themed vehicle—its engine rumble or tire squeal. The sounds may be synchronized to specific movements or actions of the dynamic ride vehicle.

The onboard audio may operate to playback recorded sounds on a cue generated by the controller. Alternatively, the onboard audio may include a synthesizer to create sounds using parameters supplied by the controller. Thus, for example, gear whine from a vehicle's transmission may be in pitch proportional to the themed vehicle's velocity. Stereo music and monaural sound effects also may be provided.

Speakers may be mounted at different locations within the dynamic ride vehicle. Gear whine may then be heard to come from the engine compartment, screeching tires may be heard to come from the tire wells, and other sounds similarly created.

The dynamic ride vehicle can execute a sequence of motion patterns for enhancing the sensation of actual vehicle movement, as well as simulated vehicle experiences; the dynamic ride vehicle may specifically enhance or diminish actual motion of the dynamic ride vehicle. For example, when the dynamic ride vehicle turns a corner, the body may be outwardly rolled from the chassis to exaggerate and enhance the passenger's sensation of the speed and sharpness of the corner. Alternatively, the body may be rolled inwardly from the chassis during turning of the corner to subdue and minimize the passenger's sensation of speed and sharpness of the corner. These outward and inward rolling motions are actually rotational movements of the body about a roll axis which produce the desired motion sensation. Addition of the steering mechanism, and its cooperation with the chassis driver, can further enhance the motion sensations imparted to the passenger. Further, the sequence of motion executed by the motion apparatus, steering mechanisms, and chassis driver can be controlled by the controller on the basis of a stored sequence of information.

The ride experience enjoyed by the passenger in the dynamic ride vehicle is unique because the dynamic ride vehicle actually moves the passenger along the path, while imparting motion to the body in multiple degrees of freedom independent of any motion of the chassis. This substantially enhances the sensation of dynamic ride vehicle motion and, in some instances, provides a moving vehicle experience that is not actually happening. As a result, the ride experience can be safety-maximized, while providing the desired motion sensations and overall ride experience, since it is not necessary to accelerate and turn the dynamic ride vehicle at speeds that would ordinarily be necessary to produce these sensations.

An important aspect of the dynamic ride vehicle is its versatility and ability to be reprogrammed to provide a different sequence of motion patterns. Thus, in an amusement park attraction, one or more dynamic ride vehicles can be programmed differently from the other dynamic ride vehicles. In this way, the differently programmed dynamic ride vehicles can be used to, provide the passengers with different ride experiences or ride profiles along the same path each time the passenger rides a differently programmed dynamic ride vehicle. In addition, the programmability of the dynamic ride vehicles enables relatively quick reprogramming when it is desired change portions of the attraction to provide a different ride experience, thereby minimizing the down time of the attraction when such changes are made.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 19 is another cross-sectional plan view of the ride vehicle illustrating the lateral energy absorbing system operating in a second mode to confine the range of lateral motion of the vehicle with respect to the path to a second distance;

FIG. 20 is a block diagram of one embodiment of a hydraulic system used to operate the motion apparatus, rear steering mechanism and other components of the vehicle;

FIG. 21 is a perspective view of the ride vehicle showing it moving in a forward direction with body motion to simulate the effect of descending a hill;

FIG. 23 is a perspective view of the ride vehicle showing in moving in a forward direction with four-wheel steering to simulate the effect of fishtailing.

DESCRIPTION OF THE PREFERRED EMBODIMENTS

Figure 1:
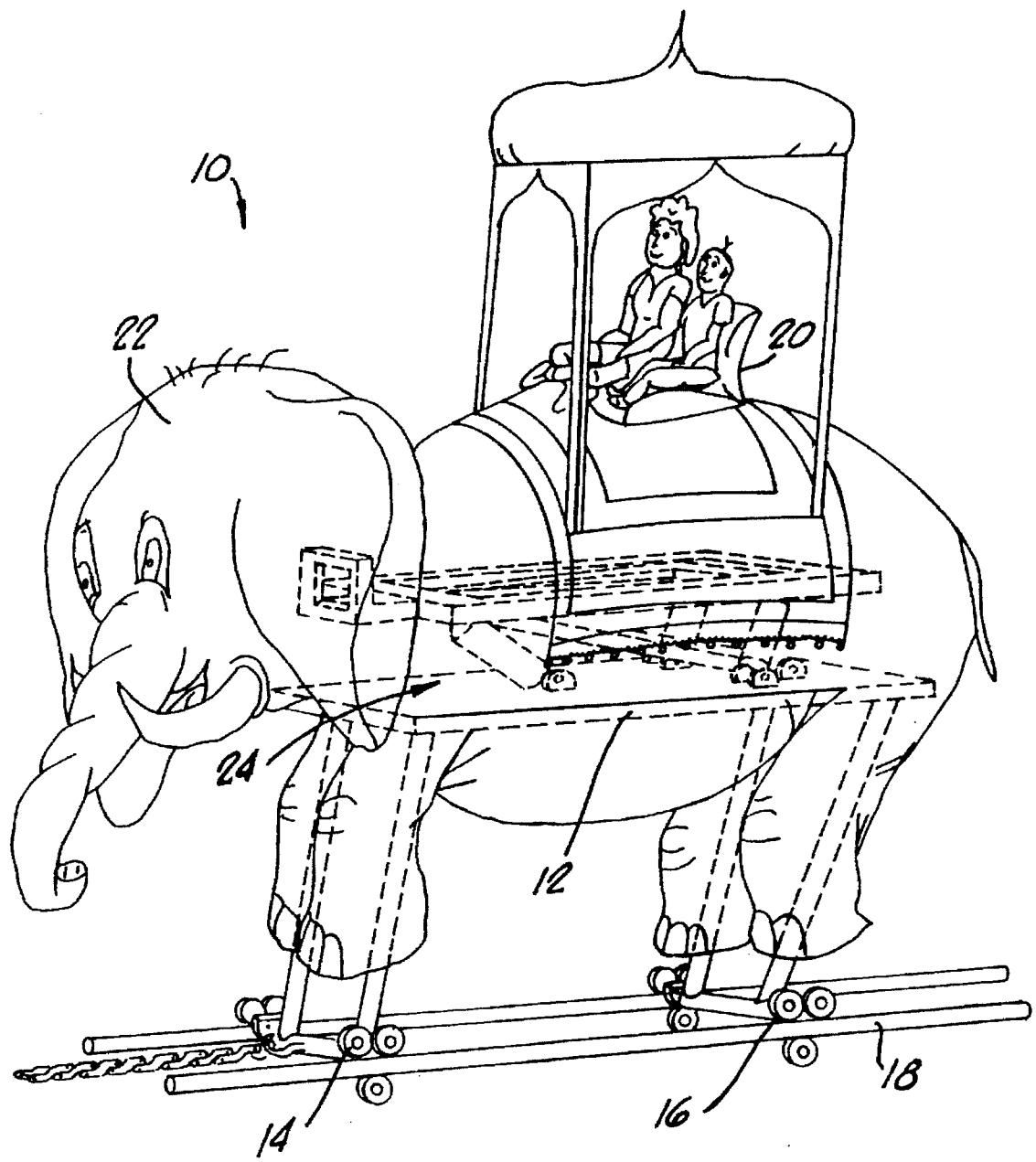
FIG. 1 is a front perspective view of one embodiment of a dynamic ride vehicle embodying the novel features of the present invention, showing a body of the vehicle in a lowered position.

As shown in the exemplary drawings, the present invention is embodied in a dynamic ride vehicle, referred to generally by the reference numeral 10, for use in enhancing the sensation of vehicle motion and travel experienced by passengers in the vehicle. The ride vehicle 10 comprises a movable chassis 12 having at least one wheel. In one embodiment, the vehicle 10 has a plurality of wheels comprising a pair of front wheels 14 and a pair of rear wheels 16 for moving the vehicle along a path 18 throughout the attraction. The guests or passengers are seated in a passenger seating area 20 in a vehicle body 22 connected to the chassis 12. In accordance with the invention, a motion apparatus 24 connected between the chassis 12 and the body 22 is capable of selectively imparting motion to the body in one or more degrees of freedom relative to but independent of any motion of the chassis along the path 18. This unique arrangement significantly enhances the sensation of vehicle movement experienced by the passengers riding in the vehicle 10.

Figure 2:
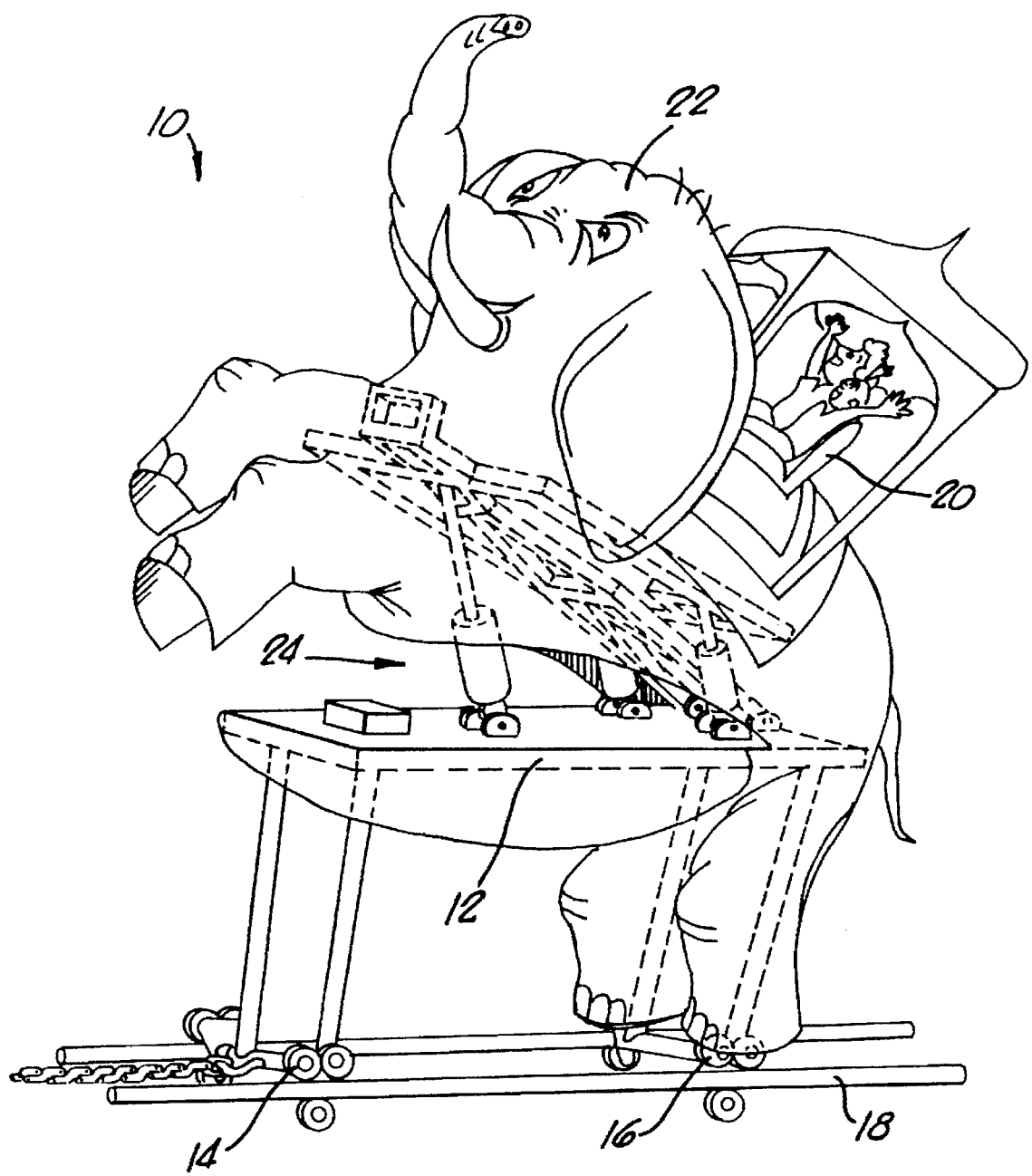
FIG. 2 is another front perspective view of the dynamic ride vehicle of FIG. 1, showing the body in a raised position.
Figure 3:
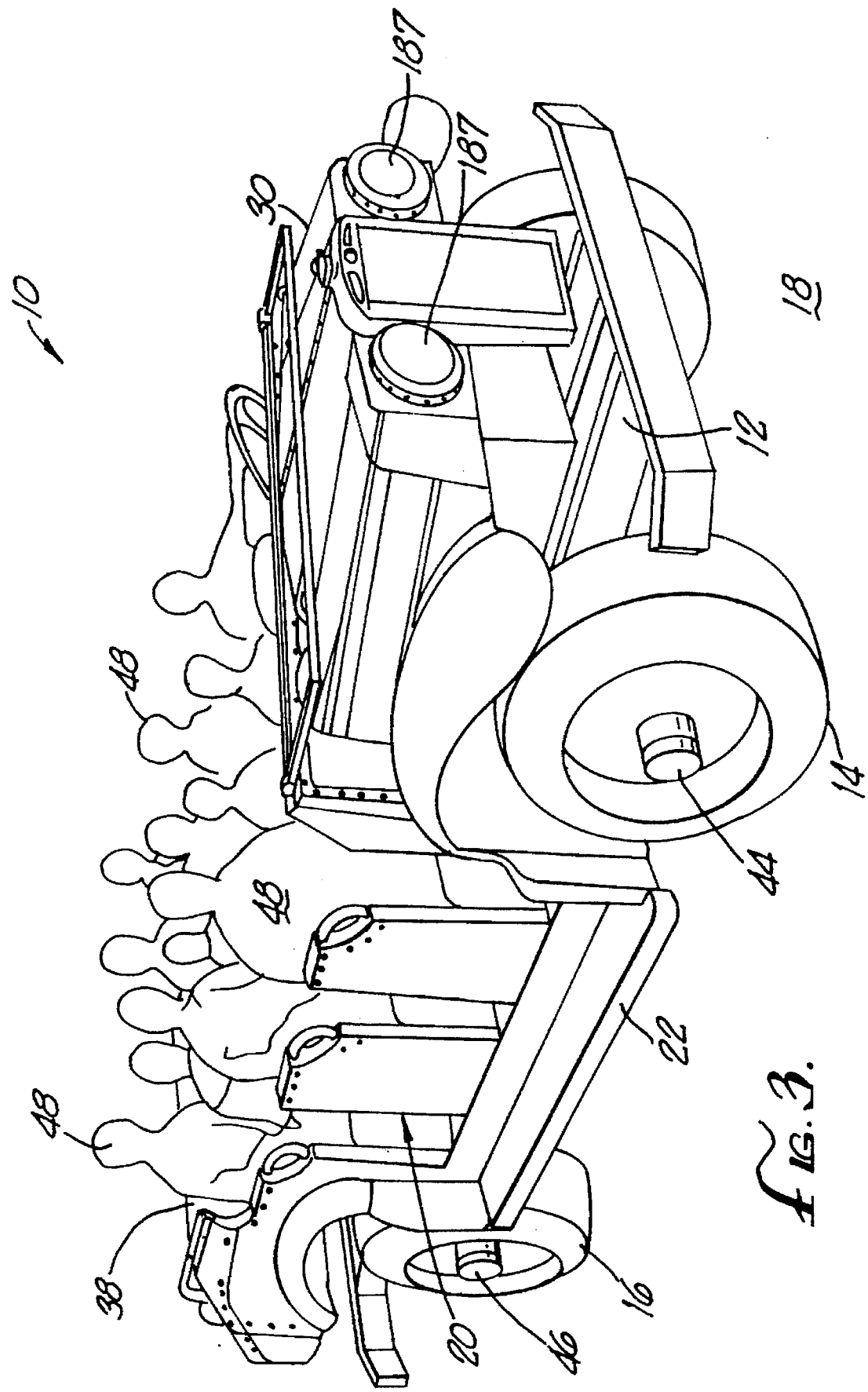
FIG. 3 is a front perspective view of another embodiment of a dynamic ride vehicle embodying the novel features of the invention.
Figure 4:
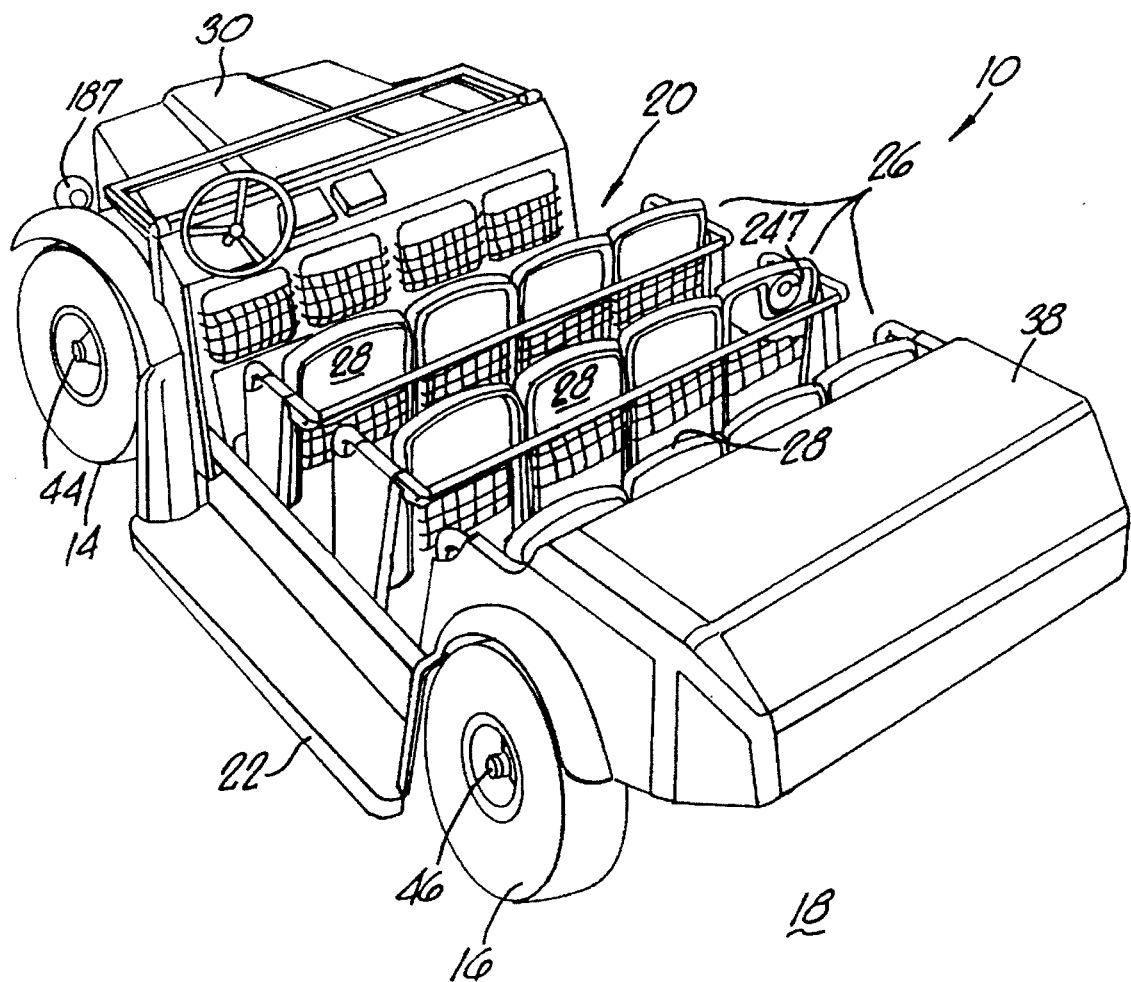
FIG. 4 is a rear perspective view of the ride vehicle of FIG. 3.

As shown best in FIGS. 1–4, the vehicle body 22 may comprise various forms and can take on a configuration that is themed to a selected environment. For example, as shown in FIGS. 1–2, the body 22 can be configured to resemble an animal, such as an elephant. To compliment the theme of the elephant body 22, the seating area 20 can be configured to resemble a howdah. Alternatively, as shown in FIGS. 3–4, the body 22 can be configured to resemble a transportation vehicle, such as an all terrain vehicle, a jeep, a car or truck, or various other forms of either on or off-road transportation vehicles. Various other body shapes may be employed as desired.

In the embodiment of the dynamic ride vehicle 10 shown in FIGS. 1–2, the ride vehicle is moved along a path 18 that comprises a track. By way of example, the track may take the form of a pair of parallel rails 25. The front and rear wheels 14 and 16 of the vehicle 10 can be suitably mounted for rolling engagement with these rails 25 in a conventional manner. An externally driven towing mechanism is provided as a driver to move the vehicle 10 along the rails 25. This driver may comprise an externally driven chain 27, as illustrated in FIGS. 1 and 2, or it may comprise a cable, platen drive system or other suitable arrangement.

As described below in connection with the embodiment of the ride vehicle 10 shown in FIGS. 3–9, suitable passenger restraints can be provided to restrain the passengers and confine them safely in their seats during vehicle motion. The ride vehicle 10 shown in FIGS. 1–2 also includes a controller 40 and a sound module 41 for generating sounds. These may be sounds corresponding to the sounds of the vehicle 10 interacting with the path, scenery and other props positioned at selected locations in, for example, an amusement attraction.

In the embodiment of the dynamic ride vehicle 10 shown in FIGS. 2–9, the passenger seating area 20 includes several rows 26 of seats 28. Other seating arrangements can be used depending upon the theme involved, the size and shape of the body 22, and the particular type of ride experiences to be conveyed. The embodiment of the ride vehicle 10 illustrated in FIGS. 1–2, showing an elephant-shaped body 22 with a howdah for a seating area 20, is exemplary. Passenger restraints also can be provided to restrain the passengers and confine them safely in their seats during vehicle motion. A suitable passenger restraint system is disclosed and claimed in U.S. Pat. No. 5,182,836.

Referring to FIGS. 3–4, the front portion of the body 22 includes a hood 30 which encloses the major power components of the vehicle, such as an electric motor 32, a hydraulic power unit 34 and a hydraulic propulsion motor 36. In this embodiment, the hydraulic propulsion motor 36 corresponds to the driver that puts the chassis 12 in motion along the path 18. It will be appreciated that the drivers illustrated in the embodiments of FIGS. 1–2 (elephant body 22) and FIGS. 3–9 (vehicle body 22) are provided for purposes of illustration only and not by way of limitation. Other suitable drivers include linear induction motors, combustion engines, electric motors, cables, platen drives, and other suitable propelling devices, including gravity.

The rear portion of the body 22 includes a trunk area 38 enclosing a controller 40 and a sound module 41 for generating sounds. These may be sounds corresponding to the sounds of the vehicle 10 interacting with the path 18, scenery 42 and other props positioned an selected locations in, for example, an amusement attraction. Further details regarding the vehicle's power components, controller 40, sound module 41, scenery 42 and other features are discussed in more detail below.

The chassis 12 has a front axle 44 and a rear axle 46, with the front and rear wheels 14 and 16 connected to the opposite ends of each axle, respectively. Each wheel 14 and 16 is equipped with a suitable tire, such as an inflatable tire or the like. Braking of the ride vehicle 10 when parked is carried out with spring applied, hydraulic release fail-safe disc brakes on all four wheels. If system power fails, spring energy causes the brakes to "fail" on. In one aspect of the invention, the front wheels 14 and the rear wheels 16 each have a separate steering system which allows the front wheels 14 and the rear wheels 16 to be steered independently of each other. This provides a steering system that is capable of producing a yaw axis of motion for the vehicle 10. This enables various motion patterns of the vehicle 10 not capable with conventional front wheel steering vehicles.

In accordance with the invention, the motion apparatus 24 is integrated into the chassis 12 for imparting motion in one or more degrees of freedom to the body 22 relative to but independent of the chassis 12. This relative motion of the body 22 with respect to the chassis 12 can be provided whether or not the chassis is in motion. When properly manipulated through an appropriate motion control system, the motion apparatus 24 can raise the body 22 and tilt in along several axes of motion to substantially enhance the sensation of vehicle movement experienced by passengers 48 riding in the vehicle 10. In some situations, motion of the body 22 with respect to the chassis 12 can be designed to enhance the sensation of vehicle movement than is actually taking place. In other situations, such motion can be designed to provide the passengers 48 with a realistic moving ride vehicle experience which is actually not taking place.

One form of the motion apparatus 24 is illustrated in FIGS. 5–9, with various details of the vehicle body 22 and chassis 12 having been omitted for purposes of clarity and simplification. This embodiment of the motion apparatus 24 uses three hydraulic servo actuators comprising a left-front motion base servo actuator 50, a right-front motion base servo actuator 52 and a rear motion base servo actuator 54. The motion apparatus 24 also includes a body support platform or frame 56 securely connected to or integrated with the body 22 so as to form the underside of the body 22. All three of the actuators 50, 52 and 54 have their lower ends pivotally connected to a base portion 58 of the chassis 12 by separate mounting brackets 60. Similarly, mounting brackens 60 are also used to pivotally couple the upper ends of the actuators 50, 52 and 54 to the body support frame 56 (i.e., to the body 22). Each of these brackets 60 is adapted to receive a fastener 62 to secure the actuators 50, 52 and 54 to the mounting brackets 60. As seen in FIG. 3, for example, two of the actuators 50 and 52 in this embodiment are forwardly mounted and have their upper ends pivotally connected directly to the front portion of the body support frame 56 by separate brackets 60. The third actuator 54 is mounted rearwardly of the other two and has its upper end pivotally connected to the rear portion of the body support frame 56.

The motion apparatus 24 also comprises two motion control arms comprising an A-arm 64 and a scissors 66. The A-arm 64 preferably is a bolted steel structure, and the scissors 66 preferably is a welded tubular steel frame. As shown best in FIG. 8, the A-arm 64 has its front end pivotally connected by brackets 68 to the front end of the vehicle chassis 12 and its rear end pivotally connected by brackets 70 to the rear portion of the body support frame 56 adjacent to the rear motion base servo actuator 54. The scissors 66 comprises a folding linkage in the form of two links 72 and 74 connected together at a pivot point 76. The lower end of the scissors 66 is pivotally connected by a bracket 78 to the chassis 12 adjacent to the two front motion base servo actuators 50 and 52. The upper end of the scissors 66 is connected by a bracket 80 to the front portion of the body support frame 56 adjacent to the two front motion base servo actuators 50 and 52. In order to permit rolling motion of the body 22 with respect to the chassis 12, universal joints 82 are employed to connect the body support frame 56 to the rear end of the A-arm 64 and the upper end of the scissors 66.

With the foregoing arrangement, the A-arm 64 is adapted to be pivoted up and down about the pivot points where the A-arm is connected to the chassis 12, while the body support frame 56 is adapted to be rolled from side to side about the pivot points where the frame is connected to the A-arm 64 and scissors 66 by the universal joints 82. This configuration of the motion apparatus 24 allows the body 22 to be rolled from side to side about an imaginary roll axis, pitched forward and backward about an imaginary pitch axis, and elevated or heaved up and down with respect to the chassis 12. However, the A-arm 64 constrains longitudinal forward and rearward shifting (surge), lateral side to side shifting (slip) and yaw movement of the body 22 with respect to the chassis 12.

It will be appreciated that alternative forms of the motion apparatus 24 can be provided. For example, in the embodiment shown in FIGS. 1–2, the motion apparatus 24 uses three hydraulic servo actuators, but in a reverse orientation from that described above. Thus, in the embodiment of FIGS. 1–2, the motion apparatus 24 comprises a front motion base servo actuator 29, a rear-left motion base servo actuator 31, and a rear-right motion base servo actuator 33.

Alternatively, the motion apparatus 24 may comprise six actuators arranged in combinations of two to form a 2+2+2 motion base arrangement. By controlling movement of these actuators, the body 22 may be rolled from side to side, pitched forward and backward and heaved up and down with respect to the chassis, as in the embodiments of the motion apparatus of FIGS. 1–2 and FIGS. 3–9. Other motion capabilities with these six actuators, however, include longitudinal forward and rearward shifting (surge), lateral side to side shifting (slip) and yaw movement of the body 22 with respect to the chassis 12.

Another alternative form of the motion apparatus 24, for example, can include six actuators forming a 3+3 motion base arrangement, with three of the actuators rearwardly mounted and three forwardly mounted. This configuration of the motion apparatus 24 allows pitch, roll and heave of the body 22 with respect to the chassis, as in the embodiments of the motion apparatus of FIGS. 1–2 and FIGS. 3–9. Other movements, however, include surge, slip and yaw movement of the body 22 with respect to the chassis 12.

In still another alternative embodiment of the motion apparatus 24, for example, three actuators can be arranged in a 1+2 motion base arrangement, in combination with a Watts linkage, to allow body movement with respect to the chassis 12 similar to that described above in connection with the embodiments of FIGS. 1–2 and FIGS. 3–9. However, the Watts linkage constrains surge, slip and yaw movement of the body 22 with respect to the chassis 12.

Figure 5:
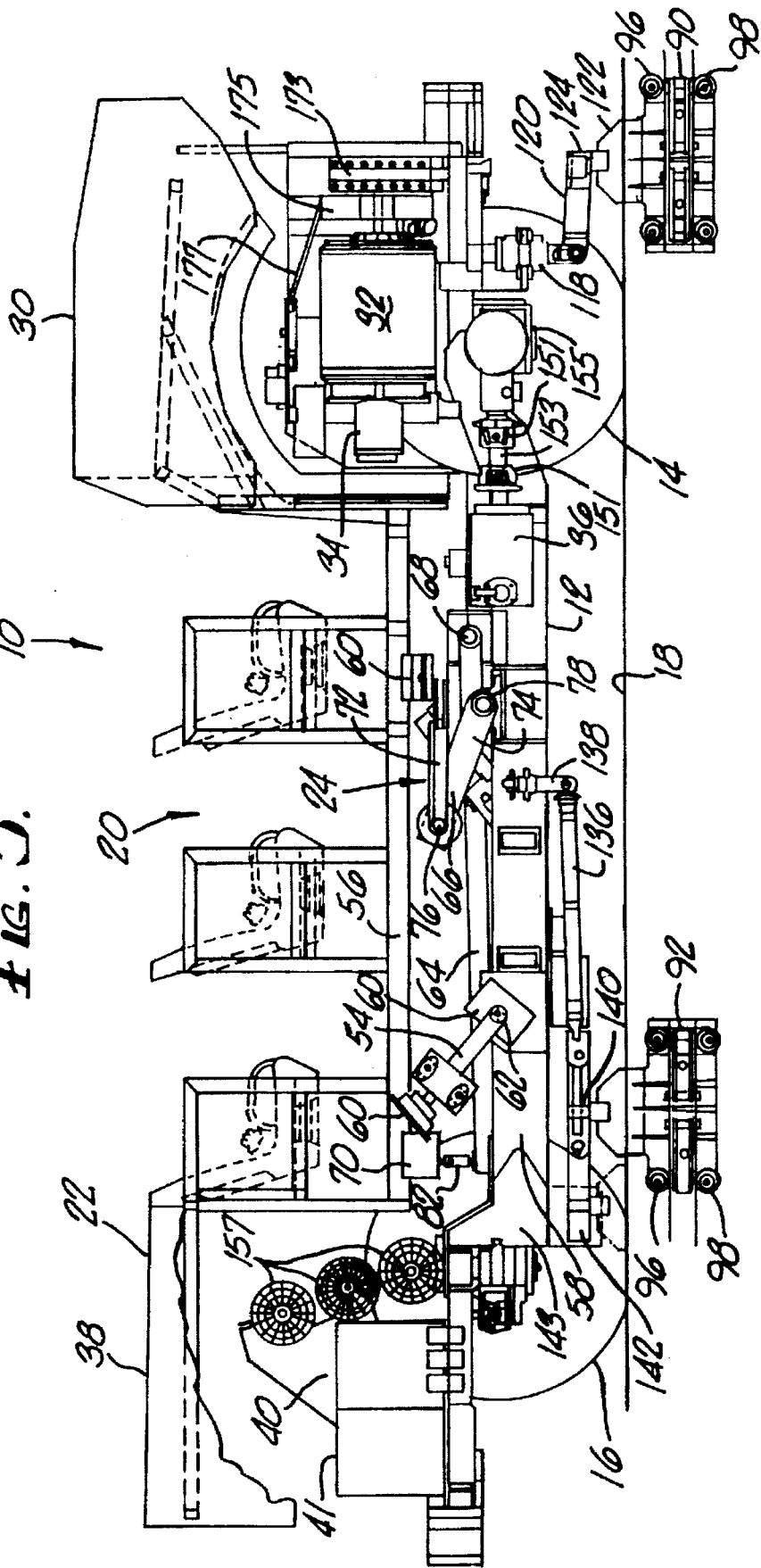
FIG. 5 is a side elevational view of the ride vehicle of FIG. 3, partly in cross-section, showing the body in a normal, horizontal position relative to the chassis.

FIG. 5 is a side elevational view, partly in cross-section, showing the body 22 in a normal, horizontal position relative to the chassis 12. In this position, each of the motion base servo actuators 50, 52 and 54 is retracted to a totally collapsed condition such that the ride vehicle 10 appears to resemble any other typical roadway vehicle. The motion apparatus 24, including its actuators 50, 52 and 54 and other controls, is adapted to react to a wide range of motion commands, including high accelerations, low velocities, smooth transitions and imperceptible washout to a static condition. The motion apparatus 24 preferably is designed to be interchangeable from one vehicle to another, as are all of the other components of the ride vehicle 10 described herein.

The motion apparatus 24 is intended to replicate a broad range of vehicle motions during a ride. As explained in more detail below, these motions can be programmed in conjunction with an amusement park attraction or other environment to provide a unique ride experience to the passengers 48. Moreover, each vehicle 10 is adapted to store more than one motion pattern so that the vehicle ride and action is not necessarily the same from one ride to the next. The motion patterns are programmed and stored by a ride programmer during the development of an attraction with the aid of a separate programming console (not shown). This programming console is then used to directly download programmed data to the vehicle's on board controller 40.

When the ride first starts, the body 22 usually will be in the fully settled or down position, as shown in FIGS. 1 and 3–5, to allow the passengers 48 to unload and load. In this position, the motion base servo actuators 50, 52 and 54 are fully collapsed and the forces of gravity can move the body 22 to the down position. If desired, the actuators 50, 52 and 54 can be commanded to go to a collapsed condition when it is necessary to quickly move the body 22 to the down position, such as at the end of the ride.

Figure 6:
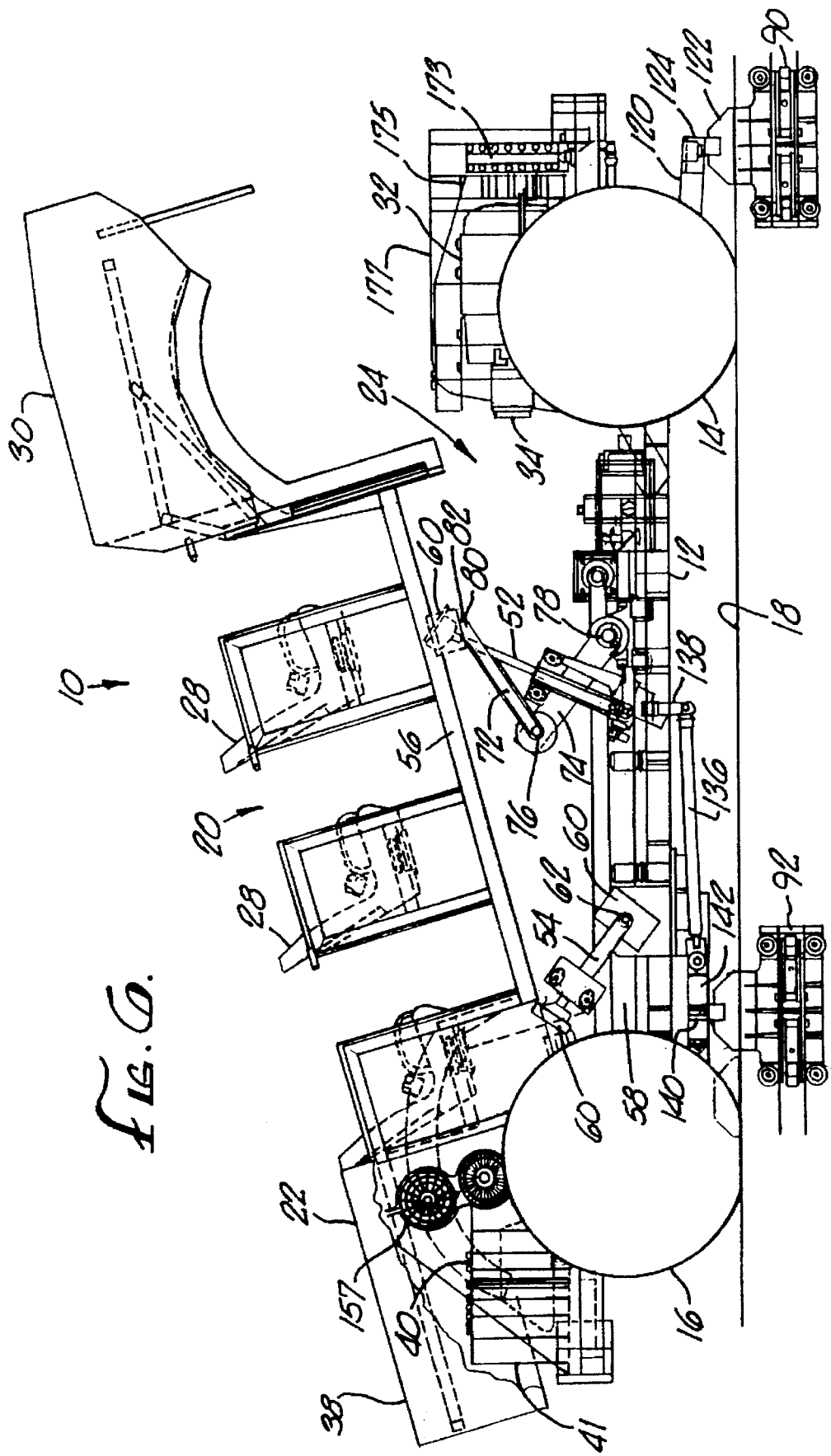
FIG. 6 is another side elevational view of the ride vehicle, similar to FIG. 5, showing the body pitched rearwardly with respect to the chassis about a pitch axis.

FIGS. 6–9 show examples of the range of motion of the body 22 with respect to the chassis 12. By using three motion base servo actuators 50, 52 and 54, the motion apparatus 24 is capable of providing motion in three degrees of freedom to provide body movements with respect to the chassis 12. For example, FIG. 6 shows the body 22 pitched in a rearward direction about the pitch axis of the vehicle 10. The two front actuators 50 and 52 provide movement of the body 22 in this manner, while the rear actuator 54 is moved only slightly or not at all. Power for movement of the actuators 50, 52 and 54 is derived from the on-board vehicle hydraulic system and position sensors 84 on the actuators that provide the position of the body 22 to the on-board controller 40. In one embodiment, these sensors 84 are a non-contact, absolute position, magnetostrictive-type sensor. Using the sensors 84, the degree of pitch of the body 22 with respect to the chassis 12 may be accurately controlled as desired. In the one embodiment, the body 22 can be pitched rearwardly by as much as 15.9 degrees.

Figure 7:
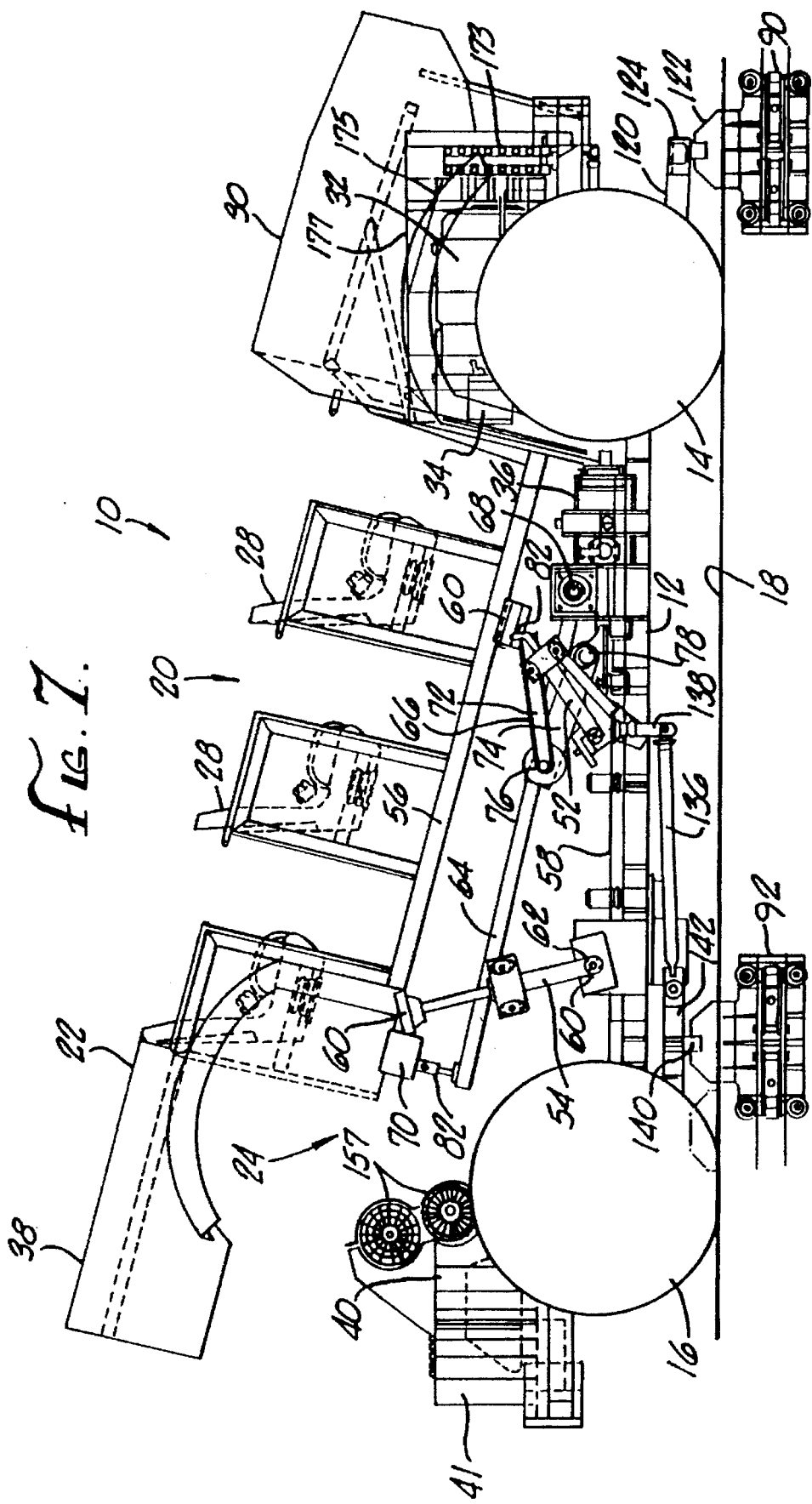
FIG. 7 is another side elevational view of the ride vehicle, similar to FIG. 5, showing the body pitched forwardly with respect to the chassis about the pitch axis.

FIG. 7 shows the body 22 pitched in a forward direction relative to the chassis 12. This pitching motion is achieved by supplying appropriate hydraulic power to the rear actuator 54 to raise the rear end of the body 22, while the two forward actuators 50 and 52 are moved only slightly or not at all. This forward pitching motion of the body 22 with respect to the chassis 12 occurs about the pitch axis of the vehicle 10. In one embodiment, the body 22 can be pitched forward by as much as 14.7 degrees. In both cases of forward or rearward pitching of the body 22, the movement of the actuators 50, 52 and 54 causes either a constant velocity movement or rotational acceleration of the body 22 with respect to the chassis 12 about the pitch axis.

Figure 8:
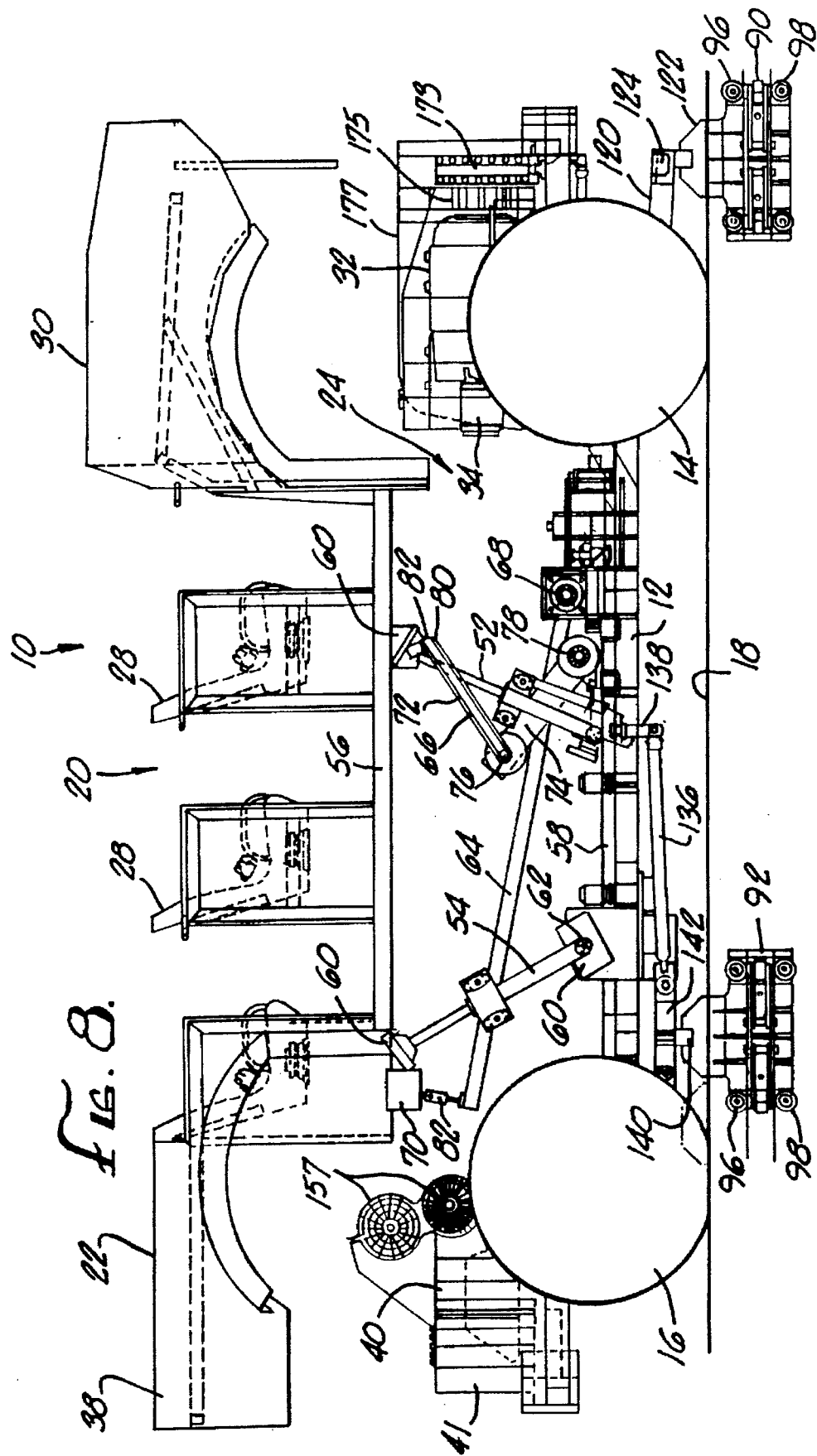
FIG. 8 is another side elevational view of the ride vehicle, similar to FIG. 5, showing the body in an elevated, horizontal position with respect to the chassis.

FIG. 8 shows all three actuators 50, 52 and 54 in a fully extended position, raising the body 22 to an elevated, horizontal position with respect to the chassis 12. This is accomplished by supplying appropriate hydraulic power to all three actuators 50, 52 and 54 so that they are fully extended. In one embodiment, the body 22 can be elevated or heaved by as much as 15 inches above the chassis.

Figure 9:
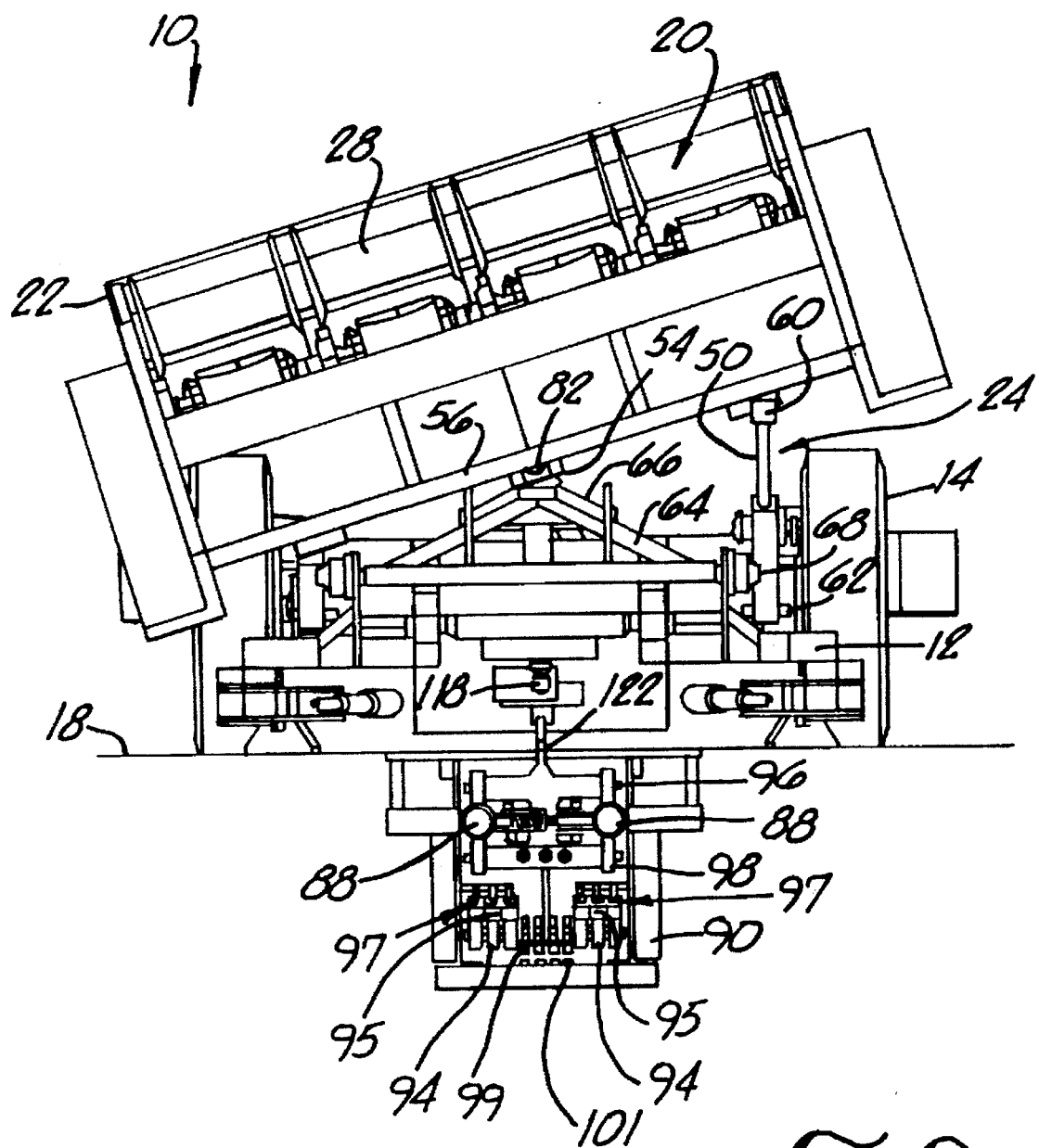
FIG. 9 is a front elevational view of the ride vehicle of FIG. 3, partly in cross-section, showing the body rolled to one side with respect to the chassis about a roll axis.

FIG. 9 is a front elevational view of the vehicle 10, showing the body 22 rolled with respect to one side of the chassis 12. This is accomplished by supplying appropriate hydraulic pressure to the actuators 50, 52 and 54, resulting in rotational movement of the body 22 with respect to the chassis 12 about the roll axis of the vehicle 10. In this condition, one of the two front actuators 50 is extended while the other actuator 52 is collapsed. The rear actuator 54 also is partially extended to the extent necessary to accommodate extension of the one front actuator 50. In one embodiment, the body 22 can be rolled by as much as 16.1 degrees to either side of the chassis 12. Again, it will be understood that various intermediate ranges of motion, and motion in the opposite direction to that shown in FIG. 9, are possible about the roll axis of the vehicle 10.

It also will be understood that intermediate ranges of motion are possible, beyond the full range of motions described above and depicted in FIGS. 6–9. For example, the body 22 can be both pitched forward and rolled to one side with respect to the chassis 12 by as much as 8.2 degrees (pitch) and 15.4 degrees (roll). Similarly, the body 22 can be both pitched rearward and rolled to one side with respect to the chassis 12 by as much as 7.2 degrees (pitch) and 17.4 degrees (roll). These motions can be carried out by appropriate control and extension and retraction of the motion base servo actuators 50, 52 and 54 in a multitude of combinations to produce compound body movements. Therefore, it is understood that the motions described herein are by way of example only and not limitation.

Figure 10:
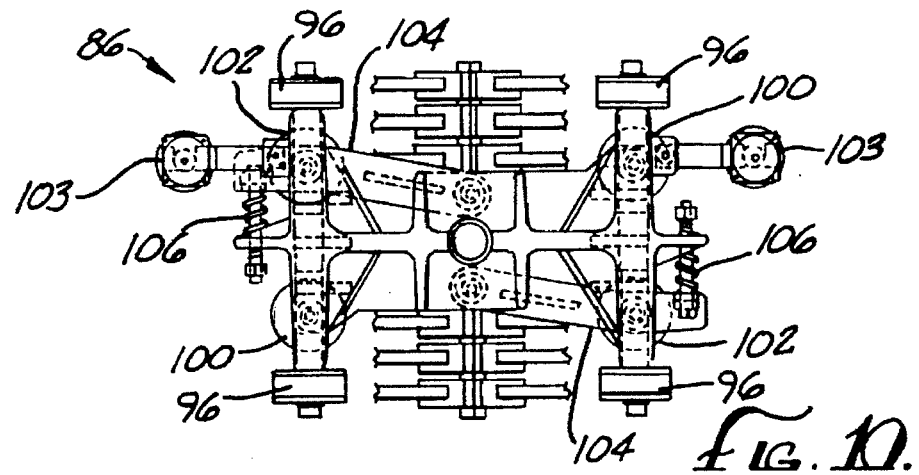
FIG. 10 is a top plan view of a bogie for use in guiding the ride vehicle along a path.
Figure 11:
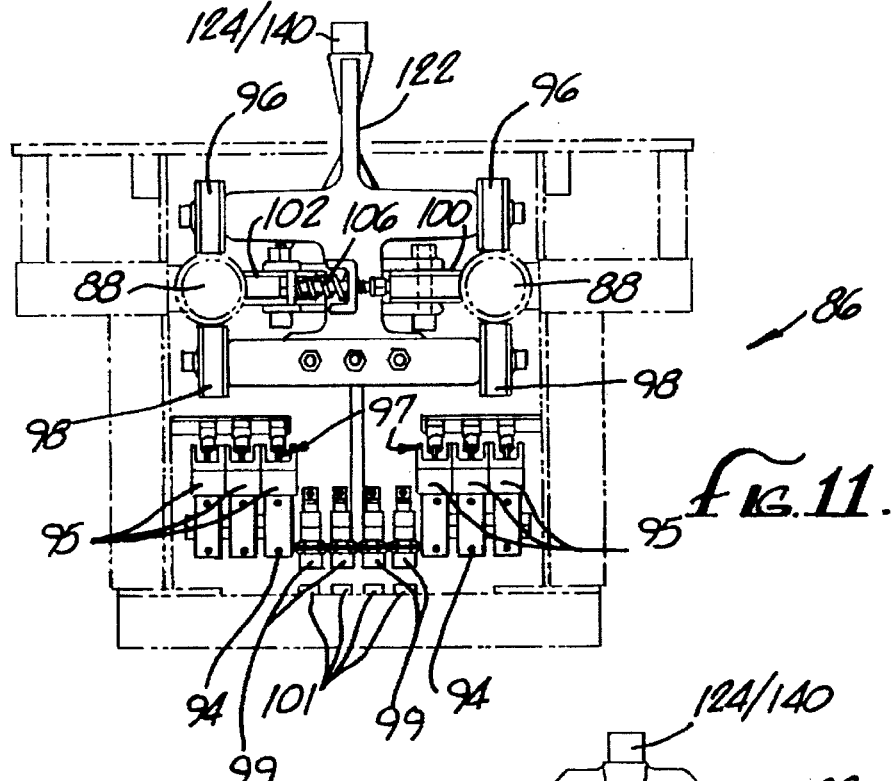
FIG. 11 is a front elevational view of the bogie.
Figure 12:
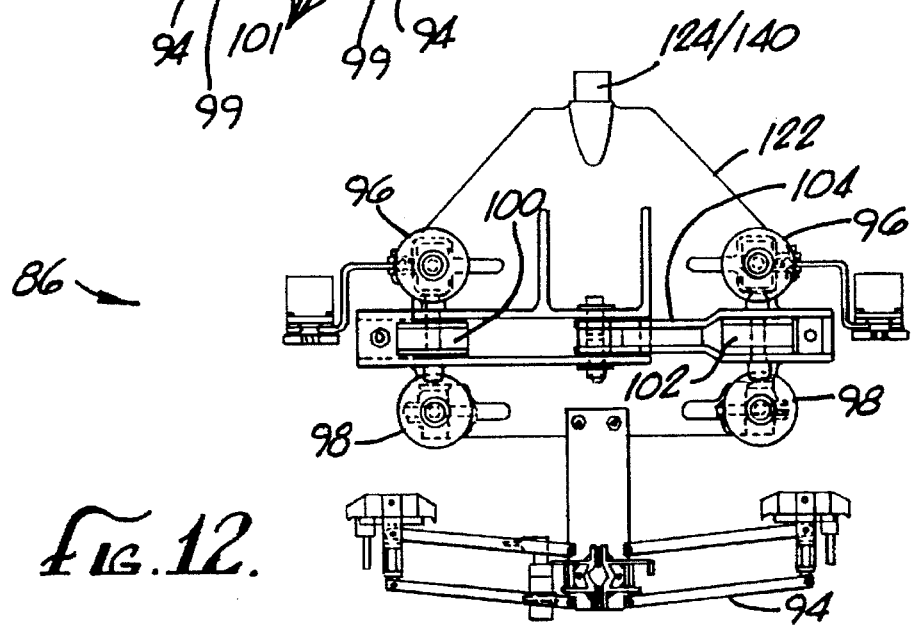
FIG. 12 is a side elevational view of the bogie.

FIGS. 10–12 show a bogie apparatus 86 for connecting the ride vehicle 10 to underground track rails 88 below the surface of the oath 18 upon which the vehicle 10 travels. In one embodiment, as shown in FIG. 5, for example, there are two bogies comprising a front bogie 90 and a rear bogie 92. These bogies 90 and 92 have several common features. With reference to FIGS. 8–10, each of the bogies 90 and 92 has several sets of wheels for rolling engagement with a pair of spaced, parallel rails 88 positioned under the path or surface 18 on which the vehicle 10 travels. As explained below, these sets of wheels securely attach the bogies 90 and 92 to the rails 88. The front bogie 90 also is provided with two bus bar collectors 94 per bus rail. These bus bar collectors 94 are spring tensioned to maintain the necessary contact forces between the collector 94 and a bus bar 95 to provide the A.C. electrical power used to drive the electric motor 32 and control system signals for the ride vehicle 10.

Each bogie 90 and 92 has a multiple wheel arrangement comprising load wheels 96, up-stop wheels 98, static guide wheels 100 and active guide wheels 102. The load wheels 96, of which there are four, ride on the top of the track rails 88 and support the weight of the bogies 90 and 92. The up-stop wheels 98, which also are four in number, are located on the bottom of the bogies 90 and 93 and inhibit upward motion. These wheels 98 preferably are designed with a small clearance relative to the rails 88 so as not to add to the rolling resistance of the bogie 90 or 92. There are two static guide wheels 100 to prevent lateral motion of the bogie 90 or 92 into the side of the track rail 88. Finally, two active guide wheels 102 mounted on pivoting arms 104 pre-load and center the bogie 90 or 92 and also inhibit lateral motion of the bogie into the side of the opposing track rail 88. Each of these wheels 104 also is provided with a spring tensioner 106 for the pre-loading and centering function.

The front bogie 90 is connected to the vehicle's front steering system and, therefore, is subjected to front steering loads. The rear bogie 92 is essentially free of normal operating loads, other than its own weight, and is towed along the track through its connection to the vehicle's lateral energy absorbing system described below.

The bus bars 95 according to one embodiment have a 200 amp capacity. These bus bars 95 also preferably have a stainless wear surface, such as aluminum. For example, the Wampfler Model 812 bus bar has been used and found to be suitable. The bus bar collectors 94 preferably have a wear surface comprising copper graphite. In addition, the bus bars 95 may be installed in an open downward position to prevent debris from entering the bars and shortening their life.

Figure 13:
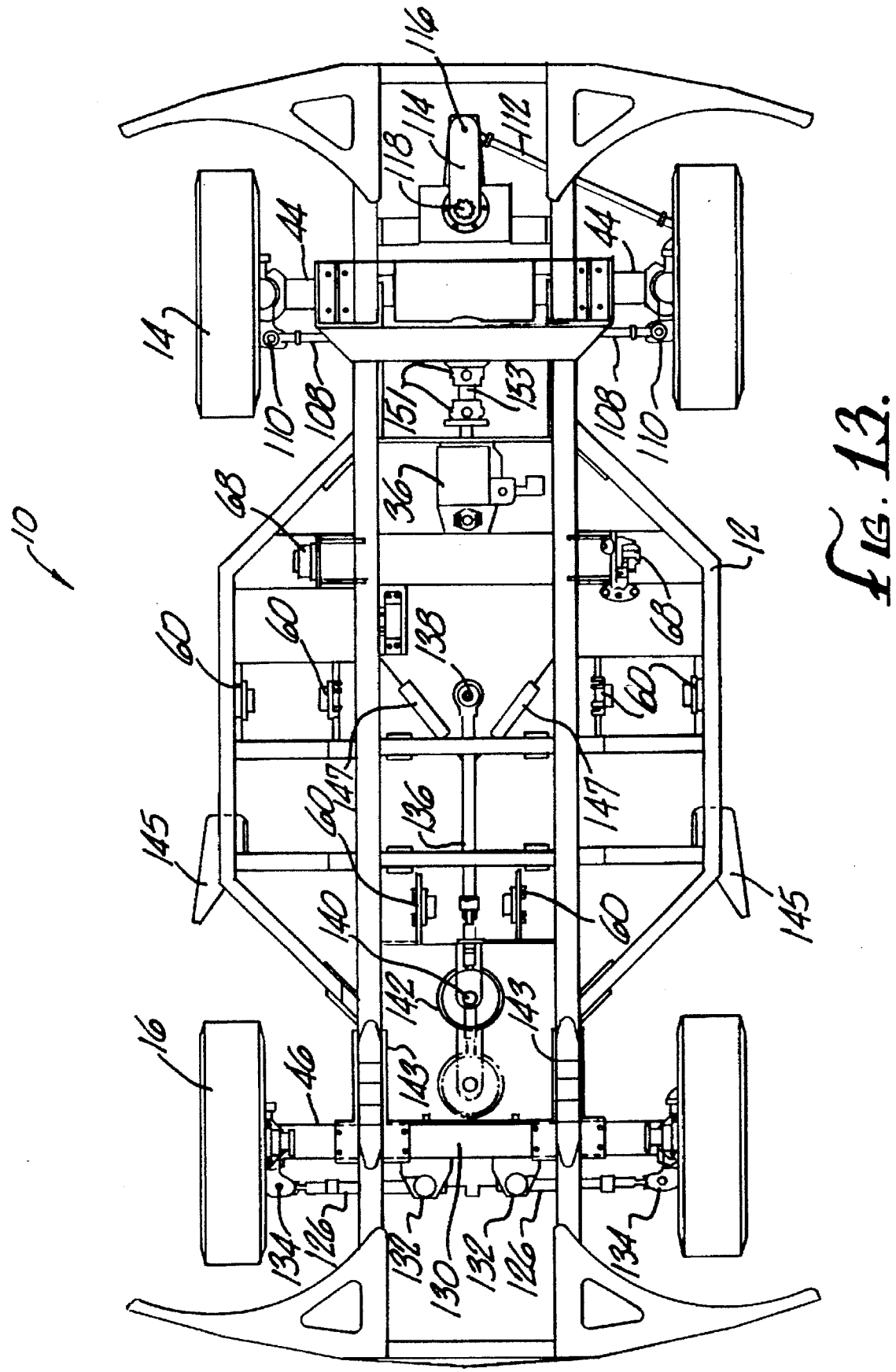
FIG. 13 is a top plan view of the ride vehicle chassis illustrating one embodiment of a steering mechanism and a lateral energy absorbing system of the ride vehicle.
Figure 14:
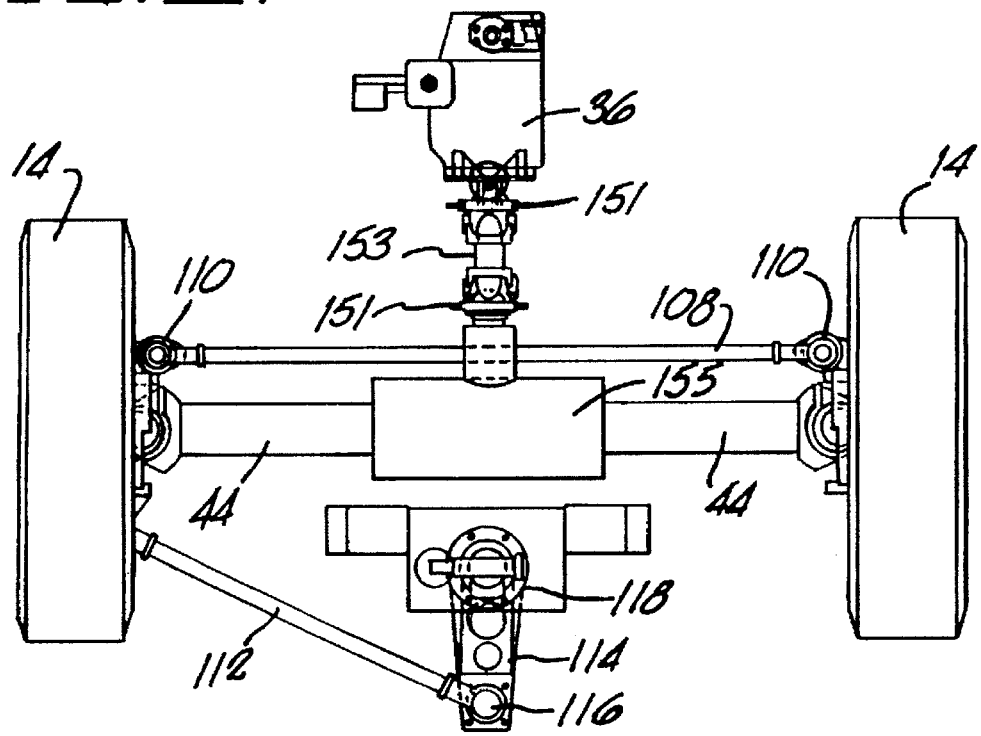
FIG. 14 is an enlarged top plan view of one embodiment of a front steering mechanism of the ride vehicle.
Figure 15:
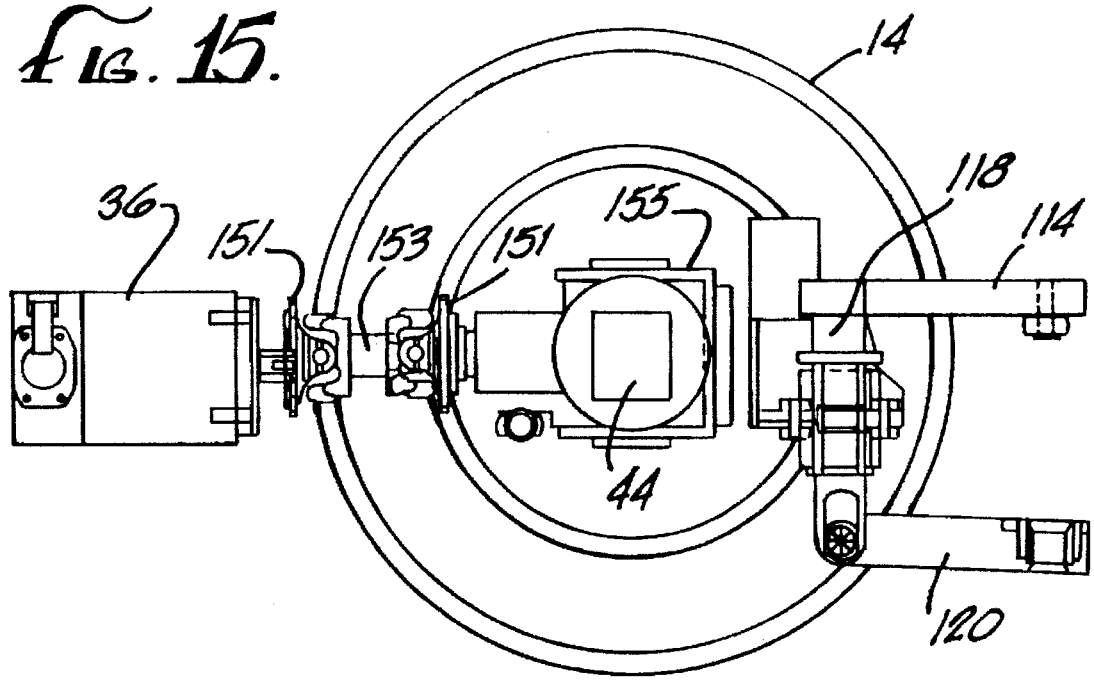
FIG. 15 is an enlarged side elevational view of a portion of the front steering mechanism shown in FIG. 14.

As shown best in FIGS. 13–15, the vehicle's front wheels 14 are steered in one embodiment via a mechanical steering system that uses the curvature of the path 18 to steer the front wheels. More particularly, the two front wheels 14 are connected to the chassis 12 for rotation by the front axles 44, using zero king pin inclination. The two front wheels 14 also are linked together by a linkage arm 108, such that turning motion of one front wheel 14 is automatically transferred via the linkage arm 108 to the other front wheel 14. The two ends of the linkage arm 108 are connected to the front wheels 14 by conventional ball and joint connections 110.

One of the front wheels 14, such as the right-front wheel, is connected by a steering bar 112 to an upper steer arm 114 via ball and joint connections 116. The upper steer arm 114 is connected by a vertical spline shaft 118 to a lower input arm 120 such that horizontal pivoting motion of the lower input arm 120 about the axis of the vertical spline shaft 118 is directly translated into corresponding horizontal pivotal movement of the upper steer arm 114. The lower end of the spline shaft 118 is pivotally connected to the lower input arm 120 to accommodate up and down movement of the lower input arm caused by the grade of the path 18. The lower input arm 120 is, in turn, bolted to the front bogie 90 via a front follower 122 and a plain spherical bearing 124.

With the foregoing front steering arrangement, it can be seen that steering of the front wheels 14 is governed by the curvature of the path 18. Thus, on a straight path 18, the front wheels 14 point straight ahead. However, when the front bogie 90 follows a turn in the path 18, causing non-linear movement of the front bogie, the lower input arm 120 is caused to pivot with respect to the bogie 90 via the plain spherical bearing 124. This pivoting motion of the lower input arm 120 is transferred via the spline shaft 118 to the upper steer arm 114 which, in turn, moves the steering bar 112 causing the right-front wheel 14 to turn in the direction of the path turn. This turning motion of the right-front wheel 14 is transferred via the linkage arm 108 to the left-front wheel 14 to provide coordinated steering of the two front wheels in unison.

Figure 16:
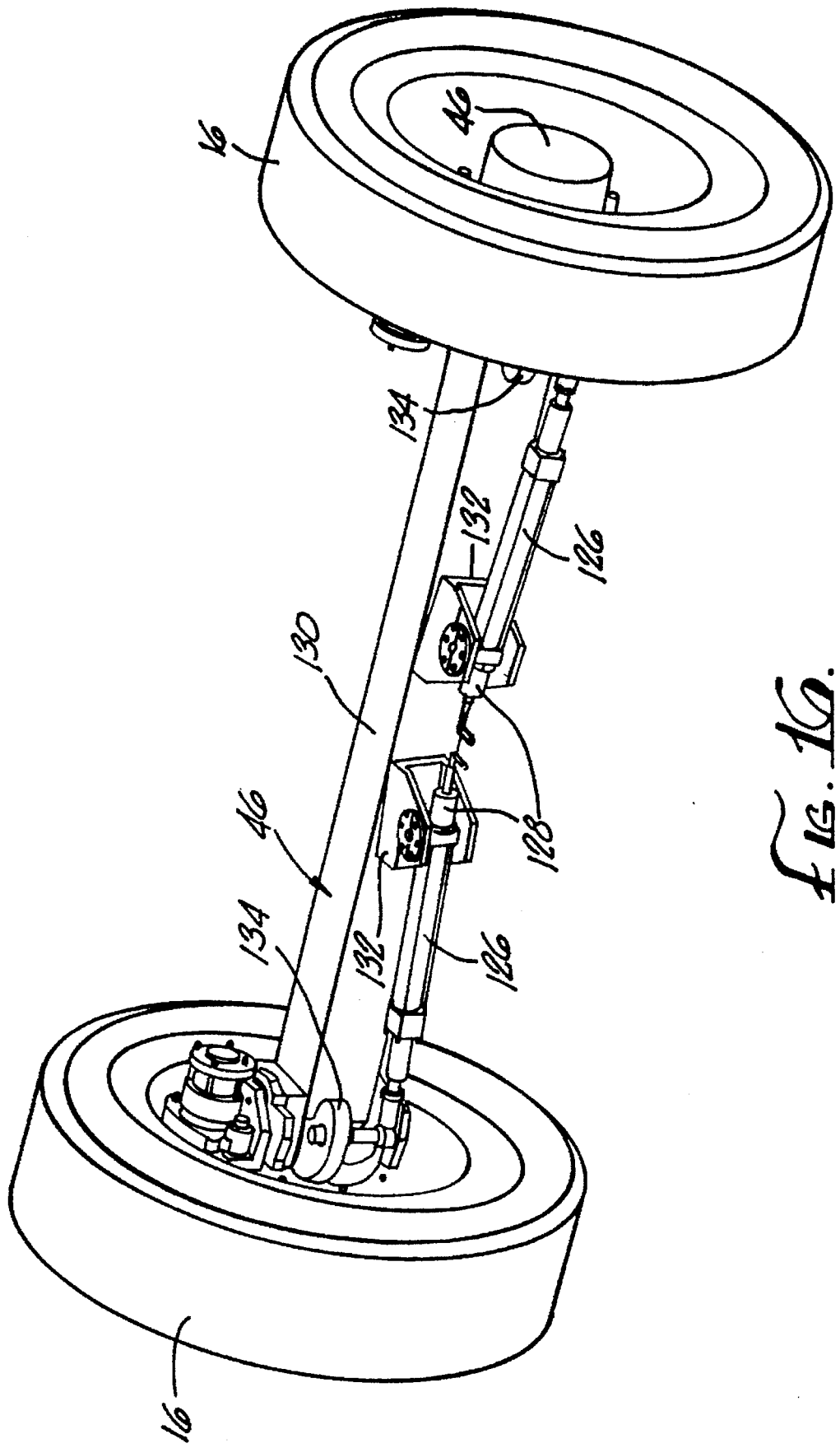
FIG. 16 is a rear perspective view of one embodiment of a rear steering mechanism of the ride vehicle.
Figure 18:
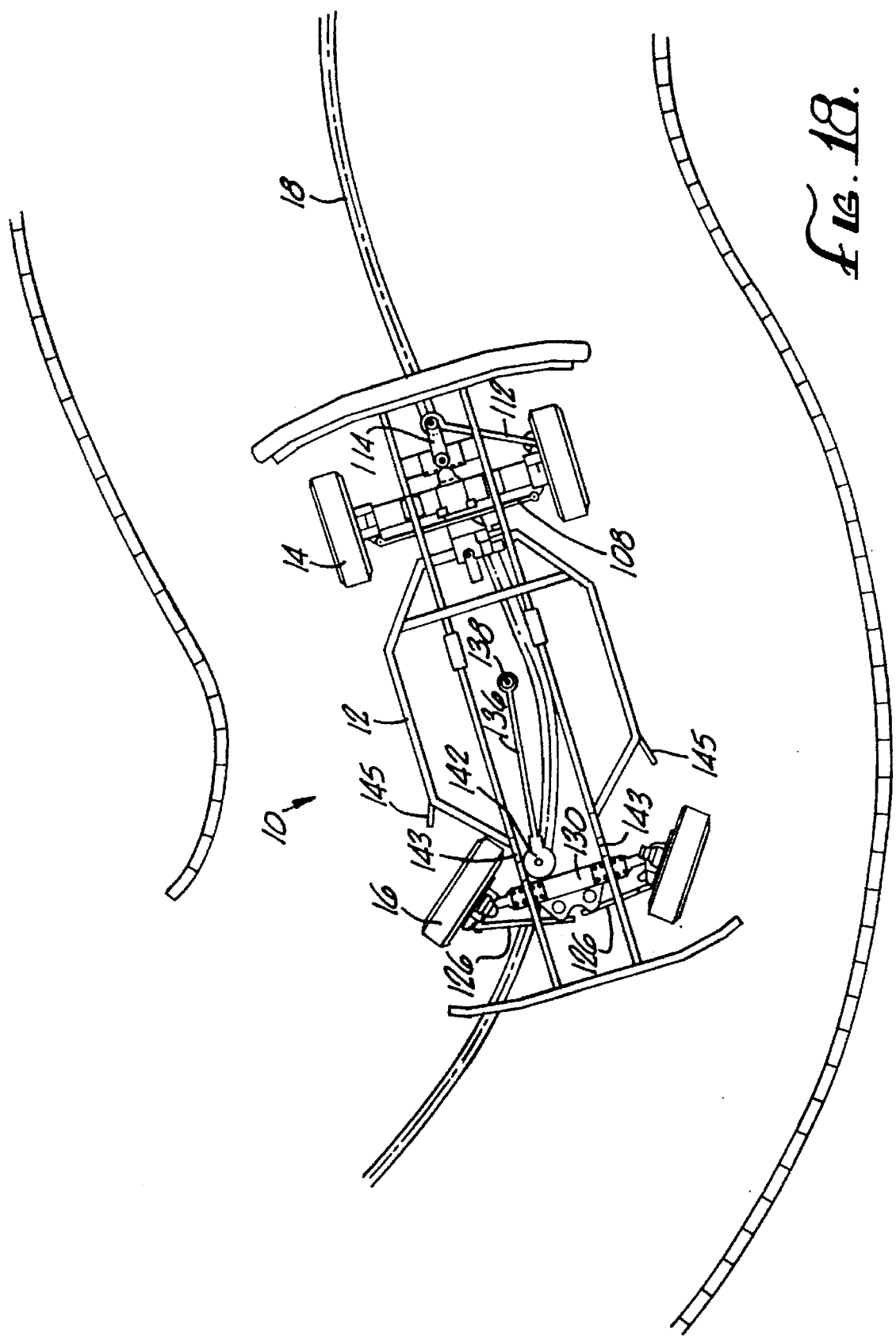
FIG. 18 is a cross-sectional plan view of the ride vehicle illustrating the lateral energy absorbing system operating in a first mode to confine the range of lateral motion of the vehicle with respect to the path to a first distance.

In one aspect of the invention, steering of the rear wheels 16 is independent of steering of the front wheels 14 to increase the versatility of motion of the ride vehicle 10. As shown in more detail in FIGS. 13 and 16, the steering of each rear wheel 16 is controlled by separate hydraulic steering servo actuators 126. These steering actuators 126 are connected to the hydraulic control system of the vehicle 10 and are controlled by the controller 40 in combination with feedback signals from sensors 128 to control the movement of the actuators 126 and, thus, the steering of the rear wheels 16. FIGS. 18 and 19 show the range of steering motion of the rear wheels 16 in more detail.

In particular, the inner ends of the steering actuators 126 are mounted to the vehicle's rear axle beam 130 by brackets 132 with pivotal connections. The outer ends of the steering actuators 126 are mounted to trunion mountings 134 at the rear axle 46 via plain bearings. The trunion mounting 134 for the actuators 126 incorporates motion in two axes to allow for build tolerances. The steering actuators 126 are controlled by the hydraulic control system through appropriate tubing.

Figure 17:
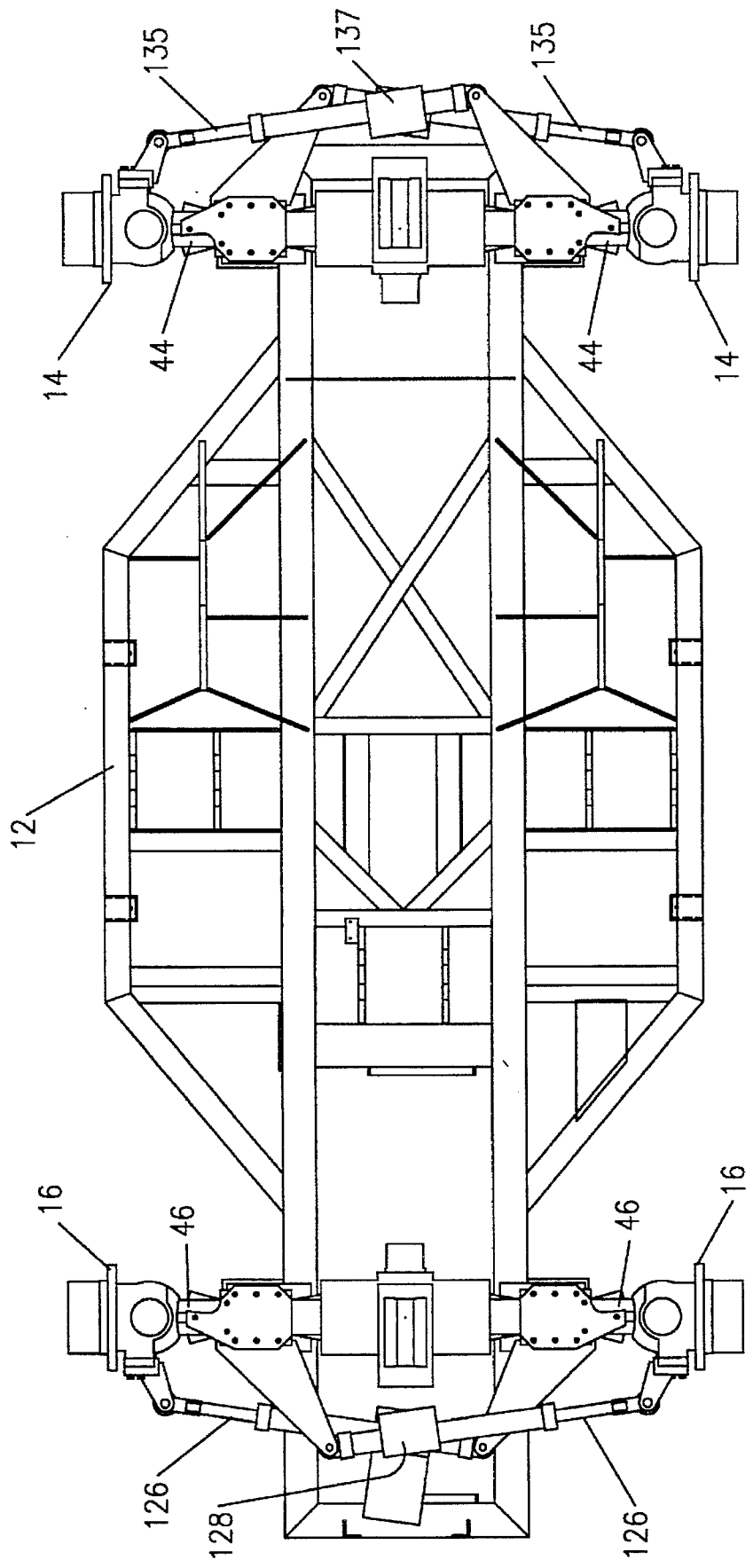
FIG. 17 is a top plan view of the chassis showing another embodiment of a steering mechanism of the ride vehicle.

In another embodiment, shown in FIG. 17, the steering of the front wheels 14 may be carried out in the same manner as the steering of the rear wheels 16, by using separate front steering servo actuators 135. The front steering actuators 135 also are connected to the hydraulic control system of the vehicle 10. These actuators 135 are controlled by the controller 40 in combination with feedback signals from sensors 137 to control the movement of the actuators 135 and, thus, the steering of the front wheels 14. Using this arrangement, the steering of the front wheels 14 is independent of the curvature of the path 18 followed by the vehicle 10.

The foregoing embodiments, which provide independent steering of the front wheels 14 and the rear wheels 16, allow a wide range of vehicle motion not otherwise possible with conventional ride vehicles, which have either had front wheel steering or rear wheel steering (but not both), or no steering capabilities at all for vehicles that are totally track dedicated. The examples of vehicle motion enabled by four-wheel steering include the simulated effect of the vehicle 10 fishtailing, such as during rapid acceleration or deceleration of the vehicle, or sliding sideways as on ice or an oil slick. The turning of corners can also be exaggerated by using four-wheel steering, which substantially enhances the general overall mobility and turning capabilities of the vehicle 10. These and other vehicle movements are described later.

FIGS. 13 and 18–19 also illustrate a lateral energy absorbing system of the vehicle which allows the vehicle 10 to move laterally with respect to the rear bogie 92 within a pre-determined tracking envelope during movement of the vehicle 10 along the path 18. In the event that the vehicle 10 transgresses the tracking envelope, the lateral energy absorbing system absorbs lateral loads and, under certain conditions, completely disables operation of the vehicle 10. In this way, the passengers 48 in the vehicle will not be subjected to unsafe accelerations, jerks or other violent movements of the vehicle beyond specified limits, to help ensure the passenger's safety.

The lateral energy absorbing system comprises a rear follower lockout actuator 136 pivotally connected to the chassis 12 by a pivot shaft 138 and to the rear bogie 92 via a spherical bearing 140 on a rear follower 142. The lockout actuator 136 is designed to operate in two distinct modes related to the degree of curvature of the vehicle's path 18. The path 18 shown in FIGS. 18–19 comprises a channel forming a roadway that allows some lateral movement of the dynamic ride vehicle 10.

The lockout actuator 136 is designed to operate in a first mode when the vehicle 10 follows a path 18 where it is permitted large rear offset, as shown in FIG. 19. In the first mode, the lockout actuator 136 is in a fully retracted position. In this fully retracted position, an energy absorbing pad 142 at the rear portion of the actuator 136 is laterally confined between two vertical plates 143 spaced apart by a first distance on the chassis 12.

The lockout actuator 136 is designed to operate in the second mode when the vehicle 10 follows a path 18 where there is a relatively narrow clearance that requires restriction of rear offset, as shown in FIG. 18. In the second mode, the lockout actuator 136 is in a fully extended position. In this fully extended position, the energy absorbing pad 142 at the rear portion of the lockout actuator 136 is laterally confined between two oppositely facing vertical blades 145 on the chassis 12 which are spaced apart by a second distance that is smaller than the first distance previously described.

In the event that the vehicle chassis 12 attempts to move laterally with respect to the rear bogie 92 by an amount that exceeds either the first distance (when the lockout actuator 136 is fully extended in the first mode, as shown in FIG. 19), or the second distance (when the lockout actuator 136 is fully retracted in the second mode, as shown in FIG. 18), then the energy absorbing pad 142 will contact either the vertical plates 143 or the vertical blades 145 on the chassis 12 to prevent further lateral movement. Moreover, when the lateral movement of the chassis 12 attempts to exceed a respective one of these distances, two piston-type sensors 147 coupled to the lockout actuator 136 will be activated to cause an E-stop and completely disable the vehicle 10.

It will be appreciated that various other systems and mechanisms may be used to guide the ride vehicle 10 along the path 18. For example, the ride vehicle 10 can be wire-guided or completely autonomous. The ride vehicle 10 also can be designed to travel along the path 18 without being physically linked to a front or rear bogie 90 or 92, or physically constrained within a predetermined tracking envelope. Thus, for example, the ride vehicle may be guided using radar, sonar or infrared guidance systems.

FIG. 20 is a block diagram that illustrates one example of a hydraulic control system for providing hydraulic power to the various actuators and other components of the ride vehicle 10. A suitable power supply tapped from the bus bar 95 drives the electric motor 32, which in turn drives the hydraulic power unit 34. The hydraulic power unit 34 is responsible for providing the energy for all of the vehicle's actuators, and to operate the hydraulic propulsion motor 36. As shown in FIG. 14, the output of the propulsion motor 36 is transferred by couplings 151 and a centering shaft 153 to a differential ratio gear box 155 to produce an output for driving the front wheels 14. The propulsion motor 36 may comprise a variable displacement hydraulic motor with a tachometer to measure the propulsion motor's output shaft rpms. This information is sent to the vehicle's controller 40 which monitors a motor overspeed condition, while stroke displacement transducers govern hydraulic displacement of the propulsion motor's pistons to provide for controlled acceleration, deceleration and velocity of the vehicle 10.

An important function of the hydraulic power unit 34 is to charge high pressure accumulators 157 with hydraulic energy. FIG. 5 shows the location of these accumulators 157 at the rear of the ride vehicle. These accumulators are used for ride vehicle propulsion, actuation of the motion base 24 and for steering of the rear wheels 16. The hydraulic power unit 34 supplies this hydraulic energy by pumping hydraulic fluid through a pressure filter 159 through a central manifold 161 and subsequently to the high pressure accumulators 157. The primary function of the high pressure accumulators 157 is to store and save energy for supply on demand to the various energy users of the hydraulic system. These energy users comprise the hydraulic motor 36, the left-front motion base servo actuator 50, the right-front motion base servo actuator 52, the rear motion base servo actuator 54, the right-rear steering servo actuator 126, the left-rear steering servo actuator 126 and the rear follower lockout actuator 136. Each of these actuators, except for the follower lockout actuator 136, has a servo valve which controls the flow of pressurized hydraulic fluid to the actuators according to a command from the controller 40.

The hydraulic control system also includes a back pressure valve 163 that maintains a predetermined amount of back pressure in a low pressure accumulator 165. The low pressure accumulator 165 is designed to store extra hydraulic fluid that may be needed by the hydraulic power unit 34 when the vehicle 10 is decelerating. An anti-cavitation valve 169, a return filter 171 and a heat exchanger 173 also are provided to complete the hydraulic control system. In addition, a cooling fan 175 and a shroud 177 direct airflow through the heat exchanger 173 and over the electric motor 32 for cooling purposes.

The hydraulic control system also is used to control operation of the vehicle's emergency/parking brakes. These brakes comprise a right-front brake 179, a left-front brake 181, a right-rear brake 183 and a left-rear brake 185. To apply the brakes 179, 181, 183, and 185, hydraulic fluid is withdrawn from the brakes through a return line to the central manifold 161 and return filter 171. This releases brake springs and applies pressure no cause full braking action. To release the brakes 179, 181, 183 and 185, hydraulic fluid is supplied to the brakes no compress the springs and remove braking pressure. Aside from emergency braking, vehicle deceleration is ordinarily perform by driving the swashplate of the propulsion motor 36 to a negative angle, thereby using the vehicle's kinetic energy to recharge the high pressure accumulators by pumping hydraulic fluid into it from the low pressure accumulator.

Control over the track 18 and all vehicles 10 currently running on the system is achieved by a controller, called the wayside interface. The wayside interface uses the power bus 97 (FIG. 11), to control vehicle power by track segment, and also radio frequency (rf) communication to interact with computers on each vehicle 10. Other forms of communication may be provided, for example, by using bus bar signals, infrared communication or the like. The vehicle computers, two per vehicle, are responsible for conducting the ride experience, which may be distinct for each vehicle 10. More details about vehicle control will be discussed further below.

As shown in FIGS. 11–12, the power bus 97 is comprised of six adjacent bus bars 95, three just left of the center of the track 18 and three just to the right of the center of the track. The left three bus bars 95 supply four hundred eighty volts in three phases for meeting each vehicle's power requirements. In addition, the power bus 97 supplies electric power than drives each vehicle's other electric elements, for example, the hydraulic power unit 34, the cooling fan 175, and peripherals, including headlights 187 and the sound module 41. The three bus bars 95 just right of center provide a ground, a twenty-four volt "go" signal and a twenty-four volt variable impedance "no-go" signal (which indicates proximity of another vehicle), all signals being specific to track segment. That is, if there is a stoppage, the wayside interface can remove the "go" signal from a track segment and cause the vehicle 10 to execute a "hold-pattern," if desired.

Figure 22:
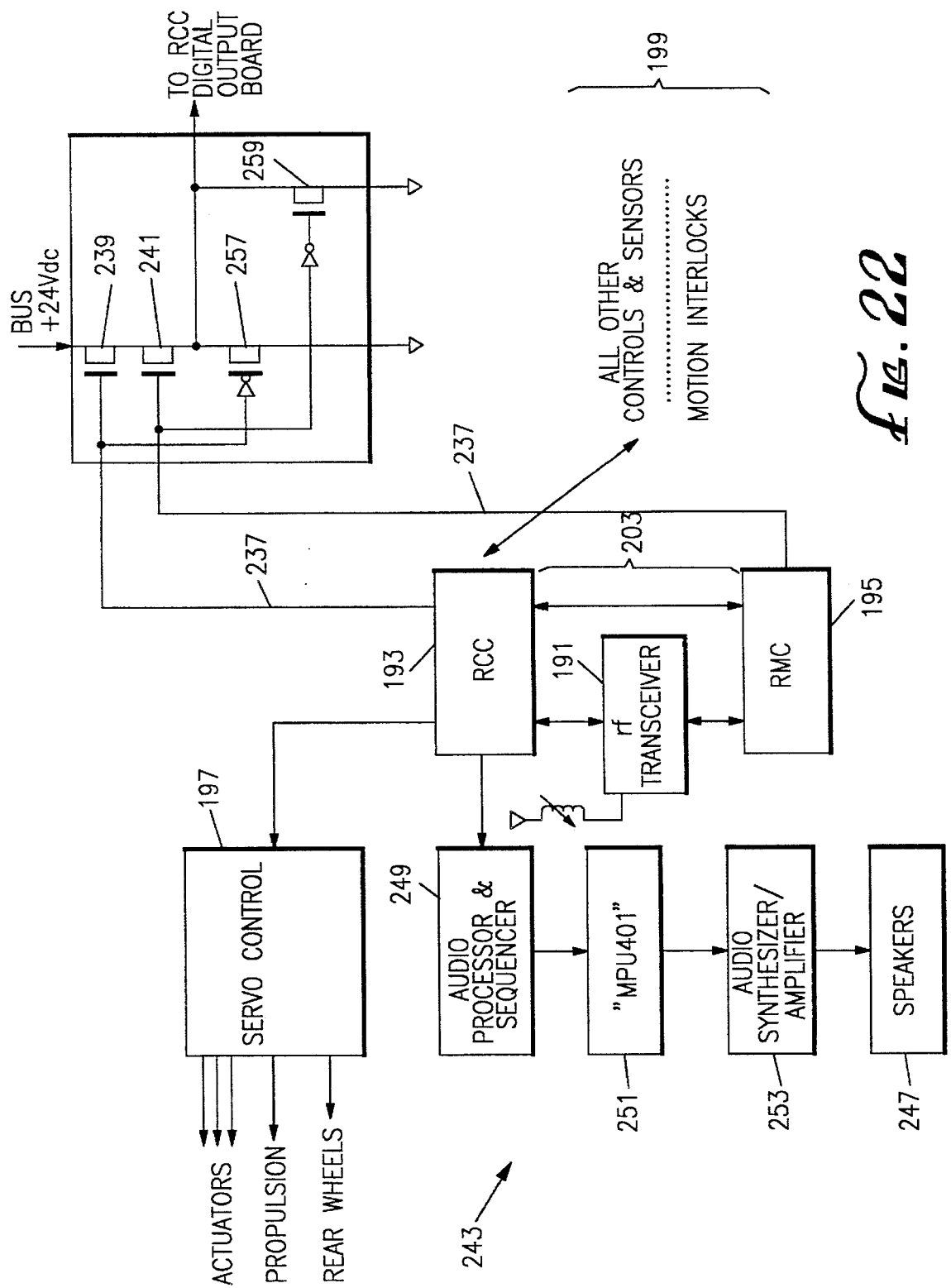
FIG. 22 is another block diagram showing further aspects of the controller.

With reference to FIG. 22, each vehicle 10 carries a radio frequency (rf) transceiver 191 and two on-board computers 193 and 195, which are identical in software, and which are utilized in parallel for safety purposes, as part of a "voting" implementation. One computer 193, called the ride control computer ("RCC"), controls the audio aspects of the ride experience and the servo-control elements 197 that control propulsion and vehicle motion. Both the RCC 193 and its companion ride monitor computer 195 ("RMC") are separately coupled to the rf transceiver 191 and to parallel sensors and bus controls utilized for vehicle control. The computers 193 and 195 communicate with each other regarding vehicle faults, action and status, by the voting scheme, and alert the wayside interface if there is a disagreement between the two computers, indicating a logic fault, or an agreement about a serious status that requires vehicle shutdown, for example, critical overheating. Depending upon the status, fault or action, both computers 193 and 195 wait a specific time period to receive a related signal from their companion computer before reaching a conclusion as to agreement or disagreement, mostly necessitated due to tolerance differences between different sensors used in parallel by each computer. Should a serious condition develop, the wayside interface automatically disables the twenty-four volt "go" signal for the particular segment of the track, or may implement the emergency stop signal.

Figure 21A:
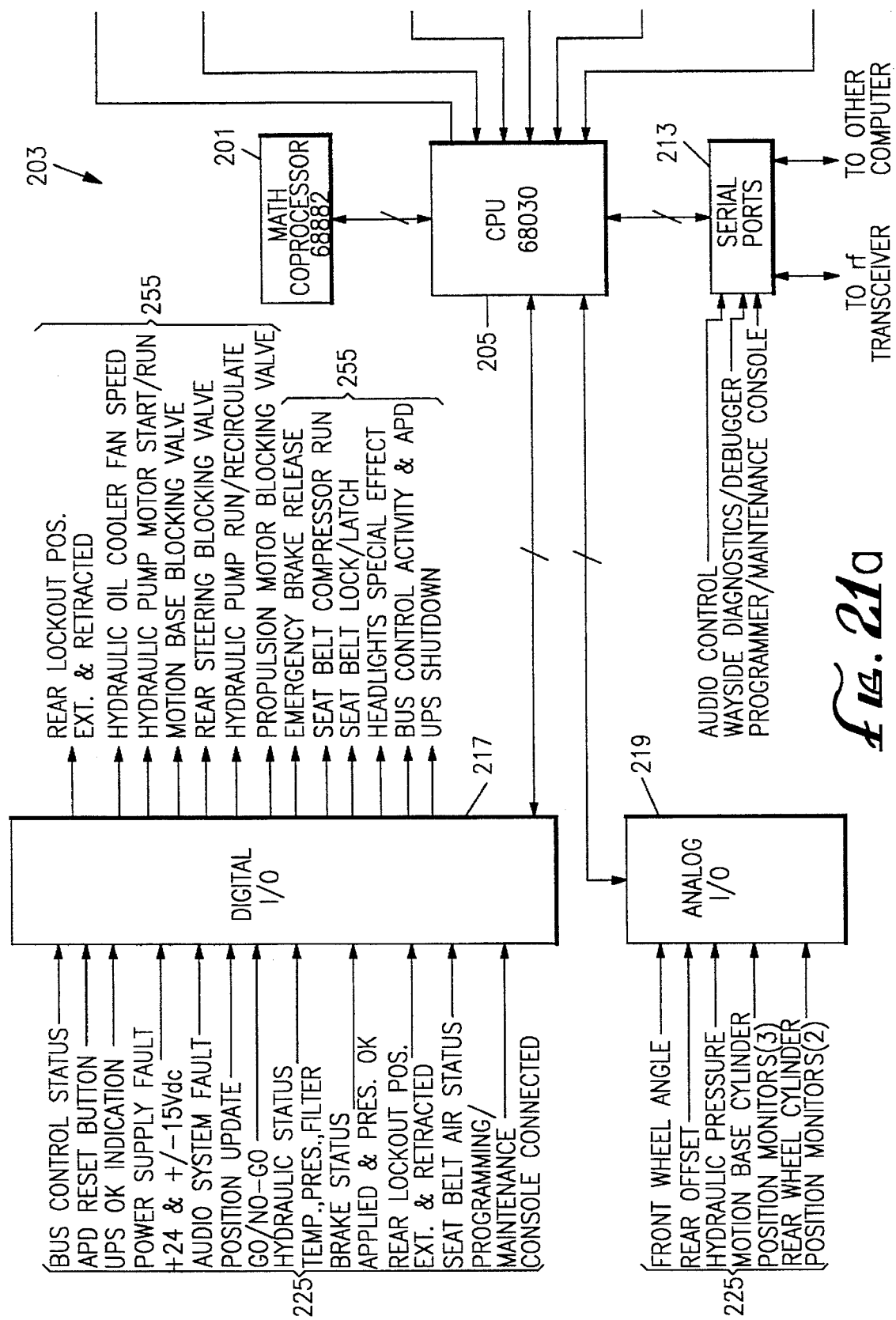
FIG. 21 is a composite drawing consisting of FIGS. 21A and 21B which together form a block diagram showing the architecture and wiring of a controller that controls various vehicle functions.

As indicated in FIGS. 21A and 21B, each computer 193 and 195 carries its own memory 189, which contains all the program information necessary to run a plurality of different ride programs, and to synchronize actions of the ride vehicle with motion of the vehicle, audio sounds, or the external environment, or sets. Each program is stored in a plurality of program portions, each consisting of commands may be both time-based and track-position-based. In this manner, the vehicle computers 193 and 195 may independently determine when and where a particular command is to be executed during the ride, and confirm this determination and resultant vehicle reaction with the other computer. Each command of each ride program includes a number of digital data values, or sub-commands, including vehicle velocity, motion base position for each of three axes, offset for the rear of the vehicle, audio cues, vehicle headlights on and off, and safety functions, including rear follower offset lock-out. As further discussed below, each ride computer 193 and 195 possesses a math co-processor 201 which performs all floating point calculations. As indicated above, both the RCC 193 and the RMC 195 are nearly identical in architecture and operate in parallel, and both are represented by the reference numeral 203 in FIGS. 21A and 21B.

FIGS. 21A and 21B generally show the architecture and wiring of one of the computers 203 (RCC and RMC) to the various sensors and controls utilized by the vehicle. Each computer has a CPU 205 that includes a microprocessor for monitoring vehicle sensors and directing communications, voting, and activities of the servo-mechanisms. A real-time clock 207 is utilized for computation of time based segments and overall system control. In addition to random access memory 209, each computer 203 features a modular $E^2PROM$ board 211 which includes memory for storing ride programs which may be accessed or edited or rewritten. In addition, the math co-processor board 201 is provided for the CPU 205 to perform floating point calculations. Each computer 203 also possesses several serial ports 213 and a set of high speed counter inputs 215 and digital and analog I/O boards 217 and 219, for monitoring vehicle sensors and providing digital control signals. However, only the RCC 193 has digital output signals from its digital I/O board 217 actually wired to provide control signal outputs. Lastly, servo-mechanism control is supplied by a servo-control board 221 having servo-outputs and feedback inputs, collectively designated by the reference numeral 223. The servo-control board 221 is preferably installed only in the RCC 193, and linear sensors are used to provide analog signal inputs to both computers, to enable them to monitor the response of the various mechanical elements of the vehicle.

Both computers 193 and 195 are coupled to the bus controls 239, 241, 257 and 259, to thereby selectively disable digital control of the vehicle's mechanical elements, such as the motion base, in the event of a vehicle shut-down. The bus controls are coupled to the digital I/0 board 217 of the RCC 193, such that if either computer disables digital control, the RCC 193 is no longer capable of directing actuation of mechanical elements.

The front bogie of the ride vehicle mounts two of the position sensors 99 on each side, for a total of four track position proximity-type update sensors. These sensors sense the proximity of path-mounted position markers, each consisting of a number of metal targets 101 mounted within the track, just below the front bogie, as seen in FIG. 9.

In addition to these proximity sensors 99, two idler wheels 103 of the front bogie are used as redundant incremental longitudinal position sensors, in the form of rotary encoders. These encoders, each a quadrature sensor, provide 360-pulse-per-rotation 90-degree phase-shifted output signals, which are coupled to a velocity polarity sensor (which detects forward and reverse velocity) and to high-speed counter inputs 215. These inputs 215 are read and formatted to a total distance measurement, in feet, by the computerized vehicle-control system 40, and are loaded into a distance register. Thus, the ride vehicle 10 keeps track of incremental distance using the idler wheels 103, and uses the update sensors 99 to detect the presence of the path-mounted position markers to detect and correct errors in the tracked position of the ride vehicle. A logic error is ascertained by the controller 40 if position errors exceed a relatively small quantity, or if the counter inputs 215 differ by more than a predetermined amount.

The idler wheels 103 are utilized instead of a tachometer, which may be subject to error occasioned by slippage and wear of the wheels 14 of the ride vehicle 10. The high speed counter inputs 215 are reset each time that they are read by the CPU 205, and the incremental position measurement is expected to be sufficiently accurate that the position markers may be spaced at great distances, for infrequent detection and update of the incremental position measurements.

Each vehicle command stored in each computer's memory 189 may also include audio cue information. In one embodiment, numerous sounds can be generated by the vehicle 10, including different engine pitches, screeching tires and brakes. It will be appreciated that various other sounds can be generated as desired to create a particular audio effect. These sounds are directed to, and are actually produced by, speakers 247 located below the passengers seats to simulate sounds that emanate from the vehicle, including from the engine compartment and the wells of the vehicle's wheels 14 and 16. In addition to the speakers 247 on the vehicle 10, other speakers (not shown) also may be placed at strategic locations along the path 18 followed by the vehicle. As illustrated in FIG. 22, the RCC 193 is coupled to an audio processor and sequencer 249 to which it feeds the audio signal information used to generate vehicle and other sounds associated with the particular ride experience.

The actual sounds and actions reproduced by the vehicle 10 are created during a programming state, in which a programmer plugs a programming console (not shown) into the vehicle, and uses the console to direct the vehicle's activities. These programmed sounds are initially time-based, and are recorded in digital format, much as music would be recorded by a tape machine. Once the time-based actions are generated, they may be sequenced by defining recorded actions to occur at a specific position along the path 18. As indicated above, additional time-based and position-based routines are preferably configured to be run when the vehicle 10 is in a "hold-pattern," that is, when the vehicle is stopped, the vehicle may implement a motion sequence where only the motion apparatus 24 of the vehicle 10 is used, or certain audio sounds, such as engine-revving, are generated, etc. it is emphasized that vehicle actions are recorded in a digital format, preferably using a disk operating system ("DOS"), and stored in a software file which may be readily sequenced and edited. Once a complete ride program has been generated, it is electrically loaded by the programming console via one of the serial ports 213 into the E³PROM 211 of each computer's memory 189 for implementation and use as directed by the wayside interface.

In accordance with the invention, the amusement ride vehicle 10 is capable of enhancing the sensation of vehicle movement that is actually taking place, as well as providing the passengers with realistic moving ride vehicle experiences that are not actually happening. Even when travelling along a path 18 without scenery, props, audio or other special effects, the ride vehicle 10 can be made to execute several motion patterns, or sequences of motion patterns. These patterns can be programmed into the controller 40, or alternatively, provision can be made for motion control in response to manual control of the vehicle 10 or other manual command. In the context of the present invention, a motion pattern is defined as a sequence of movements by the motion apparatus 24 and its corresponding actuators 50, 52, 54 and 126 and/or 135 that cause the body 22 to move in a repeatable path in relation to the chassis 12, and which may occur while the chassis 12 is stationary or in motion along the path 18. The resulting motion pattern gives the passengers 48 a sensation that the vehicle 10 is undergoing directional maneuvers or surface conditions which may or may not actually be present. FIGS. 23-34 illustrate examples of some of the basic motion patterns executed by the ride vehicle 10. These motion patterns will now be described.

Figure 23:
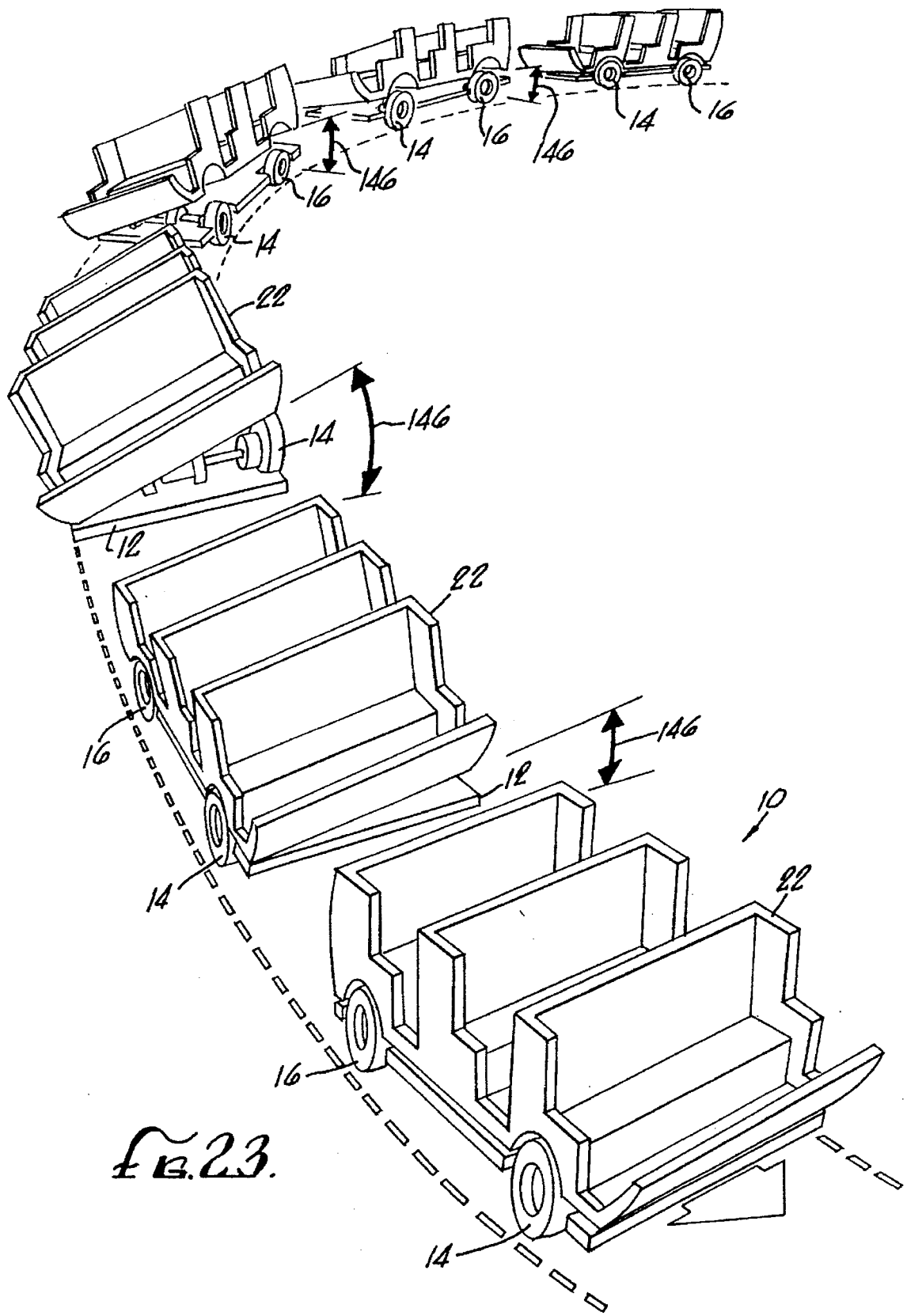
FIG. 23 is a perspective view of the ride vehicle showing it in various stages of turning a corner with outward body roll.

FIG. 23 shows a motion pattern in which the ride vehicle 10 is in various stages of turning a corner 144. The sensation of turning the corner 144 is exaggerated by outward body roll relative to the chassis 12. This is accomplished by rotational acceleration of the body 22 with respect to the chassis 12 about the roll axis of the vehicle 10. Prior to initiating the turn, the vehicle 10 is moved forward along the path 18 with the body 22 in a substantially level position with respect to the chassis 12. As the wheels 14 or 16 are turned in a direction to follow the curved path 18, the body 22 is simultaneously accelerated about the roll axis, in an outward direction with respect to the curved path 18, as indicated by the motion arrows 146. The degree of outward body roll is increased until it reaches a maximum at the point where the vehicle is substantially at the apex of the curved path 18. This has the effect of exaggerating and enhancing the passenger's sensation of the speed and sharpness of the corner 144, thereby supplementing the normal sensations that would be experienced by the passenger when turning a corner in the absence of the outward body roll. As the vehicle 10 begins to come out of the turn, the body 22 is rolled back inwardly until it reaches a substantially level position with respect to the chassis 12, at the end of the turn.

During execution of this or other motion patterns, further motion patterns can be superimposed. The following three motion patterns are examples of such further motion patterns.

The motion pattern described above simulates the gross movements of a vehicle turning sharply at a high rate of speed. In a conventional automobile, such a maneuver normally would be accompanied by an effect called "wheel hopping". Wheel hopping occurs under high lateral loads when tires alternately skid across the pavement and then grab the pavement in quick succession. This wheel hopping effect can be simulated very closely in the ride vehicle 10 by appropriate actuation of the motion base servo actuators 50, 52 and 54. These actuators can be manipulated to cause up and down movement of the body 22 during the turning of the corner 144 which simulates the wheel hopping sensation.

Another effect which can be added to various motion patterns, or used alone, simulates the feeling of the texture or roughness of a road. Providing the servo actuators 50, 52 and 54 with a noise signal while the chassis 12 is in motion produces the perception of road roughness. The road roughness illusion is improved by making the frequency of the noise proportional to the vehicle's actual or simulated speed. The degree of roughness, simulating for example the difference between a gravel road and a stony riverbed, is simulated by the amplitude of the noise.

If the dynamic ride vehicle 10 is intended to simulate the motion of an animal, another effect which can be added to various motion patterns simulates the gait of the animal as it would be perceived by a rider. A rough four phase motion could be programmed to simulate a trot, while a smoother two phase motion would simulate a gallop.

Figure 24:
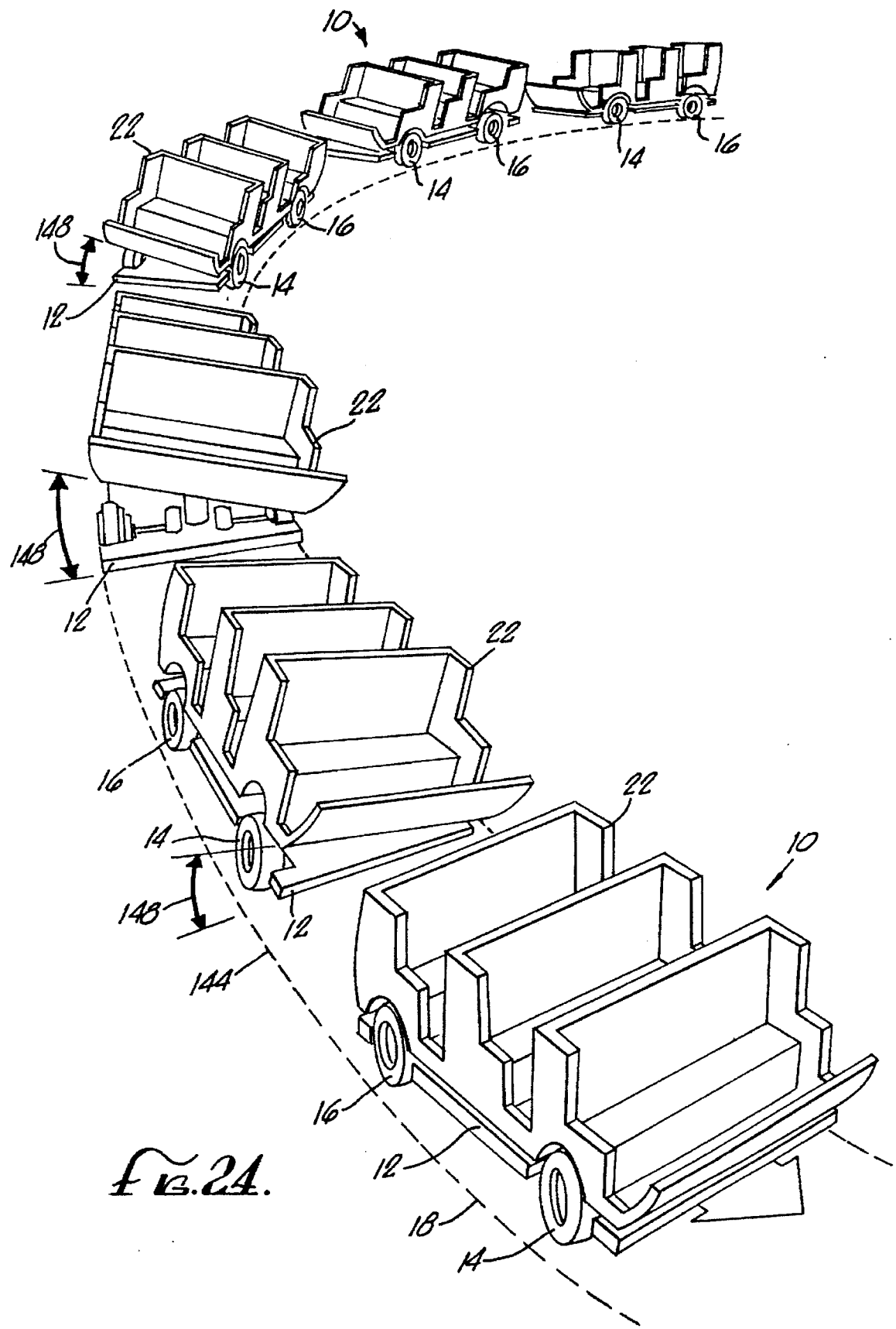
FIG. 24 is a perspective view of the ride vehicle showing it in various stages of turning a corner with inward body roll.

FIG. 24 shows the ride vehicle 10 in various stages of turning a corner 144 with an inward body roll. In this motion pattern, the vehicle 10 is moved along the path 18, prior to initiating the turn, with the body 22 in a substantially level position with respect to the chassis 12, similar to the motion pattern described above in connection with FIG. 23. As the wheels 14 and 16 are turned in a direction to follow the curved path 18, the body 22 is simultaneously accelerated about the roll axis in an inward direction with respect to the curved path 18, as indicated by the motion arrows 148. The degree of inward rolling movement of the body 22 reaches a maximum point at the apex of the curved path 18. This has the effect of subduing and minimizing the passenger's sensation of the speed and sharpness of the corner 144, much like turning a corner on a banked road. As the vehicle 10 begins to steer out of the turn, the body 22 is then rolled back outwardly until it reaches a relatively level position with respect to the chassis 12, at the end of the turn.

Figure 25:
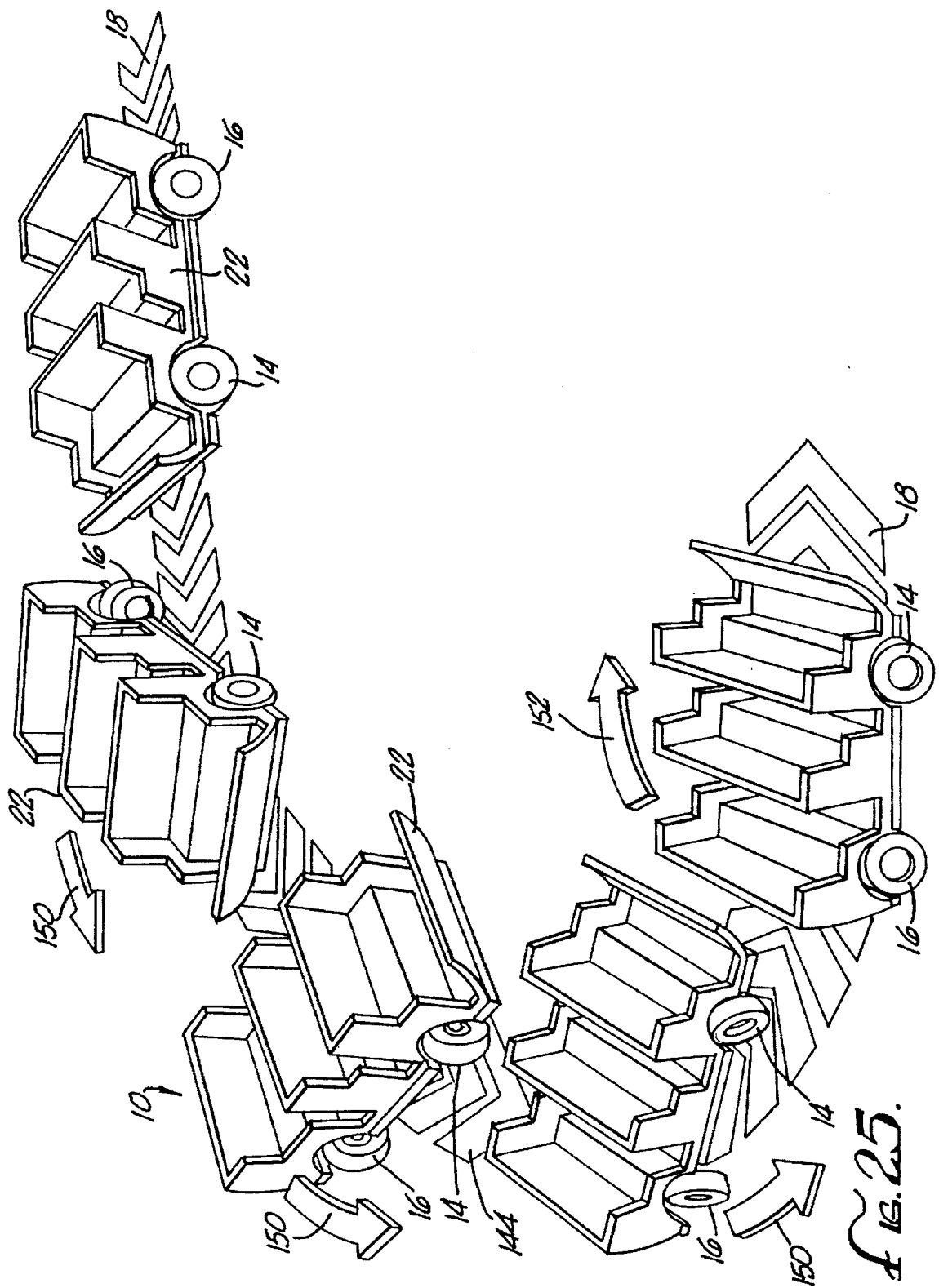
FIG. 25 is a perspective view of the ride vehicle showing it in various stages of turning a corner with four-wheel steering.

FIG. 25 shows another motion pattern in which the ride vehicle 10 is in various stages of turning a corner 144. In this motion pattern, however, the turning sensation experienced by the passengers is exaggerated by four-wheel steering, rather than by outward body roll as shown in the motion pattern of FIG. 23. Accordingly, the vehicle 10 is moved forward along the path 18, and the body 22 is kept in a substantially level position with respect to the chassis 12 at all times throughout the turn. As the vehicle 10 is about to enter the curved path 18 corresponding to the turn, the rear wheels 16 of the vehicle 10 are steered away from the direction of the turn. This causes the back end of the vehicle 10 to accelerate and swing onwardly during the turn, as indicated by the motion arrows 150, to give the simulated effect of sliding. Throughout this motion pattern, the front wheels 14 substantially follow the curvature of the turn 144. After the vehicle 10 passes the apex of the turn 144, the rear wheels 16 are steered back inwardly into the turn. This causes the back end of the vehicle 10 to accelerate and swing inwardly, as indicated by the motion arrow 152, and simulates the effect of further sliding of the vehicle 10 as it comes out of the turn 144. At the end of the turn 144, the wheels 14 and 16 can be made no sneer straight ahead in preparation for the next motion pattern.

Figure 26:
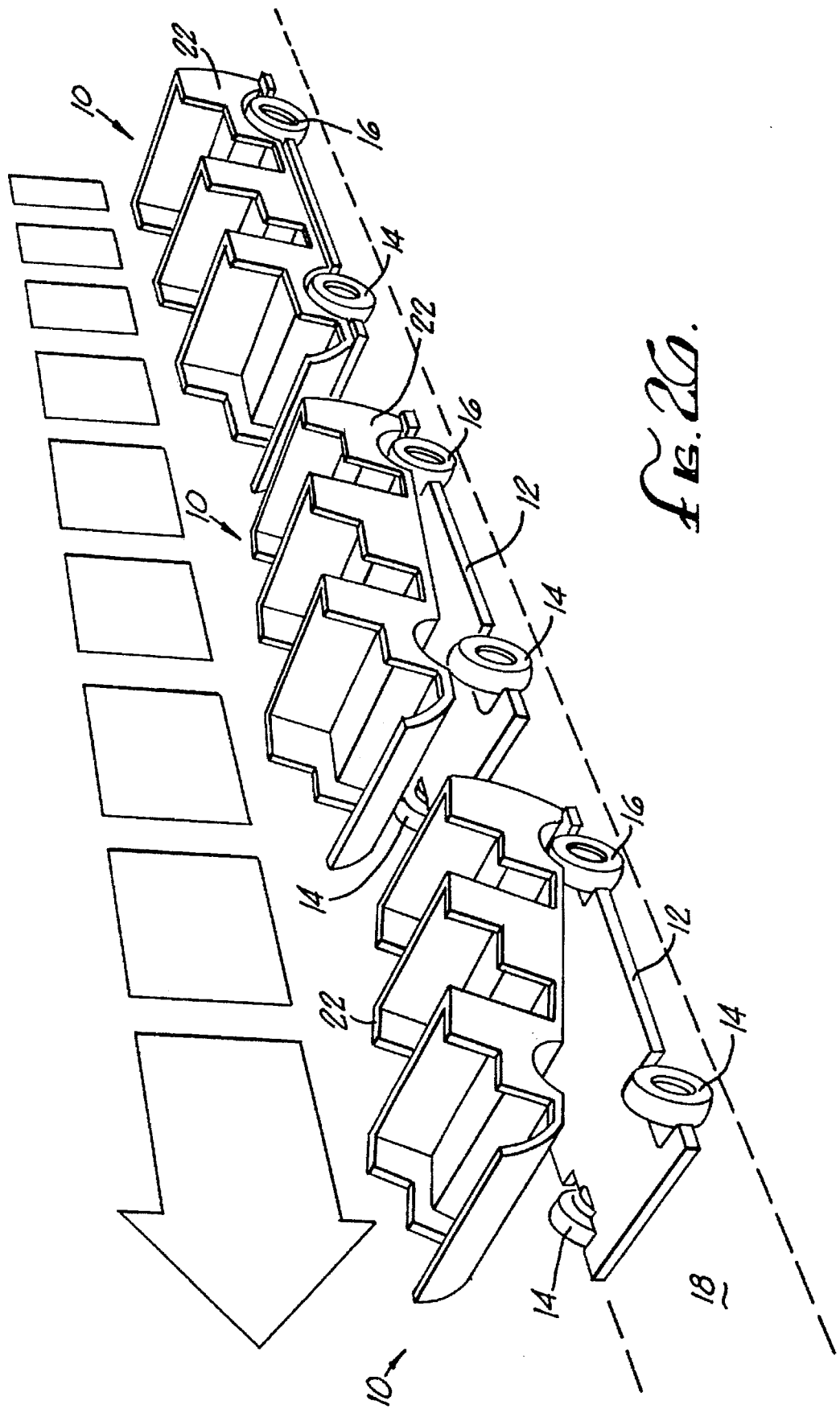
FIG. 26 is a perspective view of the ride vehicle showing it in various stages of forward acceleration with rearward body pitch.

FIG. 26 shows the ride vehicle 10 in various stages of forward acceleration, utilizing rearward body pitch to exaggerate the sensation of speed during acceleration. This is accomplished by rotational acceleration of the body 22 with respect to the chassis 12 about the pitch axis of the vehicle 10. In this motion pattern, the vehicle 10 is accelerated quickly in the forward direction along the path 18. As soon as the vehicle 10 begins accelerating, the body 22 is quickly pitched backward by accelerating and raising the front end about the pitch axis. This body motion has the effect of exaggerating and enhancing the passenger's sensation of the acceleration of the vehicle 10 beyond the normal acceleration experienced in the absence of such body-pitching motion. When the vehicle 10 has substantially finished its forward acceleration, the body 22 is gradually pitched forward by dropping the front end until it reaches a substantially level position with respect to the chassis 12. It will be understood that forward acceleration of the vehicle 10 may occur from a standing start or while the vehicle is already in motion.

Figure 27:
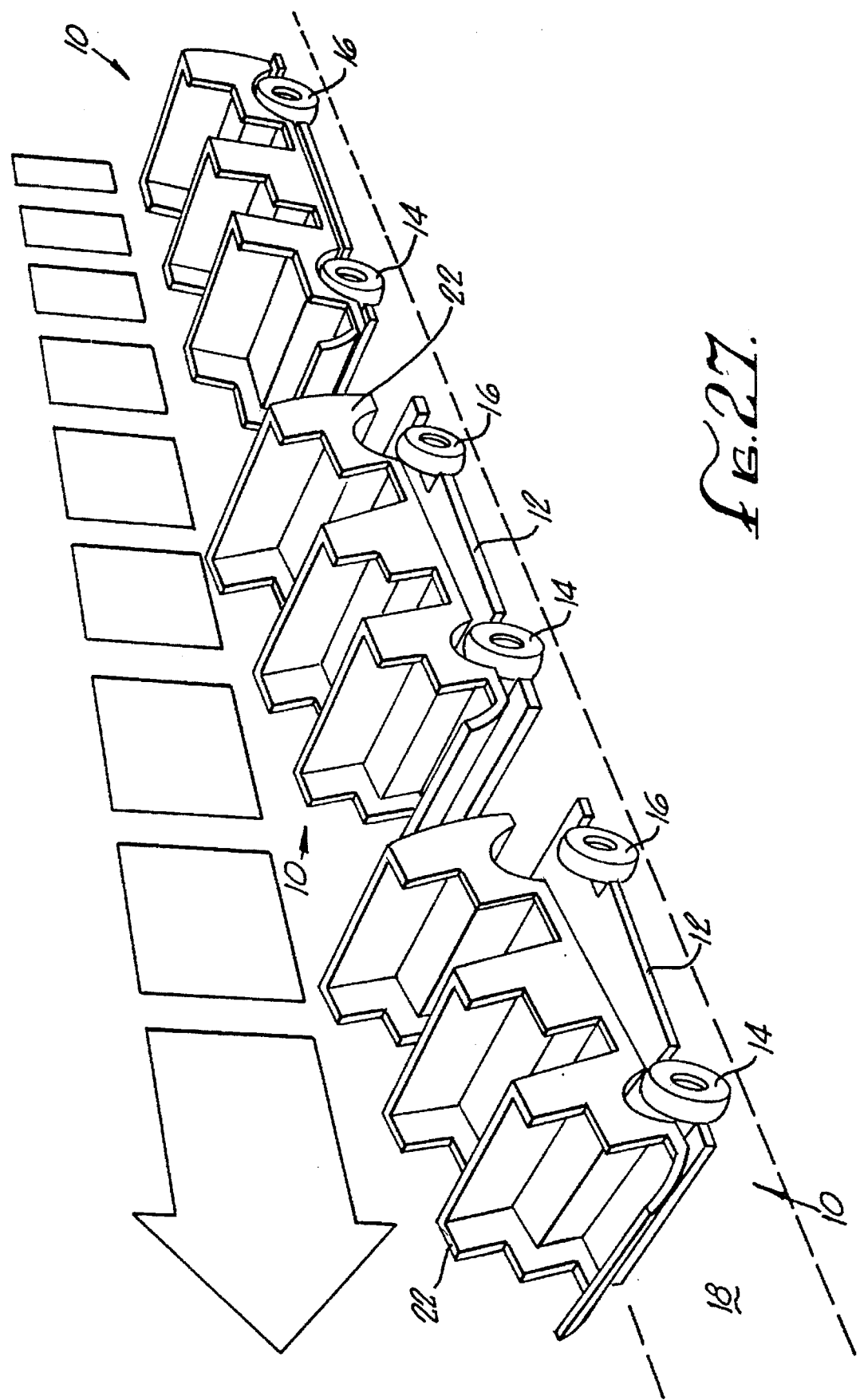
FIG. 27 is a perspective view of the ride vehicle showing it in various stages of decelerating or braking with forward body pitch.

FIG. 27 shows the ride vehicle 10 in various stages of decelerating or braking, as exaggerated by forward body pitch. In this motion pattern, as the vehicle 10 moves in a forward direction along the path 18, the vehicle is quickly decelerated. As soon as the vehicle 10 begins decelerating, the body 22 is quickly pitched forward with respect to the chassis 12 by accelerating and raising the rear end about the pitch axis. When the vehicle 10 has stopped or otherwise finished decelerating, the body 22 is quickly pitched backward with respect to the chassis 12 by lowering the rear end to a substantially level position with respect to the chassis. This motion of the vehicle 10, as enhanced by forward pitching of the body 22, substantially exaggerates and enhances the passenger's sensation of the braking of the vehicle.

In the motion patterns described above in connection with FIGS. 23–24 and 26–27, it will be understood that the acceleration, speed and extent to which the body 22 is rolled inwardly or outwardly during a turn, or pitched rearwardly or forwardly during acceleration or deceleration of the vehicle 10, will govern the simulated degree of vehicle motion sensed and experienced by the passengers. The quicker and further the body 22 is rolled and pitched, the more exaggerated will be the sensation of motion, and vice versa.

Figure 28:
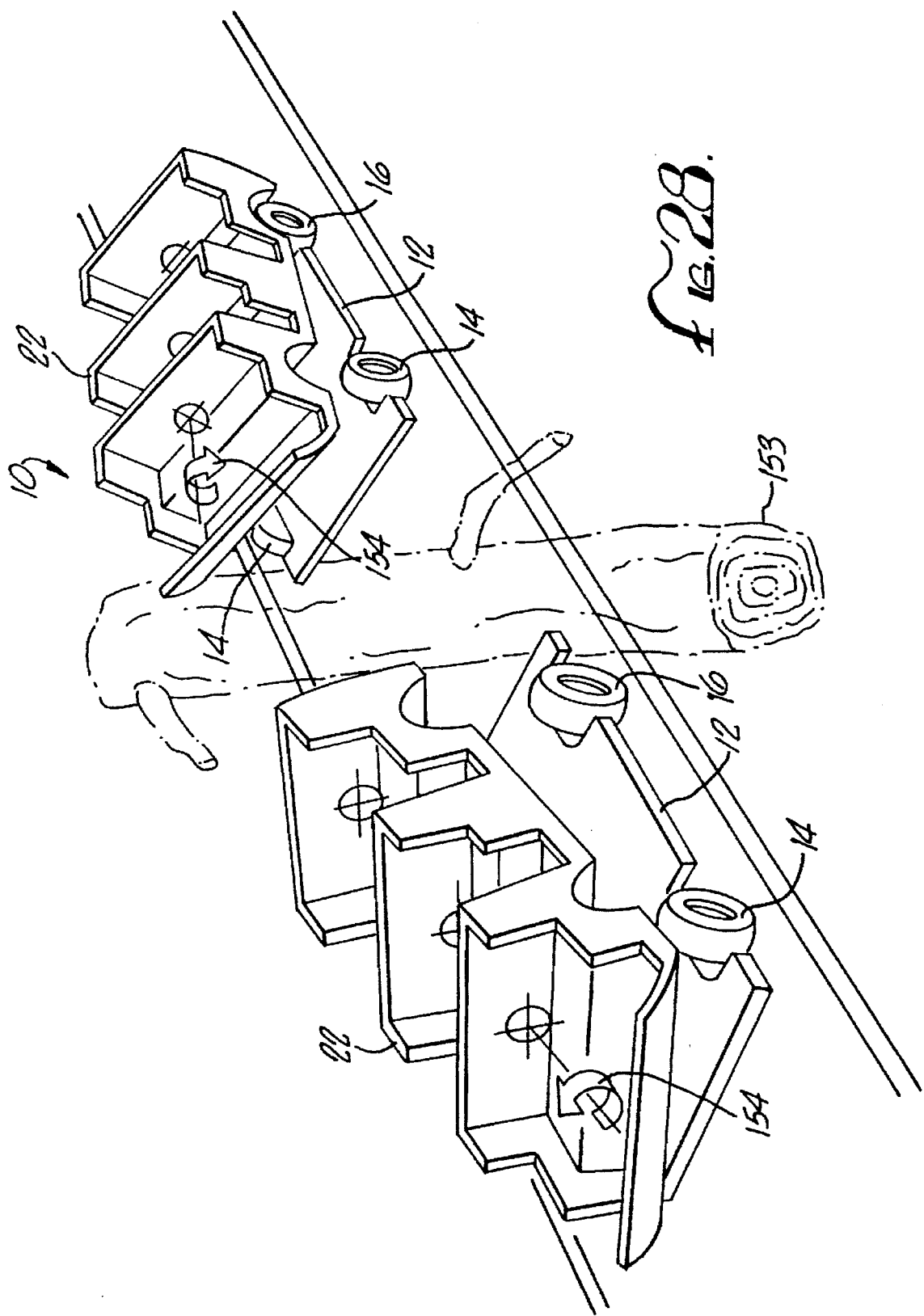
FIG. 28 is a perspective view of the ride vehicle showing it moving in a forward direction with body motion to simulate the effect of travelling over a bump or other object.

FIG. 28 shows a motion pattern in which the ride vehicle 10 is moving in a forward direction with body motion designed to simulate the effect of traveling over a bump or other object. This motion pattern involves moving the vehicle 10 forward along the path 18 to a point corresponding to the location of an imaginary object 153. When the vehicle 10 reaches this point, the body 22 is quickly pitched backward and then forward by causing the front end of the body to quickly raise up and then down with respect to the chassis 12 as the front of the vehicle passes the point corresponding to the location of the imaginary object 153. This simulates the effect of the front wheels 14 travelling over the object. After waiting for an elapsed distance travelled by the vehicle 10 that corresponds to the rear of the vehicle 10 reaching the imaginary object 153, the body 22 is quickly pitched forward and then backward by causing the rear end of the body to quickly raise up and then down with respect to the chassis 12 as the vehicle continues to move forward passing the imaginary object 153. This simulates the effect of the rear wheels 16 traveling over the object 153. Depending upon the type of imaginary object to be "run over," the pitching motion of the body 22 described above may be combined with outward body roll from one side to the other, as may be desired to achieve a particular effect. An example of body rolling from side to side is shown by the motion arrows 154 of FIG. 28.

A further aspect of the motion pattern illustrated in FIG. 28 involves pitching the body 22 forward and backward for several cycles after the vehicle 10 has passed the imaginary object 153. This gives the passengers the sensation normally experienced after a vehicle travels over an actual object 153. Thus, as the distance between the vehicle 10 and the imaginary object increases, the amplitude of the pitching motion is decreased until the body 22 is returned to a substantially level position with respect to the chassis 12. The degree of body-pitching motion and the corresponding number of cycles and amplitude can be varied, depending upon the size of the object and the ride experience to be conveyed.

Figure 29:
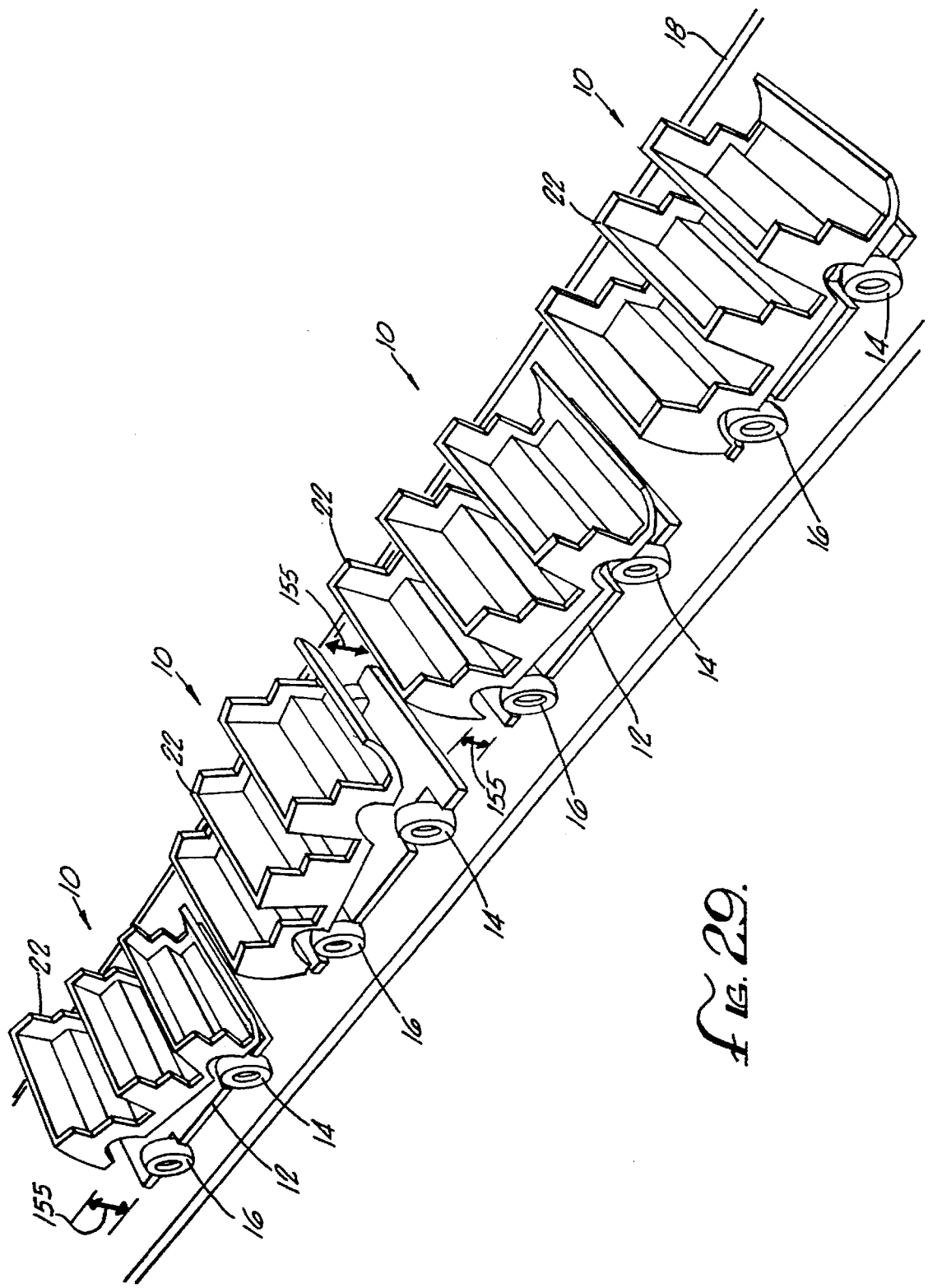
FIG. 29 is a perspective view of the ride vehicle showing it moving in a forward direction with body motion to simulate the effect of travelling over a dip or ditch.

FIG. 29 shows the ride vehicle 10 moving in a forward direction with body motion designed to simulate the effect of traveling over a dip or ditch. In this motion pattern, the vehicle 10 is moved forward to a point corresponding to the location of the imaginary dip. When the vehicle 10 reaches this point, the rear end of the body 22 is raised up and then dropped back down as the vehicle passes the point corresponding to the location of the imaginary dip. This body motion simulates the effect of the front wheels 14 entering the dip. After waiting for an elapsed distance travelled by the vehicle 10 that corresponds to the rear of the vehicle 10 reaching the imaginary dip, the front end of the vehicle is raised up and then moved back down as the vehicle continues to move forward passing the imaginary dip. This body motion simulates the effect of the rear wheels 16 traveling through the dip. Hence, the total experience conveyed by this motion pattern, indicated by the motion arrows 155, is the simulated effect of going over a dip that is not actually present in the path 18 followed by the vehicle 10.

In one aspect of the foregoing motion pattern, the forward and backward pitching motion of the body 22 is continued for several cycles after the vehicle 10 passes the imaginary dip. As discussed above in connection with the motion pattern involving the simulated effect of driving over an imaginary object, this continuation of the pitching motion gives the passengers the sensation of being in a conventional vehicle having shock absorbers that dampen the vehicle's motion after traveling over the dip. Thus, as the distance between the vehicle 10 and the imaginary dip increases, the amplitude of the pitching motion of the body 22 with respect to the chassis 12 is decreased until the body is returned to a substantially level position at a predetermined distance from the imaginary dip.

Figure 30:
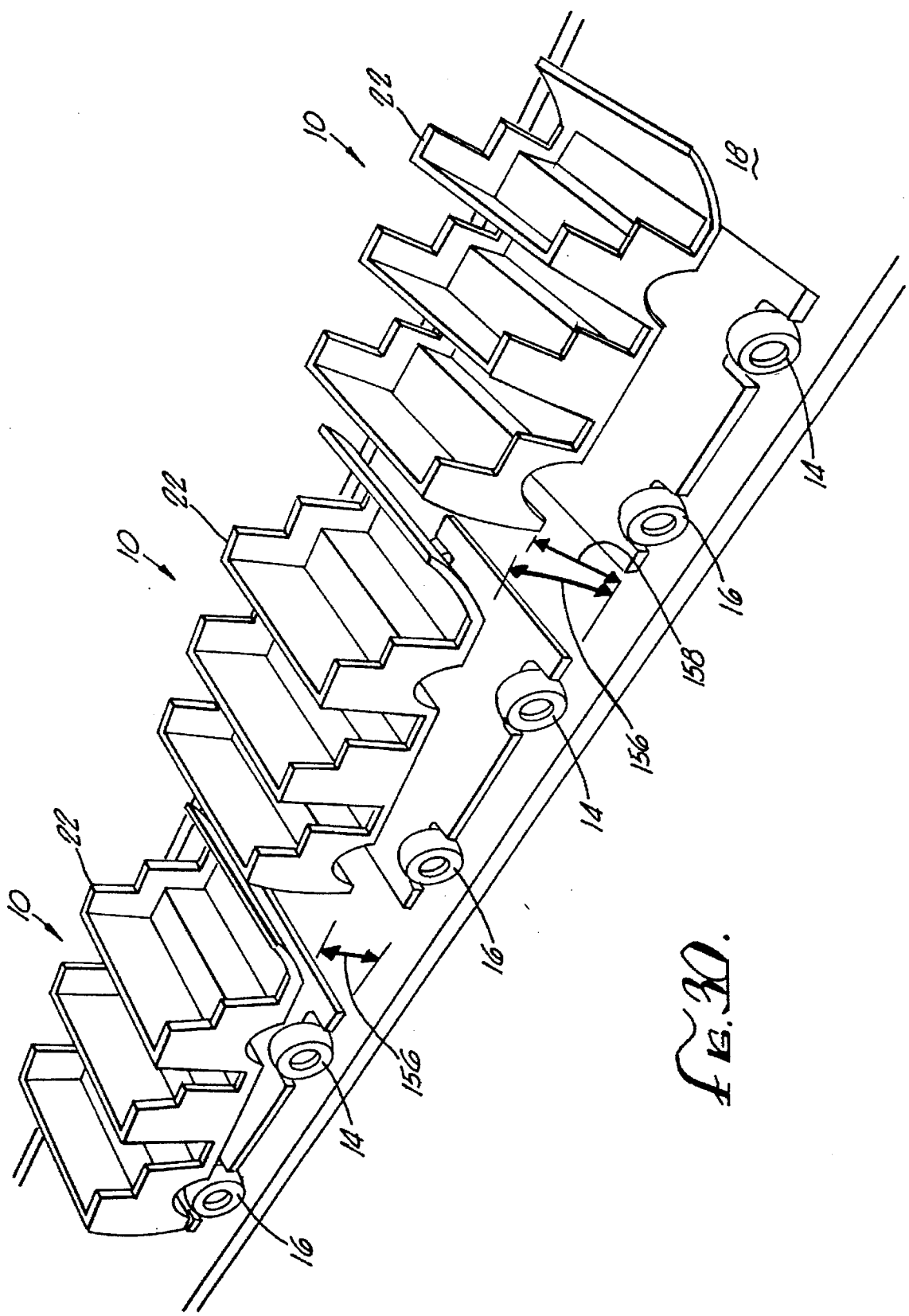
FIG. 30 is a perspective view of the ride vehicle showing it moving in a forward direction with body motion to simulate the effect of climbing a hill.

FIG. 30 shows the ride vehicle 10 moving in a forward direction with body motion designed to simulate the effect of climbing a hill. In this motion pattern, as the vehicle 10 moves in a forward direction along the path 18, the body 22 is pitched backward by accelerating and raising the front end about the pitch axis, as indicated by the motion arrow 156. The body 22 is kept in this pitched position, and then both the front and rear end are raised together as the imaginary hill is climbed. Finally, the front end is kept at a fixed, elevated position while the rear end of the body 22 is raised until it reaches a position substantially level with respect to the chassis 12 at the end of the climb, as shown by the motion arrow 158.

Figure 31:
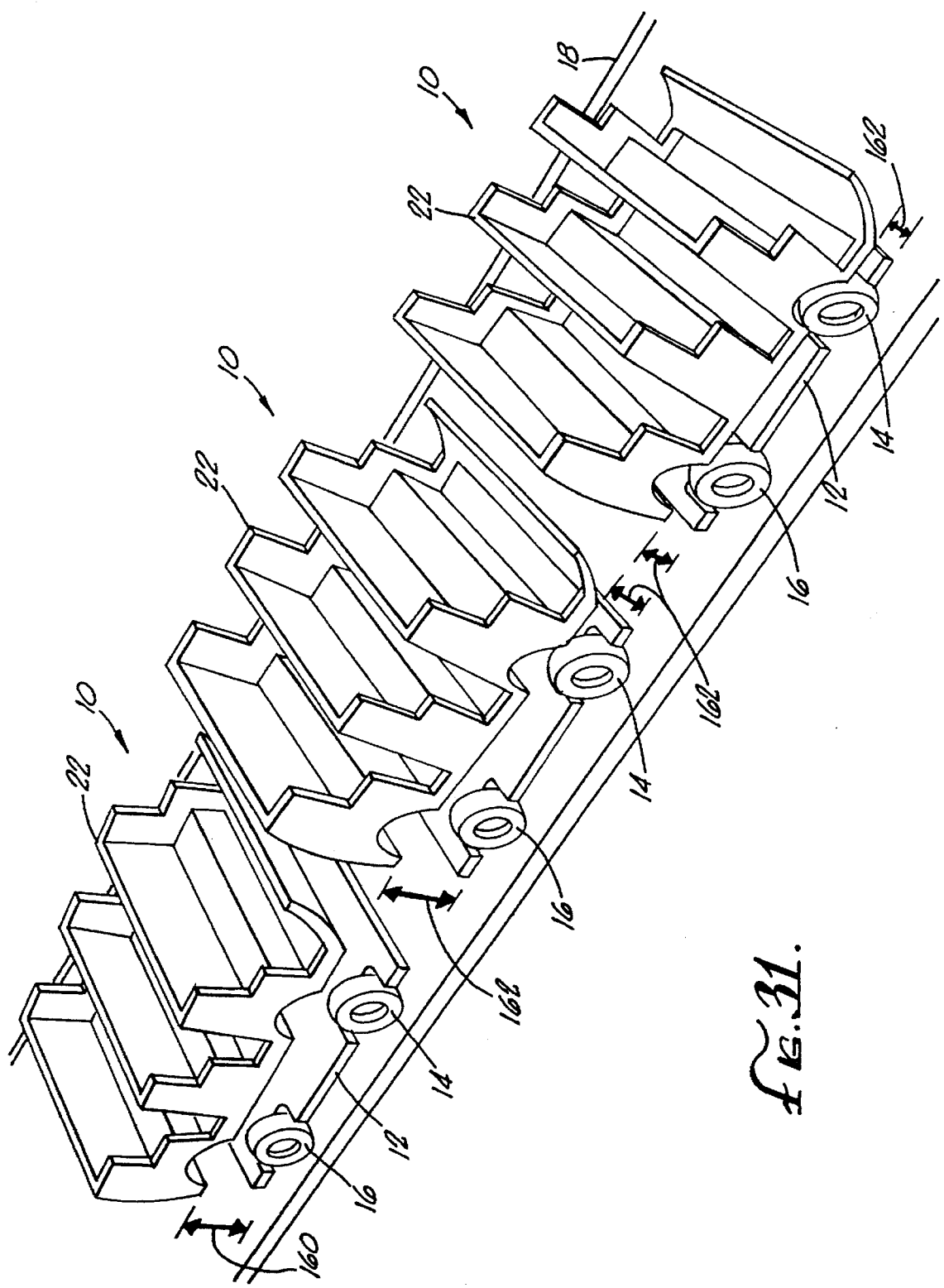

FIG. 31 shows the ride vehicle 10 moving in a forward direction with body motion designed to simulate the effect of descending a hill. This motion pattern, which is essentially the reverse of the motion pattern of FIG. 30, involves moving the vehicle 10 forward along the path 18 with the body 22 in a substantially horizontal but elevated position with respect to the chassis, as indicated by the motion arrow 160. The imaginary hill is descended by initially pitching the body 22 forward by accelerating and lowering the front end about the pitch axis. The body 22 is kept in this pitched position as the imaginary hill is descended, while both the front and rear end are lowered together, as indicated by the motion arrows 162. At the bottom of the imaginary hill, the rear of the body 22 is dropped down until in reaches a position substantially level with respect to the chassis 12.

Figure 32:
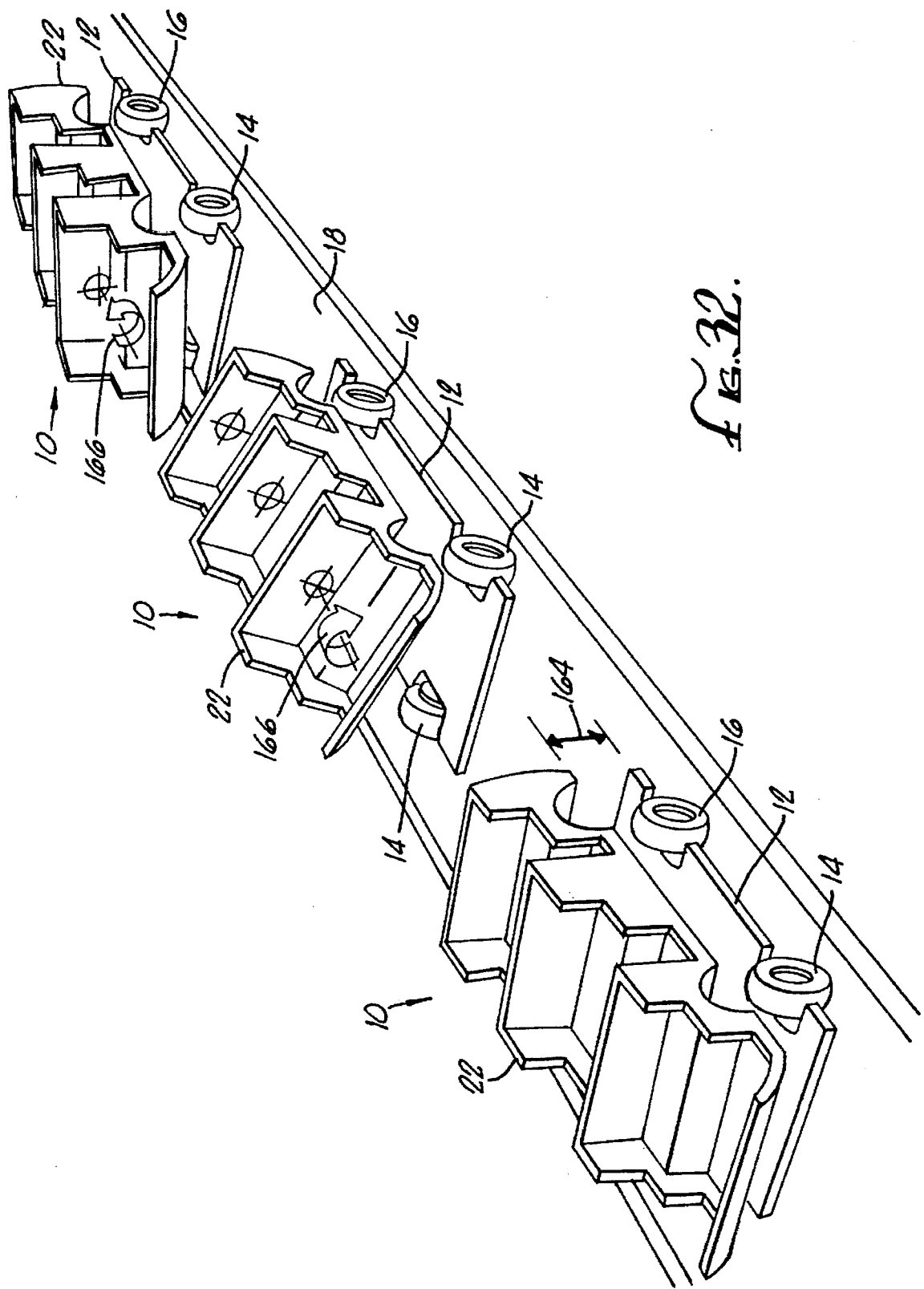
FIG. 32 is a perspective view of the ride vehicle showing it moving in a forward direction with body motion to simulate the effect of floating or flying.

FIG. 32 shows the ride vehicle 10 moving in a forward direction with body motion designed to simulate the effect of floating or flying. In this motion pattern, the vehicle 10 is moved forwardly along the path 18 while gently rolling and pitching the body 22 through rotational accelerations about the roll and pitch axes in a random fashion with respect to the chassis 12, as indicated by the motion arrows 164 and 166. The addition of audio and special effects in combination with this motion pattern can provide a realistic moving ride vehicle experience which is not actually taking place.

Figure 33:
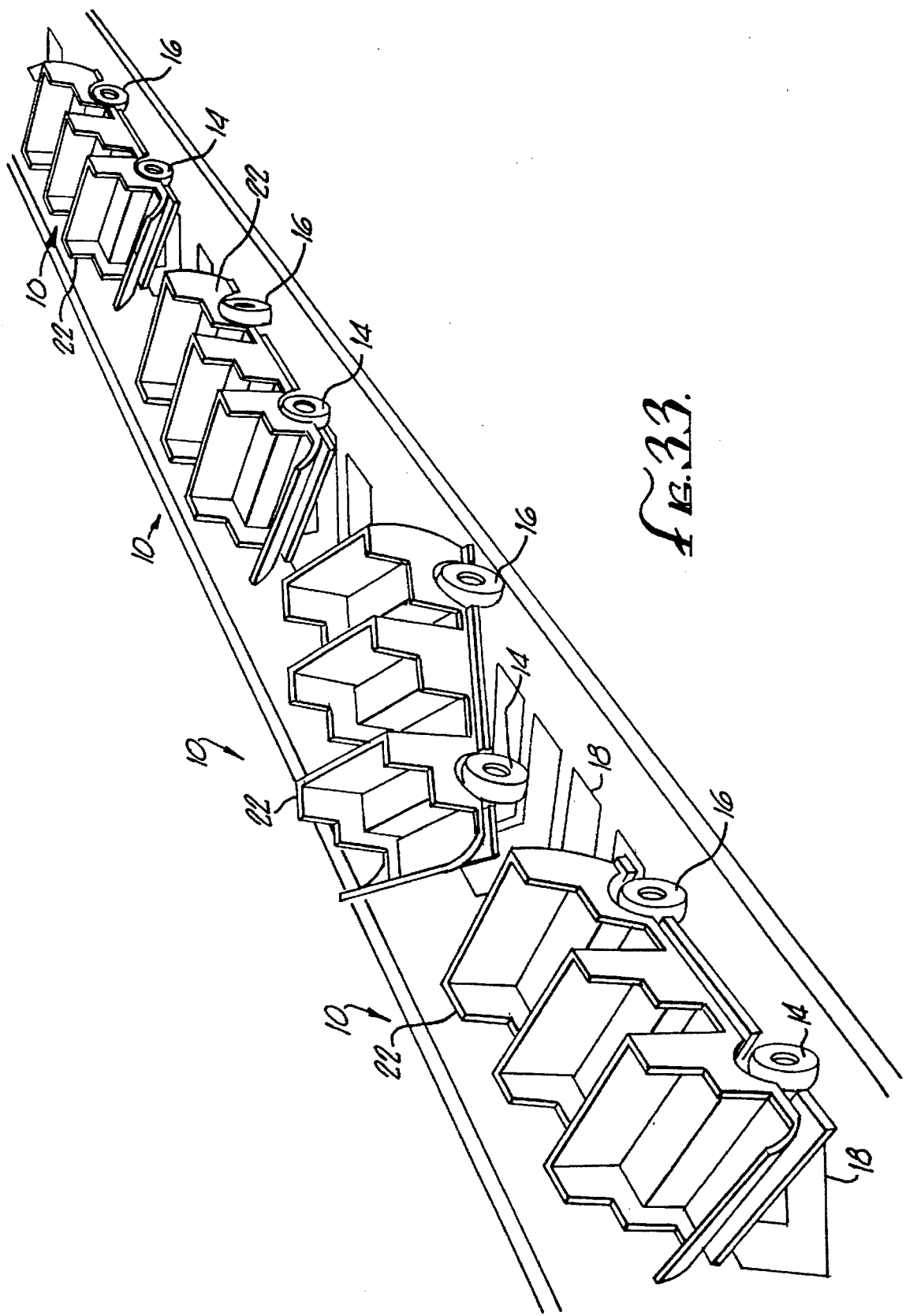

FIG. 33 shows the ride vehicle 10 moving in a forward direction with four-wheel steering designed to simulate the effect of fishtailing. In this motion pattern, the vehicle 10 is initially moving forward along the path 18 in a substantially straight line. First, the rear wheels 16 are steered outwardly in one direction to initiate the fishtailing. Moments later, the front wheels 14 are also steered outwardly in the same direction such that both the front and rear wheels 14 and 16 are steered simultaneously in one direction. Both wheels 14 and 16 are then steered quickly in the opposition direction. This causes the vehicle 10 to move back and forth in the yaw direction, while keeping the center of gravity of the vehicle in substantially a straight line. Thus, even though the vehicle 10 is not actually fishtailing, the motion pattern described above accurately simulates that effect.

Figure 34:
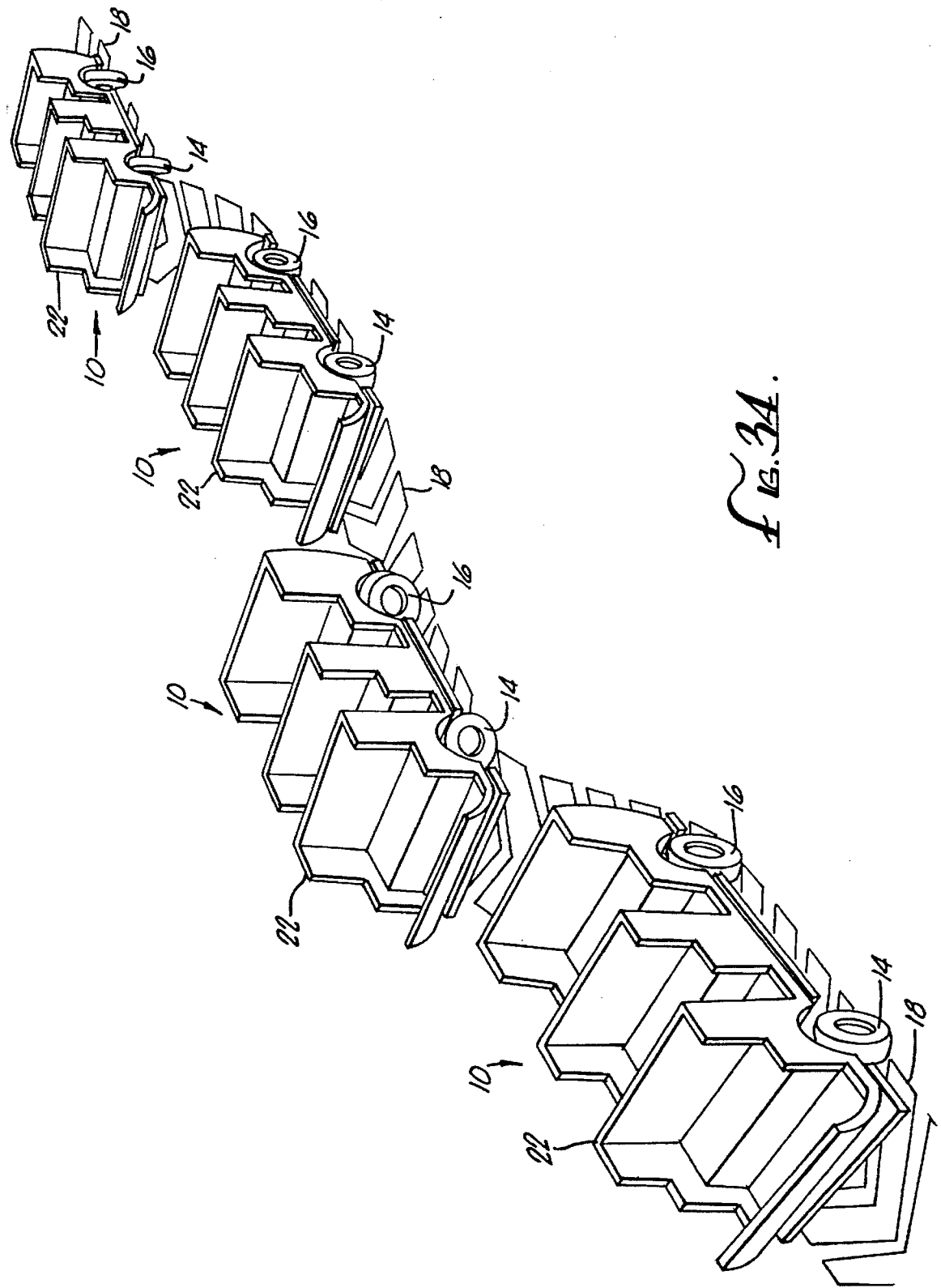
FIG. 34 is a perspective view of the ride vehicle showing it moving in a forward direction with four-wheel steering to simulate the effect of side to side swaying.

FIG. 34 shows the ride vehicle 10 moving in a forward direction with four-wheel steering designed to simulate the effect of side-to-side swaying. In this motion pattern, the vehicle 10 is initially moved forward along the path 18 in substantially a straight line. Both the front and rear wheels 14 and 16 are then steered simultaneously in one direction, causing the vehicle 10 to move to one side of the path 18. The wheels 14 and 16 are then straightened out momentarily no gradually move the vehicle 10 in the forward direction. Then, both the front and rear wheels 14 and 16 are steered simultaneously in the opposite direction causing the vehicle 10 to gradually move to the other side of the path 18. This vehicle motion caused by four-wheel steering can be repeated for as long as desired to simulate the effect of side-to-side swaying.

The motion patterns described above are only examples of some of the many motion patterns that can be executed by the vehicle 10. It will be appreciated that appropriate articulation of the body 22 in combination with the vehicle's speed and steering capabilities will enable additional motion patterns to be created beyond those illustrated here. Therefore, the invention should not be considered to be limited to only those specific motion patterns illustrated and described herein.

From the foregoing, it will be appreciated that the dynamic ride vehicle 10 of the present invention provides several unique motion patterns that may be executed in various sequences in an amusement park attraction or other environment, along with appropriate scenery, audio sounds and various other special effects, to create a very unique ride experience for the passengers in the vehicle. The ride vehicle 10 is capable of enhancing the sensation of vehicle movement that is actually taking place, as well as providing the passengers with realistic moving ride vehicle experiences than are not actually happening.

While a particular form of the invention has been illustrated and described, it will be apparent that various modifications can be made without departing from the spirit and scope of the invention. Accordingly, it is not intended that the invention be limited, except as by the appended claims.

We claim:

1. A dynamic ride vehicle that carries a passenger and that moves along a path through an environment external to the vehicle, comprising:

(a) a chassis that selectively moves the vehicle along the path with respect to the environment;

(b) a body that carries the passenger and that permits viewing by the passenger of the environment;

(c) a motion apparatus connecting the body to the chassis and permitting at least one degree of controlled motion of the body independent of motion of the chassis; and (d) a programmable controller that controls the motion of the body and the motion of the chassis and the relative motion between the body and the chassis.

2. A dynamic ride vehicle that moves along a path through an environment external to the vehicle, comprising:
   (a) a chassis that moves the vehicle along the path with respect to the environment;
   (b) a body that carries a passenger;
   (c) a motion apparatus connecting the body to the chassis permitting at least one degree of controlled articulation between the chassis and the body; and
   (d) a controller that
      controls motion of the chassis along the path relative to the environment,
      controls motion of the body relative to the chassis; and
      coordinates motion of the chassis along the path relative to the environment with motion of the body relative to the chassis to create a particular motion experience for the passenger in the vehicle.

3. The dynamic ride vehicle of claim 2, further comprising a driver for moving the chassis along the path.

4. The dynamic ride vehicle of claim 3, further comprising wheels on the chassis, wherein the driver is adapted to drive the wheels and move the chassis.

5. The dynamic ride vehicle of claim 4, wherein one of the wheels is steerable for controlling a direction of motion of the chassis.

6. The dynamic ride vehicle of claim 4, wherein the wheels comprise a pair of steerable front wheels and a pair of rear wheels on the chassis.

7. The dynamic ride vehicle of claim 4, wherein the wheels comprise a pair of steerable front wheels and a pair of steerable rear wheels on the chassis.

8. The dynamic ride vehicle of claim 7, wherein the pair of steerable front wheels and the pair of steerable rear wheels are independently steerable in different directions.

9. The dynamic ride vehicle of claim 2, wherein the motion of the chassis is controlled by a wire-guided system, a signal-based system, or an autonomous system.

10. The dynamic ride vehicle of claim 2, wherein the motion apparatus permits a plurality of different degrees of controlled motion of the body relative to the chassis.

11. The dynamic ride vehicle of claim 2, wherein the motion apparatus includes an actuator that articulates the body with respect to the chassis in a compound movement.

12. The dynamic ride vehicle of claim 2, further comprising a sound producing audio device, wherein the controller controls the audio device to produce sounds.

13. The dynamic ride vehicle of claim 2, wherein the controller receives and transmits control signals in real time to coordinate motion of the body with respect to the chassis.

14. The dynamic ride vehicle of claim 2, wherein operation of the controller is based on a function of time.

15. A dynamic ride vehicle that carries a passenger and that moves along a path through an environment external to the vehicle, comprising:
   (a) a chassis that selectively moves the vehicle along the path with respect to the environment;
   (b) a body that carries the passenger and that permits viewing by the passenger of the environment;
   (c) a motion apparatus connecting the body to the chassis and permitting at least one degree of controlled motion of the body independent of motion of the chassis;
   (d) a steering mechanism for controlling the direction of motion of the chassis along the path; and
   (e) a programmable controller that controls the motion apparatus and the steering mechanism.

16. The dynamic ride vehicle of claim 15, wherein the steering mechanism is controlled by a passenger in the vehicle.

17. A dynamic ride vehicle that carries a passenger and that moves along a path through an environment external to the vehicle, comprising:
   (a) a chassis that selectively moves the vehicle along the path with respect to the environment;
   (b) a body that carries the passenger and that permits viewing by the passenger of the environment;
   (c) a motion apparatus connecting the body to the chassis and permitting at least one degree of controlled motion of the body independent of motion of the chassis;
   (d) a brake for decelerating the chassis; and
   (e) a programmable controller that controls the motion apparatus and the brake.

18. A dynamic ride vehicle that carries a passenger and that moves along a path through an environment external to the vehicle, comprising:
   (a) a chassis that selectively moves the vehicle along the path with respect to the environment;
   (b) a body that carries the passenger and that permits viewing by the passenger of the environment;
   (c) a motion apparatus connecting the body to the chassis and permitting at least one degree of controlled motion of the body independent of motion of the chassis;
   (d) a programmable controller that controls the motion apparatus, wherein the controller receives and transmits data based on an external signal that is either derived from the motion of the vehicle or provided by an off board device.

19. The dynamic ride vehicle of claim 18, wherein the external signal is provided by a passenger on the vehicle.

20. The dynamic ride vehicle of claim 18, wherein the external signal is derived from the motion of the vehicle.

21. The dynamic ride vehicle of claim 20, wherein the external signal represents speed.

22. The dynamic ride vehicle of claim 20, wherein the external signal represents vehicle position relative to the path.

23. The dynamic ride vehicle of claim 18, wherein the controller transmits information to the off board device.

24. In a simulator device for use in simulating a vehicle ride, wherein a passenger holding body is articulated by a motion apparatus in at least two degrees of motion in synchronization with the presentation of visual effects to a passenger, the improvement comprising:
   (a) a movable vehicle that supports the body and the motion apparatus for articulation of the body with respect to the vehicle during motion of the vehicle;
   (b) a vehicle path leading through differing environments whereby the vehicle may be moved through the differing environments to thereby present differing visual effects to the passenger;
   (c) a sensor that senses the presence of predefined conditions corresponding to the different environments; and
   (d) a motion apparatus controller coupled to the sensor that, in response to the presence of the predefined conditions, articulates the body with respect to the vehicle contemporaneously with the motion of the vehicle to thereby synchronize actuation of the motion apparatus with the presentation of visual effects to the passenger.

25. In the simulator device of claim 24, the improvement wherein the motion apparatus controller includes a computer, the improvement further comprises controlling movement of the vehicle using the computer, and wherein the articulation of the body and movement of the vehicle are each controlled according to preprogrammed instructions which are stored and accessed by the computer according to a common frame of reference.

26. In the simulator device of claim 25, the improvement wherein the common frame of reference is dependent upon a clock signal.

27. In the simulator device of claim 24, wherein the improvement further comprises providing variable steering to the vehicle, wherein the motion apparatus controller includes a computer, and wherein articulation of the body is controlled according to sensing of the direction of steering by the computer and association by the computer of a pattern of steering with stored data representing a selected pattern of articulation of the body.

28. A dynamic ride vehicle that moves along a path through an environment external to the vehicle and imparts a motion experience to a passenger of the vehicle as the passenger is moved along the path by the vehicle, comprising:
  (a) a chassis that moves along the path through the environment;
  (b) a motion apparatus that couples the chassis and the body, the motion apparatus being selectively actuated to impart motion to the body as the vehicle moves along the path;
  (c) a memory that stores a sequence of information for controlling actuation of the motion apparatus to impart motion to the body in superposition to motion imparted to the body by the motion of the chassis along the path;
  (d) a controller that is coupled to the memory to retrieve therefrom data from the sequence of information and that actuates the motion apparatus in response thereto; and
  (e) a trigger that detects an event indicating that the next piece of information in the sequence of information is to be used to control actuation of the motion apparatus and that in response thereto triggers the actuation of the motion apparatus in response to said next piece of information.

29. The dynamic ride vehicle of claim 28, wherein:
  (a) the trigger includes a sensor that is electronically coupled to the controller; and
  (b) the detected event indicating that said next piece of information is to be used is the attainment of the vehicle of a predefined position along the path.

30. The dynamic ride vehicle of claim 29, wherein the position of the vehicle is determined by receipt of an electromagnetic transmission representative of the vehicle's position from a source external to the vehicle, the sensor being an antenna.

31. The dynamic ride vehicle of claim 29, wherein the position of the vehicle is determined by position indicia external to the vehicle.

32. The dynamic ride vehicle of claim 29, wherein the position of the vehicle is determined by an incremental position indicator maintained by the controller.

33. The dynamic ride vehicle of claim 29, wherein the position of the vehicle is approximated in reference to a time elapsed from a predetermined reference time, the sensor being a clock.

34. The dynamic ride vehicle of claim 28, wherein the memory is an electronic memory.

35. The dynamic ride vehicle of claim 34, wherein the electronic memory includes a plurality of different sequences of information which are selected in the alternative.

36. The dynamic ride vehicle of claim 34, wherein the electronic memory is resident on the vehicle and is adapted to be programmed and edited by a detachable programming console without removal of the electronic memory from the vehicle to edit relative motion of the chassis with respect to the path and of the passenger holding body with respect to the chassis, with the sequence of information that has been programmed or edited subsequently retained in the electronic memory.

37. The dynamic ride vehicle of claim 34, wherein the electronic memory is erasable and is selectively reprogrammed to alter the sequence of information.

38. The dynamic ride vehicle of claim 34, wherein the electronic memory is modular and replaceable, and is selectively replaced with an electronic memory having a second sequence of information.

39. The dynamic ride vehicle of claim 28, wherein the trigger includes at least one sensor that senses and distinguishes movements of the vehicle, wherein the sequence of information controlling actuation of the motion apparatus is selected to correspond to a predetermined, sensed movement of the vehicle.

40. The dynamic ride vehicle of claim 39, wherein the vehicle includes an operator steering interface, whereby an operator can steer the vehicle along a non-predefined path, wherein the controller actuates the motion apparatus to alter the centripetal force experienced by the passenger within the body from that provided by mere turning of the chassis.

41. The dynamic ride vehicle of claim 39, wherein the vehicle includes an operator speed interface, whereby an operator can control the speed of the vehicle along the path, and wherein the controller actuates the motion apparatus to alter the acceleration and deceleration forces experienced by the passenger within the body from that provided by mere acceleration and deceleration of the chassis.

42. A dynamic ride vehicle that moves along a path through an environment external to the vehicle, comprising:
  (a) a wheeled chassis that moves the vehicle along the path;
  (b) a body that carries a passenger;
  (c) a motion apparatus connecting the chassis to the body that selectively imparts motion to the body along a plurality of degrees of motion relative to the chassis, wherein the motion apparatus may be operated independently of motion of the chassis along the path; and
  (d) a programmable controller that controls operation of the motion apparatus and thereby the motion imparted to the body relative to the chassis, wherein the controller includes a microprocessor-based system and electronic memory, and wherein each of chassis velocity, steering, and the actions of the motion apparatus are controlled by the microprocessor-based system according to preprogrammed instructions, such that the motion of the chassis with respect to the environment and the motion of the body with respect to the chassis are predefined.

43. In a method of enhancing a vehicle ride, wherein a passenger holding body is articulated by a motion apparatus in multiple degrees of motion in synchronization with the presentation of visual effects to a passenger, the improvement comprising:
  (a) mounting the body and the motion apparatus on a vehicle having an independent source of motion;
  (b) moving the vehicle to bring the passenger into differing environments and thereby present different visual effects to the passenger; and (c) articulating the body with respect to the vehicle, contemporaneously with the motion of the vehicle and in synchronization therewith, to thereby synchronize actuation of the motion apparatus with the presentation of visual effects to the passenger, and wherein a computer controls both the independent source of motion, to thereby control movement of the vehicle along the path, and the articulation of the body according to preprogrammed instructions stored by the computer.

44. In the method of claim 43, wherein the presentation of visual effects to the passenger is accomplished by changing at least one of the direction, acceleration, deceleration and speed of the vehicle, such that the environment external to the vehicle appears to the passenger to differ in at least one of direction, acceleration, deceleration and speed.

45. A method of moving a dynamic ride vehicle that moves along a path through an environment external to the vehicle, wherein the vehicle has a chassis that moves along the path with respect to the environment, a body, a motion apparatus that is adapted to articulate the body with respect to the chassis, and a programmable controller that controls the motion of the chassis and the motion apparatus to execute and coordinate programmably defined motion patterns, comprising the steps of:

moving the chassis with respect to the path;

moving the body in one of the predefined motion patterns in at least one degree of controlled motion independent of any motion of the chassis as the chassis is moved along the path with respect to the environment; and coordinating relative motion between the body and the chassis.

46. The dynamic ride vehicle of claim 45, wherein the controller includes a microprocessor-based system having a clock, and wherein the controller uses the clock to coordinate preprogrammed motion of the chassis relative to the environment with preprogrammed motion of the body relative to the chassis, such that specific motions of the body relative to the chassis are thereby synchronized with motion of chassis as the vehicle moves through the external environment to thereby impart motion to the passenger that is associated with the external environment.

47. The method of claim 45, further comprising the step of moving the chassis along the path, such that motion of the body is performed in response to the motion of the chassis.

48. The method of claim 47, further comprising the step of steering the chassis to control the direction of motion of the chassis relative to the environment.

49. The method of claim 48, further comprising the steps of controlling both movement of the body with respect to the chassis and at least one of (a) speed of movement of the chassis along the path through the environment, and (b) direction of movement of the chassis along the path through the environment, both with respect to sequenced preprogrammed instructions that are indexed by a common frame of reference.

50. The method of claim 47, wherein the dynamic ride vehicle has a pair of steerable front wheels and a pair of rear wheels, further comprising the step of steering the front wheels to control the direction of motion of the chassis relative to the environment.

51. The method of claim 47, wherein the dynamic ride vehicle has a pair of steerable front wheels and a pair of steerable rear wheels, further comprising the step of steering the front wheels and the rear wheels to control the direction of motion of the chassis relative to the environment.

52. The method of claim 51, further comprising the step of steering the front wheels and the rear wheels independently of each other.

53. The method of claim 47, wherein the steps of moving the body and the chassis result in the turning of a corner in the dynamic ride vehicle, wherein said steps comprise moving the chassis forward with the body in a substantially level position with respect to the chassis prior to initiating the turn, steering the chassis in a direction to follow a curved path while simultaneously causing rotational acceleration of the body with respect to the chassis, about a roll axis in an outward direction with respect to the turn, until the vehicle has substantially reached the apex of the curved path, to thereby exaggerate and enhance the passenger's sensation of the speed and sharpness of the corner, and then rotationally accelerating the body back inwardly until it reaches a relatively level position with respect to the chassis substantially at the end of the turn.

54. The method of claim 47, wherein the steps of moving the body and the chassis result in the turning of a corner in the dynamic ride vehicle, wherein said steps comprise moving the chassis forward with the body in a substantially level position with respect to the chassis prior to initiating the turn, steering the chassis in a direction to follow a curved path while simultaneously causing rotational acceleration of the body with respect to the chassis, about a roll axis in an inward direction with respect to the turn, until the vehicle has substantially reached the apex of the curved path to thereby subdue and minimize the passenger's sensation of the speed and sharpness of the corner, and then rotationally accelerating the body back outwardly until it reaches a relatively level position with respect to the chassis substantially at the end of the turn.

55. The method of claim 47, wherein the step of moving the chassis results in the turning of a corner in the dynamic ride vehicle, wherein said step comprises moving the chassis forward with the body in a substantially level position with respect to the chassis, steering front wheels of the chassis in a direction to follow a curved path, while, as the vehicle enters the turn, steering rear wheels of the vehicle away from the direction of the turn, with the rear wheels steering more than the front wheels, thereby causing the back end of the vehicle to swing outwardly during the turn to give the effect of sliding, and then steering the rear wheels back inwardly momentarily as the vehicle comes out of the turn, thereby causing the back end of the vehicle to swing quickly inwardly to simulate the effect of the vehicle sliding during the turn.

56. The method of claim 47, wherein the steps of moving the body and the chassis result in enhancing the sensation of forward acceleration of the dynamic ride vehicle, wherein said steps comprise accelerating the chassis in a forward direction along the path, while quickly pitching the body backward, by causing rotational acceleration of the body in a rearward direction about a pitch axis, and then slowly pitching the body forward until it reaches a substantially level position with respect to the chassis to thereby exaggerate and enhance the passenger's sensation of the acceleration of the vehicle.

57. The method of claim 47, wherein the steps of moving the body and the chassis result in the enhancing the sensation of braking of the dynamic ride vehicle, wherein said steps comprise decelerating the chassis as it moves in a forward direction along the path, while simultaneously pitching the body forward, by causing rotational acceleration of the body in a forward direction about a pitch axis, and then quickly pitching the body backward to a substantially level position with respect to the chassis just as the chassis stops, to thereby exaggerate and enhance the passenger's sensation of the braking of the vehicle.

58. The method of claim 47, wherein the steps of moving the body and the chassis result in the simulated effect of driving over an imaginary object in the dynamic ride vehicle, wherein said steps comprise moving the chassis forward to a point corresponding to the location of the imaginary object, quickly pitching the body backward and then forward by causing rotational acceleration of the body about a pitch axis thereby causing the front end of the body to quickly raise up and then drop down as the front of the vehicle passes the point corresponding to the location of the imaginary object, waiting for an elapsed distance traveled by the chassis that corresponds to the rear of the vehicle reaching the imaginary object, and then quickly pitching the body forward and then backward by causing rotational acceleration of the body about the pitch axis thereby causing the rear end of the body to quickly raise up and then drop down as the vehicle continues to move forward passing the imaginary object.

59. The method of claim 58, further comprising the steps of rotationally accelerating the body forward and backward about the pitch axis for several cycles after the vehicle has passed the imaginary object, decreasing the amplitude of the pitching motion as the distance between the vehicle and the imaginary object increases, and then returning the body to a substantially level position with respect to the chassis.

60. The method of claim 47, wherein the steps of moving the body and the chassis result in the simulated effect of driving over an imaginary dip in the dynamic ride vehicle, wherein said steps comprise moving the chassis forward to a point corresponding to the location of the imaginary dip, raising and causing rotational acceleration of the rear end of the body about a pitch axis and then dropping it back down as the front of the vehicle passes the point corresponding to the location of the imaginary dip, waiting for an elapsed distance traveled by the chassis that corresponds to the rear of the vehicle reaching the imaginary dip, and then raising and causing rotational acceleration of the front end of the body about the pitch axis and then dropping it back down as the vehicle continues to move forward passing the imaginary dip.

61. The method of claim 60, further comprising the steps of causing rotational acceleration of the body forward and backward about the pitch axis for several cycles after the vehicle has passed the imaginary dip, decreasing the amplitude of the pitching motion as the distance between the vehicle and the imaginary dip increases, and then returning the body to a substantially level position with respect to the chassis.

62. The method of claim 47, wherein the steps of moving the body and the chassis result in the simulated effect of climbing a hill in the dynamic ride vehicle, wherein said steps comprising moving the chassis forward along the path, pitching the body backward by raising and causing rotational acceleration of the front end about a pitch axis and keeping the body in this position as the imaginary hill is climbed, and then raising the rear end of the body until it reaches a substantially level position.

63. The method of claim 47, wherein the steps of moving the body and the chassis result in the simulated effect of descending a hill in the dynamic ride vehicle, wherein said steps comprise moving the chassis forward along the path with the body in a substantially horizontal but elevated position with respect to the chassis, pitching the body forward by lowering and causing rotational acceleration of the front end about a pitch axis and keeping the body in this position as the imaginary hill is descended, and then dropping the rear end of the body down until it reaches a substantially level position.

64. The method of claim 47, wherein the steps of moving the body and the chassis result in the simulated effect of floating or flying in the dynamic ride vehicle, wherein said steps comprise moving the chassis forward along the path while gently rolling and pitching the body in a random fashion with respect to the chassis by causing rotational acceleration of the body about a roll axis and a pitch axis.

65. The method of claim 47, wherein the steps of moving the body and the chassis result in the simulated effect of fish-tailing in the dynamic ride vehicle, wherein said steps comprise moving the chassis forward along the path in substantially a straight line, initially steering rear wheels of the vehicle in one direction followed moments later by steering front wheels of the vehicle in the same direction as the rear wheels, and then simultaneously steering both the front and rear wheels in the opposite direction, thereby causing the vehicle to move back and forth in the yaw direction, such that the center of gravity of the vehicle continues in substantially a straight line.

66. The method of claim 47, wherein the steps of moving the body and the chassis result in the simulated effect of side-to-side swaying in the dynamic ride vehicle, wherein said steps comprise moving the chassis forward along the path in a substantially straight line and then steering both front and rear wheels of the vehicle simultaneously in one direction causing the vehicle to move to one side of the path, steering both the front and rear wheels in the forward direction momentarily and then simultaneously steering both the front and rear wheels in the opposite direction causing the vehicle to move to the other side of the path, such that the center of gravity of the vehicle moves from side-to-side as the vehicle travels along the path while gently rolling and pitching the body in a random fashion with respect to the chassis by causing rotational acceleration of the body about a roll axis and a pitch axis.

67. The method of claim 45, wherein the step of moving the body includes moving the body in at least one degree of controlled motion including moving the body in at least one roll, pitch, heave, yaw, slip and surge.

68. The method of claim 45, wherein the motion apparatus comprises at least one actuator for imparting motion to the body relative to the chassis, further comprising the step of controlling the actuator to cause controlled motion of the body.

69. The method of claim 45, wherein the controller includes an electronic memory that stores a sequence of data that defines the motion of the body with respect to the chassis, a plurality of data in the sequence each associated with a specific motion of the chassis relative to the environment, further comprising the step of retrieving one of the plurality of data from the electronic memory in association with a specific motion of the chassis and transmitting control signals representative thereof via the controller to synchronize specific motion of the body relative to the chassis with motion of the chassis relative to the environment.

70. The method of claim 69, further comprising the step of receiving and transmitting data via the controller based on an external signal.

71. The method of claim 70, wherein the external signal is provided by a passenger on the dynamic ride vehicle.

72. The method of claim 70, wherein the external signal is provided by a tachometer on the dynamic ride vehicle.

73. The method of claim 70, wherein the external signal is provided by a trigger.

74. The method of claim 70, wherein the external signal is derived from the motion of the dynamic ride vehicle.

75. The method of claim 70, wherein the external signal is provided by an off board device.

76. A method of moving a dynamic ride vehicle that moves along a path through an environment external to the vehicle, wherein the vehicle has a chassis that moves along the path with respect to the environment, a body, a motion apparatus including at least one actuator that is adapted to articulate the body with respect to the chassis during movement of the chassis, and a programmable controller that controls the motion of the chassis and the motion apparatus, comprising the steps of advancing the chassis along the path;

moving the body in at least one degree of controlled motion independent of any motion of the chassis as the chassis is advanced along the path with respect to the environment; and coordinating the advancement of the chassis and the motion of the body to execute predefined motion patterns by the vehicle.

77. The dynamic ride vehicle of claim 76, wherein the motion apparatus includes at least two hydraulic actuators that are adapted to articulate the body in at least two degrees of motion with respect to the chassis during movement of the chassis, wherein the step of moving the body includes the step of selectively moving the body in at least two degrees of controlled motion independent of the chassis as the chassis is advanced along the path with respect to the environment.

78. A dynamic ride vehicle that carries a passenger and that moves along a path through an environment external to the vehicle, comprising:

(a) a chassis adapted to follow the path;

(b) a body that carries the passenger and that permits viewing of the environment by the passenger;

(c) a motion apparatus supporting the body and connecting the body to the chassis, wherein the motion apparatus articulates the body in a plurality of degrees of freedom relative to and independent of motion of the chassis; and (d) a controller that controls and coordinates the motion of the chassis and the motion apparatus to articulate the body relative to the chassis.

* * * * *

Disclaimer

5,623,878—Anthony W. Baxter, Anaheim Hills, Ca. DYNAMIC RIDE VEHICLE. Patent dated April 29, 1997. Disclaimer filed Sep. 28, 2004 by the assignee, The Walt Disney Company.

Hereby enters this disclaimer to claims 1-6; 9-39; 42-50; and 67-78, of said patent.

*(Official Gazette March 15, 2005)*